United States Patent
Akutsu et al.

(10) Patent No.: US 11,073,693 B2
(45) Date of Patent: Jul. 27, 2021

(54) OPTICAL DEVICE, HEAD MOUNTED DISPLAY, ASSEMBLING METHOD FOR THE SAME, HOLOGRAPHIC DIFFRACTION GRATING, DISPLAY DEVICE, AND ALIGNMENT DEVICE

(71) Applicant: Sony Corporation, Tokyo (JP)

(72) Inventors: Katsuyuki Akutsu, Kanagawa (JP); Hideo Nagasaka, Tokyo (JP); Yusuke Kajio, Tokyo (JP); Takashi Mizusawa, Tokyo (JP); Daisuke Tsukuda, Saitama (JP); Kazutatsu Tokuyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/640,349

(22) Filed: Mar. 6, 2015

(65) Prior Publication Data
US 2015/0260994 A1 Sep. 17, 2015

(30) Foreign Application Priority Data

Mar. 14, 2014 (JP) .............................. JP2014-052043

(51) Int. Cl.
*G02B 27/01* (2006.01)
*G02B 5/18* (2006.01)
(Continued)

(52) U.S. Cl.
CPC ........... *G02B 27/0172* (2013.01); *G02B 5/18* (2013.01); *G02B 6/34* (2013.01); *G02B 27/4205* (2013.01);
(Continued)

(58) Field of Classification Search
CPC ........ G02B 27/0172; G02B 2027/0178; G02B 6/00; G02B 2027/0125; G02B 2027/0123;
(Continued)

(56) References Cited

U.S. PATENT DOCUMENTS 8,817,350 B1* 8/2014 Robbins ................... G02B 5/18
359/15
8,861,090 B2 10/2014 Mukawa
(Continued)

FOREIGN PATENT DOCUMENTS

CN 100410727 C 8/2008
JP 09-068705 A 3/1997
(Continued)

OTHER PUBLICATIONS

Chinese Office Action dated Apr. 8, 2018 in connection with Chinese Application No. 2015101011506, and English translation thereof.
(Continued)

*Primary Examiner* — Marin Pichler
*Assistant Examiner* — Alberto J Betancourt
(74) *Attorney, Agent, or Firm* — Wolf, Greenfield & Sacks, P.C.

(57) ABSTRACT

In some embodiments, a head mounted display is provided, comprising a light guide, at least first and second diffraction gratings, alignment marks A1 and B1 associated with the first diffraction grating, and alignment marks A2 and B2 associated with the second diffraction grating. The first diffraction grating may be disposed on a first surface of the light guide, the first surface facing away from a light input. The second diffraction grating may be disposed on a second surface of the light guide, the second surface facing towards the light input. The second diffraction grating may be adapted to diffract at least some of the light input into the light guide, and the first diffraction grating may be adapted to diffract at least some light transmitted through the light guide back into the light guide.

22 Claims, 22 Drawing Sheets

(51) Int. Cl.
*G02B 6/34* (2006.01)
*G02B 27/42* (2006.01)

(52) U.S. Cl.
CPC .. *G02B 27/4272* (2013.01); *G02B 2027/0178* (2013.01); *G02B 2027/0198* (2013.01)

(58) Field of Classification Search
CPC .......... G02B 27/017; G02B 2027/0174; G02B 5/32; G02B 27/01; G02B 27/02; G02B 27/022; G02B 5/18; G02B 5/1814; G02B 5/1828; G02B 17/0856; G02B 5/1866; G02B 27/4272; G02B 2027/0198; G02B 27/0101; G02B 27/0149; G02B 27/0176; G02B 27/0179; G02B 6/34; G02B 27/4205; G02B 27/44; H04N 13/044; H04N 13/0429; H04N 5/7491; B29D 11/0073; G02F 2201/305
USPC ..... 359/13–14, 629–633, 566–576; 345/7–9; 348/115; 349/11
See application file for complete search history.

(56) References Cited

U.S. PATENT DOCUMENTS

| | | | |
|---|---|---|---|
| 8,907,865 B2 | 12/2014 | Miyawaki et al. | |
| 8,976,453 B2 | 3/2015 | Akutsu et al. | |
| 8,988,315 B2 | 3/2015 | Mukawa et al. | |
| 9,164,221 B2 | 10/2015 | Akutsu et al. | |
| 9,201,242 B2 | 12/2015 | Miyawaki et al. | |
| 9,558,540 B2 | 1/2017 | Mukawa | |
| 9,569,897 B2 | 2/2017 | Miyawaki et al. | |
| 9,709,809 B2 | 7/2017 | Miyawaki et al. | |
| 9,726,890 B2 | 8/2017 | Akutsu et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 9,933,621 B2 | 4/2018 | Hirano et al. | |
| 9,952,435 B2 | 4/2018 | Tanaka et al. | |
| 9,972,135 B2 | 5/2018 | Mukawa | |
| 10,018,846 B2 | 7/2018 | Machida et al. | |
| 10,302,946 B2 | 5/2019 | Aiki | |
| 10,338,388 B2 | 7/2019 | Hirano et al. | |
| 10,527,859 B2 | 1/2020 | Tanaka et al. | |
| 10,534,172 B2 | 1/2020 | Tanaka et al. | |
| 10,540,822 B2 | 1/2020 | Mukawa | |
| 10,613,329 B2 | 4/2020 | Ato et al. | |
| 10,642,040 B2 | 5/2020 | Mukawa | |
| 10,663,736 B2 | 5/2020 | Tanaka et al. | |
| 2002/0001107 A1 | 1/2002 | Ichikawa et al. | |
| 2002/0003637 A1 | 1/2002 | Watanabe | |
| 2006/0228073 A1 | 10/2006 | Mukawa et al. | |
| 2010/0002183 A1* | 1/2010 | Fukuda | G02F 1/1303 349/158 |
| 2010/0157400 A1 | 6/2010 | Dimov et al. | |
| 2011/0019250 A1* | 1/2011 | Aiki | G02B 5/32 359/15 |
| 2011/0096981 A1* | 4/2011 | Arnison | G03F 9/7026 382/151 |
| 2011/0109528 A1 | 5/2011 | Mun et al. | |
| 2011/0241975 A1 | 10/2011 | Mukawa et al. | |
| 2011/0248904 A1 | 10/2011 | Miyawaki et al. | |
| 2012/0044571 A1 | 2/2012 | Mukawa | |
| 2012/0081789 A1* | 4/2012 | Mukawa | G02B 6/0033 359/567 |
| 2012/0236172 A1* | 9/2012 | Ellenby | G06K 9/00671 348/222.1 |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0334010 A1 | 11/2014 | Mukawa | |
| 2014/0340286 A1 | 11/2014 | Machida et al. | |
| 2014/0347252 A1 | 11/2014 | Miyawaki et al. | |
| 2015/0109679 A1 | 4/2015 | Mukawa et al. | |
| 2015/0138647 A1 | 5/2015 | Akutsu et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0147069 A1 | 5/2016 | Tanaka et al. | |
| 2016/0154243 A1 | 6/2016 | Aiki | |
| 2017/0069140 A1 | 3/2017 | Mukawa | |
| 2017/0115492 A1 | 4/2017 | Miyawaki et al. | |
| 2017/0184857 A1 | 6/2017 | Ato et al. | |
| 2017/0322420 A1 | 11/2017 | Machida et al. | |
| 2018/0136472 A1 | 5/2018 | Tanaka et al. | |
| 2018/0211449 A1 | 7/2018 | Mukawa | |

FOREIGN PATENT DOCUMENTS

| | | |
|---|---|---|
| JP | 11-305043 A | 11/1999 |
| JP | 2002-162598 A | 6/2002 |
| JP | 2004-136569 A | 5/2004 |
| JP | 2005-249855 A | 9/2005 |
| JP | 2008-058777 A | 3/2008 |
| JP | 2008-098208 A | 4/2008 |
| JP | 2009-186794 A | 8/2009 |
| JP | 2012-159856 A | 8/2012 |
| WO | WO 2005/093493 A1 | 10/2005 |
| WO | WO 2008/111214 A1 | 9/2008 |

OTHER PUBLICATIONS

Japanese Office Action dated Jun. 26, 2018 in connection with Japanese Application No. 2017-164332, and English translation thereof.
U.S. Appl. No. 15/867,870, filed Jan. 11, 2018, Tanaka et al.
U.S. Appl. No. 15/925,605, filed Mar. 19, 2018, Mukawa.
Japanese Office Action dated Dec. 25, 2018 in connection with Japanese Application No. 2017-164332, and English translation thereof.
Extended European Search Report dated Jul. 20, 2015 in connection with European Application No. 15157880.4.
Japanese Office Action dated Dec. 13, 2016 in connection with Japanese Application No. 2014-052043 and English translation thereof.
Article 94(3) Communication dated Apr. 12, 2017 in connection with European Application No. 15157880.4.

* cited by examiner

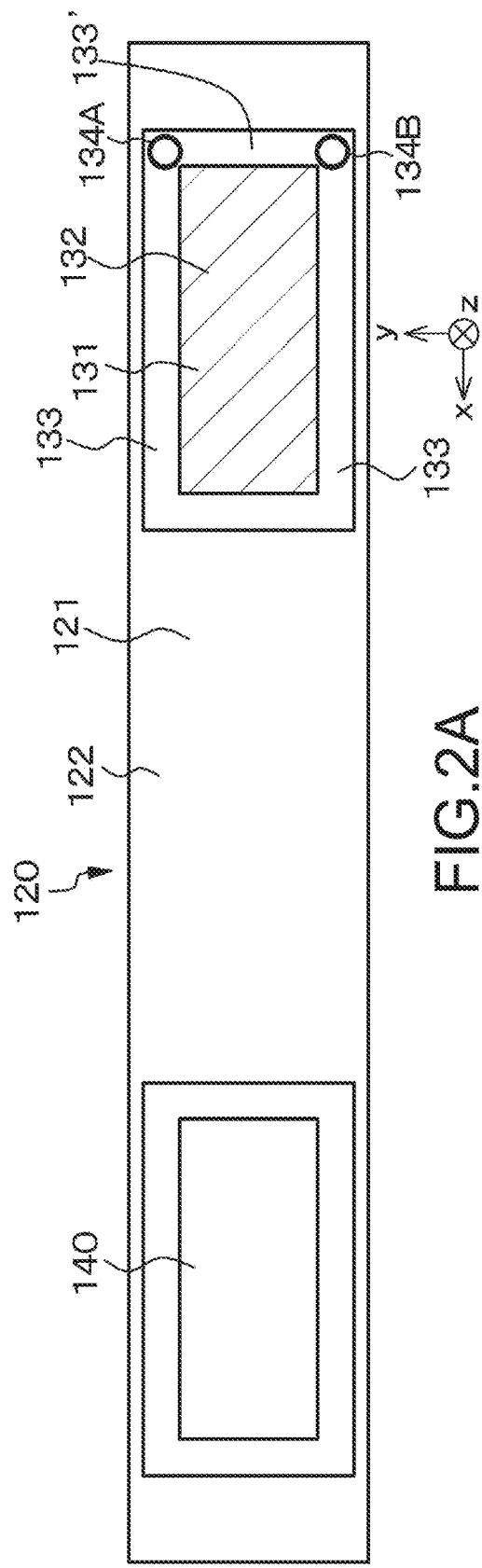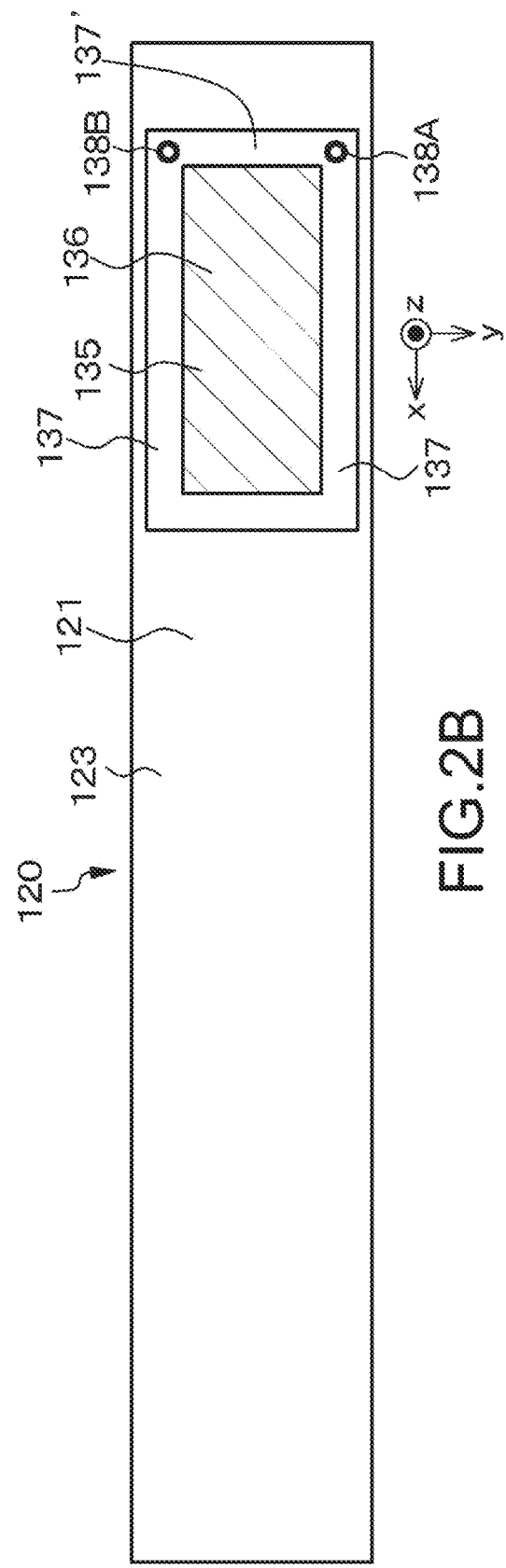

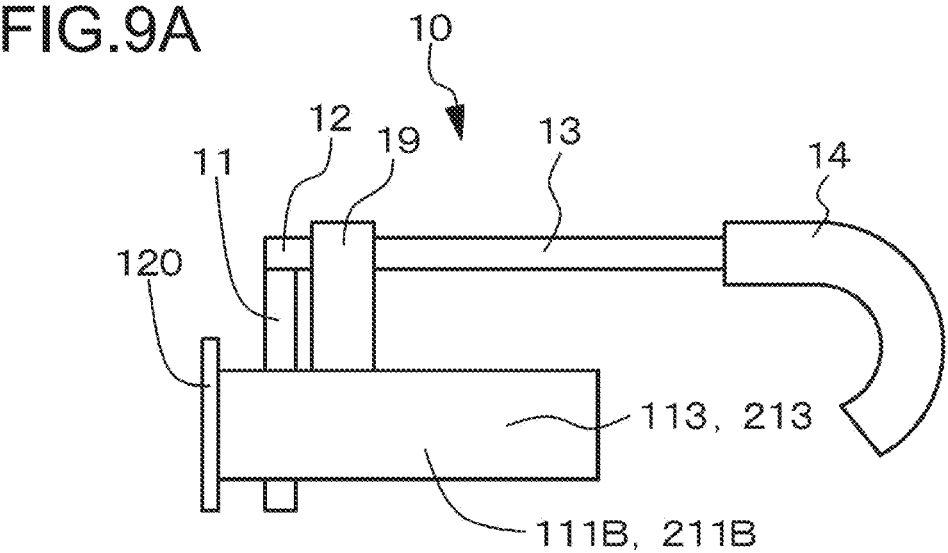
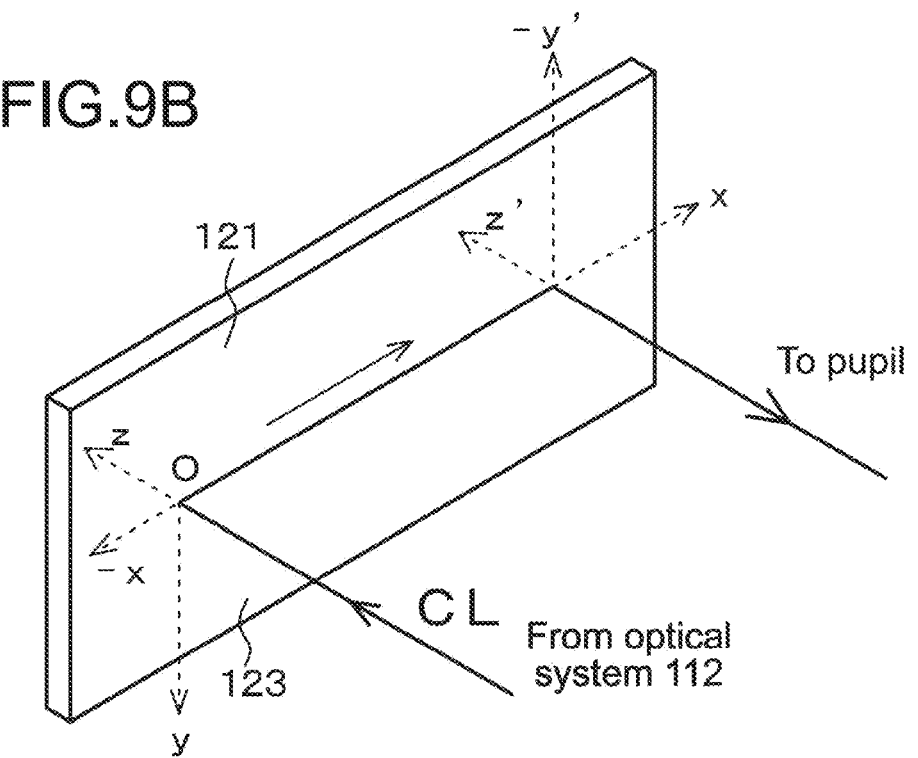

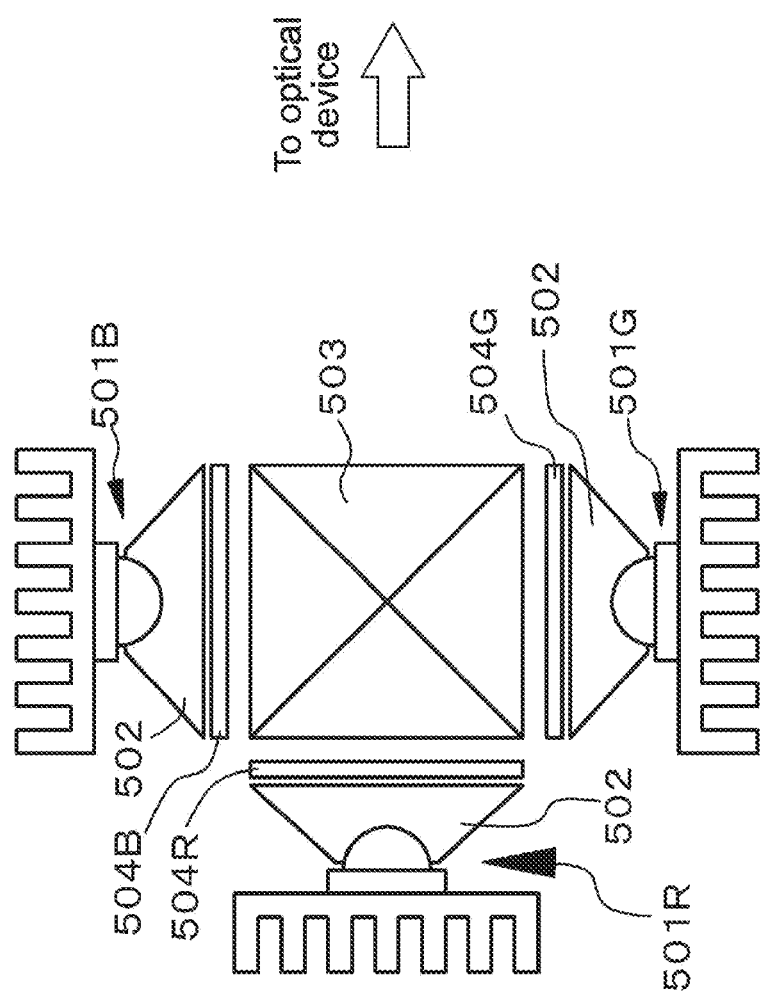

OPTICAL DEVICE, HEAD MOUNTED DISPLAY, ASSEMBLING METHOD FOR THE SAME, HOLOGRAPHIC DIFFRACTION GRATING, DISPLAY DEVICE, AND ALIGNMENT DEVICE

CROSS REFERENCE TO RELATED APPLICATIONS

This application claims the benefit of Japanese Priority Patent Application JP 2014-052043 filed Mar. 14, 2014, the entire contents of which are incorporated herein by reference.

BACKGROUND

The present disclosure relates to an optical device, a head mounted display and an assembling method for the same. More specifically, the present disclosure relates to an optical device and an assembling method for the same in a display device used as, for example, a head mounted display (HMD), and to a holographic diffraction grating, a display device, and an alignment device.

In order for an observer to observe a two-dimensional image formed by an image forming device in an enlarged form by a virtual image optical system, a virtual image display device (image display device) using a holographic diffraction grating is well known. As shown in a conceptual diagram of FIG. 1, an image display device 100 basically includes an image forming device 111, a collimating optical system 112, and an optical device (light guide unit) 120. The image forming device 111 displays an image. The optical device 120 receives light displayed in the image forming device 111 and guides the light to a pupil 21 of an observer. The optical device 120 includes a light guide plate 121, a first diffraction grating member 130, and a second diffraction grating member 140. The first diffraction grating member 130 and the second diffraction grating member 140 are formed of holographic diffraction gratings provided to the light guide plate 121. Light beams output from pixels of the image forming device 111 are input to the collimating optical system 112, and a plurality of parallel light beams whose angles input to the light guide plate 121 by the collimating optical system 112 are different from one another are generated and input to the light guide plate 121. The plurality of parallel light beams are input from a second surface 123 of the light guide plate 121 and then output. A first holographic diffraction grating 131 that forms the first diffraction grating member 130 and the second diffraction grating member 140 are attached to a first surface 122 of the light guide plate 121. Meanwhile, a second holographic diffraction grating 135 that forms the first diffraction grating member 130 is attached to the second surface 123 of the light guide plate 121. The second surface 123 is parallel to the first surface 122 of the light guide plate 121. The details of the image display device 100 described above will be described in Embodiment 1.

In order to assemble the optical device 120 having such a configuration and structure, it is necessary to precisely align the first holographic diffraction grating 131 and the second holographic diffraction grating 135 with each other. In particular, it is important to control and manage parallelism on an extending direction of a first interference fringe formed in the first holographic diffraction grating 131 and an extending direction of a second interference fringe formed in the second holographic diffraction grating 135.

An alignment mark that is formed of an interference fringe or a diffraction grating and provided on one substrate together with a hologram or a diffraction grating is well known from Japanese Patent Application Laid-open No. Hei 09-068705. In a technique disclosed in Japanese Patent Application Laid-open No. Hei 09-068705, images of an alignment mark 14 and an opposing alignment mark 16 are captured by cameras 18 and 19 and displayed on a monitor screen 20. The alignment mark 14 is formed of an interference fringe or a diffraction grating and provided to a hologram 10. The opposing alignment mark 16 is formed of an opaque pattern made of metal or the like and provided to a target substrate 15 that is a substrate for a liquid crystal display device. Subsequently, relative positions of the hologram 10 and the target substrate 15 are adjusted such that the center of an image 14' of the alignment mark 14 and the center of an image 16' of the opposing alignment mark 16 matches each other. It may be possible to form the opposing alignment mark 16 from a transparent phase pattern, like the alignment mark 14.

SUMMARY

In Japanese Patent Application Laid-open No. Hei 09-068705, however, there is no specific description on a position adjusting method, the shape of alignment marks, and a mutual arrangement relationship between alignment marks, in a case where the opposing alignment mark 16 and the alignment mark 14 are formed of the same transparent hologram, that is, in a case where two alignment marks are formed of a transparent hologram.

So, it is desirable to provide an optical device capable of certainly and precisely align two holographic diffraction gratings with each other in an optical device including those two holographic diffraction gratings, an assembling method for the optical device, a holographic diffraction grating that forms the optical device, a display device including the optical device, and an alignment device suitable to execute an assembling method for the optical device.

According to first and second embodiments of the present disclosure, there is provided an assembling method for an optical device, the optical device including (a) a light guide plate configured to output light after the light is input to the light guide plate and propagated inside the light guide plate by total reflection, (b) a first deflection unit configured to deflect the light input to the light guide plate, to totally reflect the light input to the light guide plate inside the light guide plate, and (c) a second deflection unit configured to deflect the light propagated inside the light guide plate by total reflection, to output, from the light guide plate, part of the light propagated inside the light guide plate by total reflection, the first deflection unit including a first holographic diffraction grating and a second holographic diffraction grating, the first holographic diffraction grating including a first interference fringe forming area in which a first interference fringe is formed, the second holographic diffraction grating including a second interference fringe forming area in which a second interference fringe is formed, the first holographic diffraction grating including a first A alignment mark and a first B alignment mark that are provided outside the first interference fringe forming area in an extending direction of the first interference fringe and opposed to each other with the first interference fringe forming area being sandwiched therebetween, the second holographic diffraction grating including a second A alignment mark and a second B alignment mark that are provided outside the second interference fringe forming area in an extending direction of the second interference fringe and opposed to each other with the second interference fringe forming area being sandwiched therebetween.

The assembling method for an optical device according to the first embodiment of the present disclosure includes:

optically detecting the first A alignment mark and the second A alignment mark;

optically detecting the first B alignment mark and the second B alignment mark;

obtaining a first straight line connecting the first A alignment mark and the first B alignment mark;

obtaining a second straight line connecting the second A alignment mark and the second B alignment mark; and relatively aligning the first holographic diffraction grating and the second holographic diffraction grating with each other such that an angle formed by the first straight line and the second straight line when the first straight line and the second straight line are projected onto a virtual plane falls below a prescribed value. Here, the term "total reflection" means internal total reflection or total reflection caused inside the light guide plate.

Further, in the assembling method for an optical device according to the second embodiment of the present disclosure, each of the first A alignment mark and the first B alignment mark includes an interference fringe that is identical to the interference fringe provided to the first interference fringe forming area, and each of the second A alignment mark and the second B alignment mark includes an interference fringe that is identical to the interference fringe provided to the second interference fringe forming area. The assembling method includes with the second holographic diffraction grating being supported by a support, inputting the light from an end surface of the light guide plate to the light guide plate and optically detecting light diffracted and reflected by the first A alignment mark and the first B alignment mark, and inputting the light from an end surface of the support to the support and optically detecting light diffracted and reflected by the second A alignment mark and the second B alignment mark, to relatively align the first holographic diffraction grating and the second holographic diffraction grating with each other.

According to another embodiment of the present disclosure, there is provided a holographic diffraction grating including an interference fringe forming area in which an interference fringe is formed; and two alignment marks that are provided outside the interference fringe forming area in an extending direction of the interference fringe and opposed to each other with the interference fringe forming area being sandwiched therebetween, each of the alignment marks including an interference fringe that is identical to the interference fringe provided to the interference fringe forming area, each of the alignment marks having an annular shape in plan view.

According to another embodiment of the present disclosure, there is provided an optical device including:

(a) a light guide plate configured to output light after the light is input to the light guide plate and propagated inside the light guide plate by total reflection;

(b) a first deflection unit configured to deflect the light input to the light guide plate, to totally reflect the light input to the light guide plate inside the light guide plate; and (c) a second deflection unit configured to deflect the light propagated inside the light guide plate by total reflection, to output, from the light guide plate, part of the light propagated inside the light guide plate by total reflection, the first deflection unit including a first holographic diffraction grating and a second holographic diffraction grating, the first holographic diffraction grating including a first interference fringe forming area in which a first interference fringe is formed, the second holographic diffraction grating including a second interference fringe forming area in which a second interference fringe is formed, the first holographic diffraction grating including a first A alignment mark and a first B alignment mark that are provided outside the first interference fringe forming area in an extending direction of the first interference fringe and opposed to each other with the first interference fringe forming area being sandwiched therebetween, the second holographic diffraction grating including a second A alignment mark and a second B alignment mark that are provided outside the second interference fringe forming area in an extending direction of the second interference fringe and opposed to each other with the second interference fringe forming area being sandwiched therebetween, each of the first A alignment mark and the first B alignment mark including an interference fringe that is identical to the interference fringe provided to the first interference fringe forming area, each of the second A alignment mark and the second B alignment mark including an interference fringe that is identical to the interference fringe provided to the second interference fringe forming area, in a state where a relative alignment of the first holographic diffraction grating and the second holographic diffraction grating is completed, each of the first A alignment mark and the second A alignment mark having a shape for which the first A alignment mark and the second A alignment mark do not overlap and each of the first B alignment mark and the second B alignment mark having a shape for which the first B alignment mark and the second B alignment mark do not overlap, or in the state where the relative alignment of the first holographic diffraction grating and the second holographic diffraction grating is completed, the first A alignment mark and the second A alignment mark being disposed at positions where the first A alignment mark and the second A alignment mark do not overlap and the first B alignment mark and the second B alignment mark being disposed at positions where the first B alignment mark and the second B alignment mark do not overlap.

According to another embodiment of the present disclosure, there is provided a display device including:

(i) a frame mounted onto a head of an observer (for example, eyeglasses-type frame); and (ii) an image display device attached to the frame, the image display device including (A) an image forming device, and (B) an optical device configured to input light output from the image forming device and to output the light. The optical device includes the optical device according to the embodiment of the present disclosure described above.

According to another embodiment of the present disclosure, there is provided an alignment device including:

a stage movable in an X direction, a Y direction, and a Z direction and turnable in an X-Y plane;

a first light source placed on the stage and configured to input light from an end surface of a light guide plate to the light guide plate, a first holographic diffraction grating being disposed on the light guide plate;

a second light source configured to input light from an end surface of a support to the support, the support being configured to support a second holographic diffraction grating above the first holographic diffraction grating;

a first imaging device configured to detect an optical image of a first A alignment mark provided to the first holographic diffraction grating, based on the light that is input from the first light source and diffracted and reflected by the first A alignment mark, and an optical image of a second A alignment mark provided to the second holographic diffraction grating, based on the light that is input from the second light source and diffracted and reflected by the second A alignment mark; and a second imaging device configured to detect an optical image of a first B alignment mark provided to the first holographic diffraction grating, based on the light that is input from the first light source and diffracted and reflected by the first B alignment mark, and an optical image of a second B alignment mark provided to the second holographic diffraction grating, based on the light that is input from the second light source and diffracted and reflected by the second B alignment mark.

In the assembling method for an optical device according to the first embodiment of the present disclosure, a first straight line connecting the first A alignment mark and the first B alignment mark is obtained, a second straight line connecting the second A alignment mark and the second B alignment mark is obtained, and the first holographic diffraction grating and the second holographic diffraction grating are relatively aligned with each other such that an angle formed by the first straight line and the second straight line when the first straight line and the second straight line are projected onto a virtual plane falls below a prescribed value. So, a relative alignment of the first holographic diffraction grating and the second holographic diffraction grating can be performed based on a simplified method. Further, in the assembling method for an optical device according to the second embodiment of the present disclosure, with the second holographic diffraction grating being supported by a support, the light is input from an end surface of the light guide plate to the light guide plate, light diffracted and reflected by the first A alignment mark and the first B alignment mark is optically detected, the light is input from an end surface of the support to the support, and light diffracted and reflected by the second A alignment mark and the second B alignment mark is optically detected. Thus, the first holographic diffraction grating and the second holographic diffraction grating are relatively aligned with each other. So, a relative alignment of the first holographic diffraction grating and the second holographic diffraction grating can be performed based on a simplified method. Moreover, in the holographic diffraction grating according to an embodiment of the present disclosure, each of the alignment marks includes an interference fringe that is identical to the interference fringe provided to the interference fringe forming area, and each of the alignment marks has an annular shape in plan view. In the optical device according to an embodiment of the present disclosure or in the display device according to an embodiment of the present disclosure, in a state where a relative alignment of the first holographic diffraction grating and the second holographic diffraction grating is completed, the shapes of the first A alignment mark, the second A alignment mark, the first B alignment mark, and the second B alignment mark are prescribed, or the arrangement of those alignment marks is prescribed. So, the first holographic diffraction grating and the second holographic diffraction grating can be relatively aligned with each other certainly and easily based on a simplified method. The alignment device according to an embodiment of the present disclosure includes a first light source placed on the stage and configured to input light from an end surface of a light guide plate to the light guide plate, a first holographic diffraction grating being disposed on the light guide plate, and a second light source configured to input light from an end surface of a support to the support, the support being configured to support a second holographic diffraction grating above the first holographic diffraction grating, and thus the alignment marks can be detected certainly, precisely, and easily. It should be noted that the effects described herein are merely exemplary ones and are not limited. Further, additional effects may be produced.

In some embodiments, an optical device is provided, comprising: a light guide comprising an input region and an output region, wherein the light guide is adapted to receive light at the input region and output at least some of the received light at the output region; and at least first and second diffraction gratings, wherein: the first diffraction grating is disposed on a first surface of the light guide, the first surface facing away from a light input, the second diffraction grating is disposed on a second surface of the light guide, the second surface facing towards the light input, the second diffraction grating is disposed at the input region of the light guide and adapted to diffract at least some of the light input into the light guide, and the first diffraction grating is adapted to diffract at least some light transmitted through the light guide back into the light guide.

In some embodiments, a head mounted display is provided, comprising: a light guide comprising an input region and an output region, wherein the light guide is adapted to receive light at the input region and output at least some of the received light at the output region; at least first and second diffraction gratings, wherein: the first diffraction grating is disposed on a first surface of the light guide, the first surface facing away from a light input, the second diffraction grating is disposed on a second surface of the light guide, the second surface facing towards the light input, the second diffraction grating is disposed at the input region of the light guide and adapted to diffract and reflect at least some of the light input into the light guide to be propagated inside the light guide towards the output region, and the first diffraction grating is adapted to diffract and reflect at least some light transmitted through the light guide back into the light guide; alignment marks A1 and B1 associated with the first diffraction grating; and alignment marks A2 and B2 associated with the second diffraction grating.

In some embodiments, a head mounted display is provided, comprising: a light guide; at least first and second diffraction gratings, wherein: the first diffraction grating is disposed on a first surface of the light guide, the first surface facing away from a light input, the second diffraction grating is disposed on a second surface of the light guide, the second surface facing towards the light input, the second diffraction grating is adapted to diffract and reflect at least some of the light input into the light guide to be propagated inside the light, and the first diffraction grating is adapted to diffract and reflect at least some light transmitted through the light guide back into the light guide; alignment marks A1 and B1 associated with the first diffraction grating; and alignment marks A2 and B2 associated with the second diffraction grating.

These and other objects, features and advantages of the present disclosure will become more apparent in light of the following detailed description of best embodiment embodiments thereof, as illustrated in the accompanying drawings.

BRIEF DESCRIPTION OF DRAWINGS

FIGS. 2A and 2B are a schematic diagram showing a light guide plate in the display device of Embodiment 1 when viewed from the opposite side of an observer, and a schematic diagram showing the light guide plate when viewed from the same side as the observer, respectively;

FIGS. 9A and 9B are a schematic diagram of the display device of Embodiment 1 when viewed from a lateral direction and a schematic diagram showing light propagation in the light guide plate that forms the image display device, respectively;

FIG. 22 is a conceptual diagram showing another modification of an image forming device suitable for use in Embodiments 1 to 4.

DETAILED DESCRIPTION OF EMBODIMENTS

Figure 1:
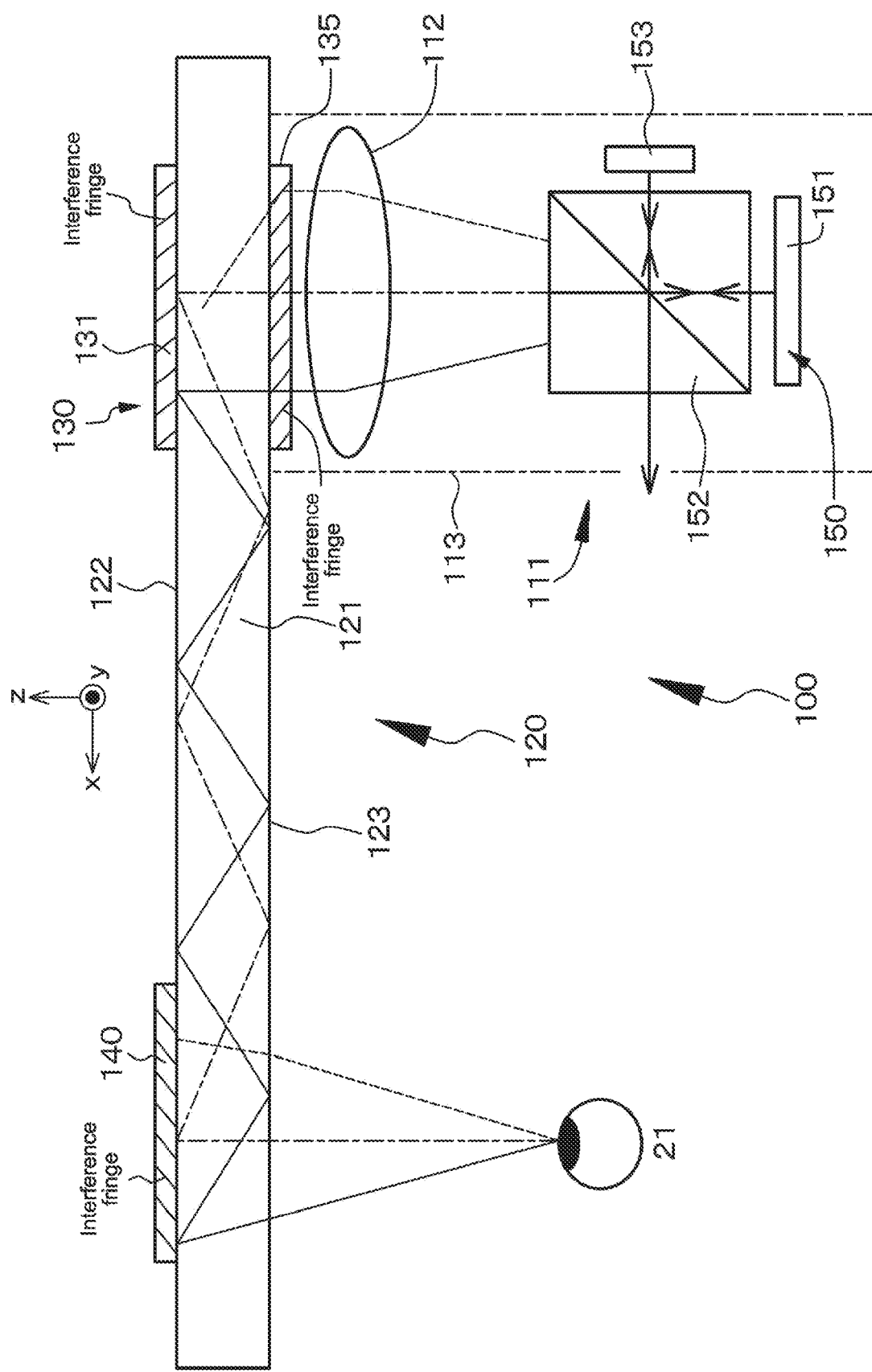
FIG. 1 is a conceptual diagram of an image display device in a display device of Embodiment 1.

Hereinafter, the present disclosure will be described based on embodiments with reference to the drawings but is not limited to the embodiments. Various numerical values and materials in the embodiments are merely exemplary ones. It should be noted that the description is given in the following order.

1. General Description on Optical Device According to Embodiment of Present Disclosure, Assembling Method for Optical Device According to First and Second Embodiments of Present Disclosure, Holographic Diffraction Grating According to Embodiment of Present Disclosure, Display Device According to Embodiment of Present Disclosure, and Alignment Device According to Embodiment of Present Disclosure 2. Embodiment 1 (Optical Device According to Embodiment of Present Disclosure, Assembling Method for Optical Device According to First and Second Embodiments of Present Disclosure, Holographic Diffraction Grating According to Embodiment of Present Disclosure, Display Device According to Embodiment of Present Disclosure, and Alignment Device According to Embodiment of Present Disclosure)

3. Embodiment 2 (Modification of Embodiment 1)

4. Embodiment 3 (Modification of Embodiments 1 and 2)

5. Embodiment 4 (Modification of Embodiment 3) and Others

[General Description on Optical Device According to Embodiment of Present Disclosure, Assembling Method for Optical Device According to First and Second Embodiments of Present Disclosure, Holographic Diffraction Grating According to Embodiment of Present Disclosure, Display Device According to Embodiment of Present Disclosure, and Alignment Device According to Embodiment of Present Disclosure]

In an assembling method for an optical device according to each of first and second embodiments of the present disclosure, the following form can be provided: with a first holographic diffraction grating being disposed on a light guide plate, the first holographic diffraction grating and a second holographic diffraction grating are relatively aligned with each other, and the second holographic diffraction grating is disposed on the light guide plate. In this case, it is desirable to move the light guide plate relative to the second holographic diffraction grating, with the first holographic diffraction grating being disposed on the light guide plate. Further, in those cases, after the first holographic diffraction grating is bonded to or formed on the light guide plate, the first holographic diffraction grating and the second holographic diffraction grating are relatively aligned with each other and the second holographic diffraction grating is bonded to the light guide plate. However, the present disclosure is not limited to the above configurations.

In the assembling method for an optical device according to the first embodiment of the present disclosure including the various desirable forms described above, the following form can be provided: with the second holographic diffraction grating being supported by a support, the first holographic diffraction grating and the second holographic diffraction grating are relatively aligned with each other. In this case, a first A alignment mark and a first B alignment mark are provided with interference fringes that are identical to an interference fringe provided to a first interference fringe forming area, a second A alignment mark and a second B alignment mark are provided with interference fringes that are identical to an interference fringe provided to a second interference fringe forming area, light is input to the light guide plate from an end surface of the light guide plate, the light diffracted and reflected on the first A alignment mark and the first B alignment mark is optically detected, the light is input to the support from an end surface of the light support, and the light diffracted and reflected on the second A alignment mark and the second B alignment mark is optically detected.

Further, in the configuration described above in the assembling method for an optical device according to the first embodiment of the present disclosure or in the assembling method for an optical device according to the second embodiment of the present disclosure including the various desirable forms described above, the following form can be provided: in a state where the relative alignment of the first holographic diffraction grating and the second holographic diffraction grating is completed, each of the first A alignment mark and the second A alignment mark has a shape by which the first A alignment mark and the second A alignment mark do not overlap, and each of the first B alignment mark and the second B alignment mark has a shape for which the first B alignment mark and the second B alignment mark do not overlap. Alternatively, the following form can be provided: in a state where the relative alignment of the first holographic diffraction grating and the second holographic diffraction grating is completed, the first A alignment mark and the second A alignment mark are disposed at positions where the first A alignment mark and the second A alignment mark do not overlap, and the first B alignment mark and the second B alignment mark are disposed at positions where the first B alignment mark and the second B alignment mark do not overlap.

It is desirable to adopt the following form: from a first light source in the assembling method for an optical device according to each of the first and second embodiments of the present disclosure or in an alignment device according to an embodiment of the present disclosure, light beams input to the first A alignment mark and the first B alignment mark are diffracted and reflected on the first A alignment mark and the first B alignment mark, and such light that is output from the light guide plate at an output angle $i_{out}$ is output; and from a second light source, light beams input to the second A alignment mark and the second B alignment mark are diffracted and reflected on the second A alignment mark and the second B alignment mark, and such light that is output from the light guide plate at an output angle $i_{out}$ is output. Here, examples of the output angle $i_{out}$ include 0 degrees. Further, in order to obtain such a state, the wavelength of light output from the first light source and an incident angle on the light guide plate only need to be selected, or in order to obtain such a state, the wavelength of light output from the second light source and an incident angle on the support only need to be selected. Furthermore, it is desirable that parallel light be output from the first light source and parallel light be output from the second light source.

Additionally, in the assembling method for an optical device according to the first and second embodiments of the present disclosure including the various desirable forms and configurations described above, in an optical device according to an embodiment of the present disclosure, and in a display device according to an embodiment of the present disclosure, the following form can be provided: the first A alignment mark and the second A alignment mark are imaged by a first imaging device; and the first B alignment mark and the second B alignment mark are imaged by a second imaging device. The imaging device may be an imaging device having a well-known configuration and structure.

Additionally, in the assembling method for an optical device according to the first and second embodiments of the present disclosure including the various desirable forms and configurations described above, in an optical device according to an embodiment of the present disclosure, and in a display device according to an embodiment of the present disclosure, the following form can be provided: the first holographic diffraction grating is disposed on a first surface of the light guide plate; and the second holographic diffraction grating is disposed on a second surface of the light guide plate, the second surface being opposed to the first surface.

Additionally, in the assembling method for an optical device according to the first and second embodiments of the present disclosure including the various desirable forms and configurations described above, in an optical device according to an embodiment of the present disclosure, and in a display device according to an embodiment of the present disclosure, there can be provided a form satisfying the following expressions:

$$P_1 \neq P_2 \text{ and } \varphi1=\varphi2;$$

$$P_1 = P_2 \text{ and } \varphi1 \neq \varphi2; \text{ or}$$

$$P_1 \neq P_2 \text{ and } \varphi1 \neq \varphi2,$$

where a pitch of the first interference fringe is $P_1$, a slant angle of the first interference fringe is $\varphi_1$, a pitch of the second interference fringe is $P_2$, and a slant angle of the second interference fringe is $\varphi_2$.

Additionally, in the assembling method for an optical device according to the first and second embodiments of the present disclosure including the various desirable forms and configurations described above, in an optical device according to an embodiment of the present disclosure, and in a display device according to an embodiment of the present disclosure, the following form can be provided: the first A alignment mark, the first B alignment mark, the second A alignment mark, and the second B alignment mark are each disposed on an end of the light guide plate.

Additionally, in the assembling method for an optical device according to the first embodiment of the present disclosure including the various desirable forms and configurations described above, it is desirable that the prescribed value have the maximum value of 100 seconds, but the present disclosure is not limited thereto.

Additionally, in the assembling method for an optical device according to the first and second embodiments of the present disclosure including the various desirable forms and configurations described above, in an optical device according to an embodiment of the present disclosure, and in a display device according to an embodiment of the present disclosure, the following form can be provided: the second deflection unit includes a holographic diffraction grating. In this case, it is desirable that the second deflection unit have a diffraction efficiency value that is smaller than a diffraction efficiency value of the first deflection unit. The diffraction efficiency value of the second deflection unit is made smaller than the diffraction efficiency value of the first deflection unit, and thus images observed by an observer along an axis direction of the light guide plate can be made uniform. In order that the diffraction efficiency value of the second deflection unit is made smaller than the diffraction efficiency value of the first deflection unit, for example, the thickness of the holographic diffraction grating that forms the second deflection unit only needs to be made smaller than the thickness of the holographic diffraction grating that forms the first deflection unit. It should be noted that hereinafter the holographic diffraction grating that forms the second deflection unit may be referred to as a "third holographic diffraction grating" for sake of simplicity.

Further, in a holographic diffraction grating according to an embodiment of the present disclosure, the following form can be provided: each alignment mark is provided to the outside of a portion of an interference fringe forming area on the opposite side of a portion of the interference fringe forming area, from which light is output.

In the optical device according to an embodiment of the present disclosure including the various desirable forms and configurations described above, in the assembling method for an optical device according to the first and second embodiments of the present disclosure, in the holographic diffraction grating according to an embodiment of the present disclosure, and in a display device according to an embodiment of the present disclosure, examples of the holographic diffraction grating include a reflection-type volume holographic diffraction grating. The reflection-type volume holographic diffraction grating means a holographic diffraction grating that diffracts and reflects only positive first-order diffracted light. In the first deflection unit, in order that the parallel light input to the light guide plate is totally reflected inside the light guide plate, at least part of the parallel light input to the light guide plate is diffracted and reflected. On the other hand, in the second deflection unit, the parallel light that is propagated inside the light guide plate by total reflection is diffracted and reflected a plurality of times and output from the light guide plate in the state of parallel light.

An optical device assembled by the assembling method for an optical device according to the first and second embodiments of the present disclosure can form a display device such as a head mounted display (HMD), and a display device according to an embodiment of the present disclosure can form a head mounted display (HMD), for example. This allows reduction in weight and downsizing of the display device and allows an uncomfortable feeling when the display device is mounted to be largely reduced. Further, this allows reduction in manufacture costs.

In the display device according to an embodiment of the present disclosure, the optical device can be of a transmissive type or a semi-transmissive type (see-through type). Specifically, at least a part of the optical device, which is opposed to the pupil of the observer, can be made transmissive or semi-transmissive (see-through), and thus a landscape can be viewed through the part of the optical device. The display device may include one image display device (monocular type) or two image display devices (binocular type).

In this specification, the term "semi-transmissive" is used in some cases. This term is used in not a meaning that ½ (50%) of incident light is transmitted or reflected, but a meaning that part of incident light is transmitted and the rest is reflected.

The optical device according to an embodiment of the present disclosure or the display device according to an embodiment of the present disclosure allows monochrome (for example, green) image display. In this case, the angle of view is divided into two, for example (more specifically, into two halves, for example), and the first deflection unit can be formed of a laminate of two holographic diffraction gratings corresponding to respective groups of the angle of view divided into two. Alternatively, in the case of color image display, in order to correspond to diffraction reflection of P types of light beams having different P types (for example, P=3, i.e., three types of red, green, and blue) of wavelength bands (or wavelengths), each of the first deflection unit and the second deflection unit can be a laminate of P layers of holographic diffraction gratings. In this case, for each holographic diffraction grating, an interference fringe corresponding to one type of wavelength band (or wavelength) is formed. Alternatively, for example, the following structure may be adopted: a holographic diffraction grating that causes light having a red wavelength band (or wavelength) to be diffracted and reflected is disposed on the first light guide plate; a holographic diffraction grating that causes light having a green wavelength band (or wavelength) to be diffracted and reflected is disposed on the second light guide plate; a holographic diffraction grating that causes light having a blue wavelength band (or wavelength) to be diffracted and reflected is disposed on the third light guide plate; and those first light guide plate, second light guide plate, and third light guide plate are laminated with gaps therebetween. Adopting this configuration allows an increase in diffraction efficiency when light beams having respective wavelength bands (or wavelengths) are diffracted and reflected in holographic diffraction gratings, an increase in diffraction reception angle, and optimization of diffraction-reflection angle. The lamination of the holographic diffraction gratings may be performed using the alignment device according to an embodiment of the present disclosure based on the assembling method for an optical device according to the first and second embodiments of the present disclosure, and the holographic diffraction grating may be formed of the holographic diffraction grating according to an embodiment of the present disclosure. It is desirable to dispose a protector such that the holographic diffraction grating does not come into direct contact with air.

Examples of material forming the holographic diffraction grating include a photopolymer material. A constituent material and a basic structure of the holographic diffraction grating may be the same as those of a holographic diffraction grating in related art. Although an interference fringe is formed inside and over the surface of the holographic diffraction grating, a method of forming the interference fringe may be the same as a forming method in related art. Specifically, for example, object light may be applied to a member that forms a holographic diffraction grating (for example, photopolymer material) from a first predetermined direction on one side, and reference light may be applied to the member that forms a holographic diffraction grating from a second predetermined direction on the other side at the same time, to record an interference fringe formed by the object light and the reference light in the member that forms a holographic diffraction grating. When the first predetermined direction, the second predetermined direction, and the wavelengths of the object light and the reference light are adequately selected, a desired pitch of interference fringes on the surface of the holographic diffraction grating and a desired slant angle (angle of inclination) of the interference fringes can be obtained. The slant angle of the interference fringe means an angle formed by the surface of the holographic diffraction grating and the interference fringe.

The optical device can be manufactured by the following method, for example.

(A-1) Form a first holographic diffraction grating and a third holographic diffraction grating on a first surface of a substrate for manufacture (that doubles as a support in some cases).

(A-2) Form a second holographic diffraction grating on a second surface of the substrate for manufacture.

(A-3) Transfer the first holographic diffraction grating and the third holographic diffraction grating, which are formed on the first surface of the substrate for manufacture, to a first surface of a light guide plate, and transfer the second holographic diffraction grating, which is formed on the second surface of the substrate for manufacture, to a second surface of the light guide plate.

Alternatively, the optical device can be manufactured by the following method.

(B-1) Form a first holographic diffraction grating and a third holographic diffraction grating on a first surface of a light guide plate.

(B-2) Form a second holographic diffraction grating on a substrate for manufacture (that doubles as a support in some cases).

(B-3) Transfer the second holographic diffraction grating, which is formed on the substrate for manufacture, to a second surface of the light guide plate.

Alternatively, the optical device can be manufactured by the following method.

(C-1) Form a second holographic diffraction grating on a second surface of a light guide plate.

(C-2) Form a first holographic diffraction grating and a third holographic diffraction grating on a substrate for manufacture (that doubles as a support in some cases).

(C-3) Transfer the first holographic diffraction grating and the third holographic diffraction grating, which are formed on the substrate for manufacture, to a first surface of the light guide plate.

Alternatively, the optical device can be manufactured by the following method.

(D-1) Form a first holographic diffraction grating and a third holographic diffraction grating on a first substrate for manufacture.

(D-2) Form a second holographic diffraction grating on a second substrate for manufacture (that doubles as a support in some cases).

(D-3) Transfer the first holographic diffraction grating and the third holographic diffraction grating, which are formed on the first substrate for manufacture, to a first surface of a light guide plate, and transfer the second holographic diffraction grating, which is formed on the second substrate for manufacture, to a second surface of the light guide plate.

Alternatively, the optical device can be manufactured by the following method.

(E-1) Form a first holographic diffraction grating on a first substrate for manufacture.

(E-2) Form a second holographic diffraction grating on a second substrate for manufacture (that doubles as a support in some cases).

(E-3) Form a third holographic diffraction grating on a third substrate for manufacture.

(E-4) Transfer the first holographic diffraction grating formed on the first substrate for manufacture and the third holographic diffraction grating formed on the third substrate for manufacture to a first surface of a light guide plate, and transfer the second holographic diffraction grating formed on the second substrate for manufacture to a second surface of the light guide plate.

In the image display device, the image forming device can have a form including a plurality of pixels arranged in a two-dimensional matrix. It should be noted that the image forming device having such a configuration is referred to as an "image forming device having a first configuration" for sake of simplicity.

Examples of the image forming device having a first configuration include: an image forming device including a reflection-type spatial light modulation device and a light source; an image forming device including a transmissive-type spatial light modulation device and a light source; and an image forming device including a light emitting element such as a light-emitting diode (LED), a semiconductor laser element, an organic EL (Electro Luminescence) element, or an inorganic EL element. Of those, it is desirable to use an image forming device including a reflection-type spatial light modulation device and a light source. Examples of the spatial light modulation device include a light valve, for example, a transmissive-type or reflection-type liquid crystal display device such as an LCOS (Liquid Crystal On Silicon), and a digital micromirror device (DMD). Examples of the light source include the light emitting elements described above. Further, the reflection-type spatial light modulation device can include a liquid crystal display device and a polarizing beam splitter. The polarizing beam splitter reflects part of light from the light source and guides the light to the liquid crystal display device, and causes part of the light reflected by the liquid crystal display device to pass to guide the light to an optical system. Examples of the light emitting element that forms the light source include a red light emitting element, a green light emitting element, a blue light emitting element, and a white light emitting element. Alternatively, red light, green light, and blue light that are output from the red light emitting element, the green light emitting element, and the blue light emitting element, respectively, may be used to achieve color mixture and uniformity in luminance by using a light pipe, to obtain white light. Examples of the light emitting element include a semiconductor laser element, a solid-state laser, and an LED. The number of pixels may be determined based on the specifications requested for the image display device and take specific values such as 320*240, 432*240, 640*480, 854*480, 1024*768, and 1920*1080, for example. A collimating optical system that will be described later has a function of converting position information of a pixel into angle information in an optical system of a light guide unit. Examples of the collimating optical system include an optical system that includes a convex lens, a concave lens, a free-form-surface prism, and a hologram lens independently or in combination and has a positive optical power as a whole.

Alternatively, in the image display device, the image forming device can have a form including a light source and a scanning unit that scans parallel light output from the light source. It should be noted that the image forming device having such a configuration is referred to as an "image forming device having a second configuration" for sake of simplicity.

Examples of the light source in the image forming device having a second configuration include a light emitting element, specifically, a red light emitting element, a green light emitting element, a blue light emitting element, and a white light emitting element. Alternatively, red light, green light, and blue light that are output from the red light emitting element, the green light emitting element, and the blue light emitting element, respectively, may be used to achieve color mixture and uniformity in luminance by using a light pipe, to obtain white light. Examples of the light emitting element include a semiconductor laser element, a solid-state laser, and an LED. The number of pixels (virtual pixels) in the image forming device having a second configuration may also be determined based on the specifications requested for the image display device and take specific values such as 320*240, 432*240, 640*480, 854*480, 1024*768, and 1920*1080, for example. Further, in the case of color image display and in the case where the light source includes a red light emitting element, a green light emitting element, and a blue light emitting element, for example, it is desirable to perform color composition by using a cross prism. Examples of the scanning unit include MEMS (Micro Electro Mechanical Systems) including a micromirror that is rotatable in two-dimensional directions and horizontally and vertically scans light output from the light source, and a galvanometer mirror. A relay optical system that will be described later may be formed of a well-known relay optical system.

In the image forming device having a first configuration or the image forming device having a second configuration, the light that is changed into a plurality of parallel light beams in the optical system is input to the light guide plate. Such an optical system is an optical system in which output light is assumed as parallel light and which is referred to as a "parallel light outputting optical system" in some cases, and specifically, includes a collimating optical system or a relay optical system, for example. In such a manner, being parallel light is requested based on the necessity to preserve light wavefront information obtained when those light beams are input to the light guide plate, even after those light beams are output from the light guide plate via the first deflection unit and the second deflection unit. In order to generate a plurality of parallel light beams, specifically, for example, a light output unit of the image forming device may be provided at a spot (position) of the focal distance in the parallel light outputting optical system, for example. The parallel light outputting optical system has a function of converting position information of a pixel into angle information in the optical system of the optical device. Examples of the parallel light outputting optical system include an optical system that includes a convex lens, a concave lens, a free-form-surface prism, and a hologram lens independently or in combination and has a positive optical power as a whole. A light blocking unit having an opening may be disposed between the parallel light outputting optical system and the light guide plate so as to prevent undesired light from being output from the parallel light outputting optical system and input to the light guide plate.

Alternatively, for example, in addition to a combination of a backlight that emits white light as a whole and a liquid crystal display device including red light emitting pixels, green light emitting pixels, and blue light emitting pixels, examples of the light source or the image forming device including light emitting elements and light valves include the following configurations.

[Image Forming Device A]

An image forming device A includes (α) a first image forming device including a first light emitting panel on which first light emitting elements that emit blue light are arranged in a two-dimensional matrix, (β) a second image forming device including a second light emitting panel on which second light emitting elements that emit green light are arranged in a two-dimensional matrix, (γ) a third image forming device including a third light emitting panel on which third light emitting elements that emit red light are arranged in a two-dimensional matrix, and (δ) a unit for collecting light beams output from the first image forming device, the second image forming device, and the third image forming device into one optical path (for example, the unit corresponds to a dichroic prism; the same holds true for the following description), in which the light-emitting/non-light-emitting states of the first light emitting elements, the second light emitting elements, and the third light emitting elements are controlled.

[Image Forming Device B]

An image forming device B includes (α) a first image forming device including a first light emitting element that emits blue light, and a first light passage control device for controlling the passage/non-passage of output light output from the first light emitting element that emits blue light, the first light passage control device being a kind of light valve and including a liquid crystal display device, a digital micromirror device (DMD), and a LCOS, for example; the same holds true for the following description, (β) a second image forming device including a second light emitting element that emits green light, and a second light passage control device (light valve) for controlling the passage/non-passage of output light output from the second light emitting element that emits green light, (γ) a third image forming device including a third light emitting element that emits red light, and a third light passage control device (light valve) for controlling the passage/non-passage of output light output from the third light emitting element that emits red light, and (δ) a unit for collecting light beams passing through the first light passage control device, the second light passage control device, and the third light passage control device into one optical path, in which the passage/non-passage of the output light beams output from those light emitting elements is controlled by the light passage control devices, and thus an image is displayed. Examples of units for leading the output light beams output from the first light emitting element, the second light emitting element, and the third light emitting element (i.e., light leading members) include light guide members, microlens arrays, mirrors or reflective plates, and condenser lenses.

[Image Forming Device C]

An image forming device C includes (α) a first image forming device including a first light emitting panel on which first light emitting elements that emit blue light are arranged in a two-dimensional matrix, and a blue light passage control device (light valve) for controlling the passage/non-passage of output light output from the first light emitting panel, (β) a second image forming device including a second light emitting panel on which second light emitting elements that emit green light are arranged in a two-dimensional matrix, and a green light passage control device (light valve) for controlling the passage/non-passage of output light output from the second light emitting panel, (γ) a third image forming device including a third light emitting panel on which third light emitting elements that emit red light are arranged in a two-dimensional matrix, and a red light passage control device (light valve) for controlling the passage/non-passage of output light output from the third light emitting panel, and (δ) a unit for collecting light beams passing through the blue light passage control device, the green light passage control device, and the red light passage control device into one optical path, in which the passage/non-passage of the output light beams output from those first light emitting panel, second light emitting panel, and third light emitting panel is controlled by the light passage control devices (light valves), and thus an image is displayed.

[Image Forming Device D]

An image forming device D, which is an image forming device for color display of a field sequential system, includes (α) a first image forming device including a first light emitting element that emits blue light, (β) a second image forming device including a second light emitting element that emits green light, (γ) a third image forming device including a third light emitting element that emits red light, (δ) a unit for collecting light beams output from the first image forming device, the second image forming device, and the third image forming device into one optical path, and (ε) a light passage control device (light valve) for controlling the passage/non-passage of the light output from the unit for collecting light beams into one optical path, in which the passage/non-passage of the output light beams output from those light emitting elements is controlled by the light passage control devices, and thus an image is displayed.

[Image Forming Device E]

An image forming device E, which is also an image forming device for color display of a field sequential system, includes (α) a first image forming device including a first light emitting panel on which first light emitting elements that emit blue light are arranged in a two-dimensional matrix, (β) a second image forming device including a second light emitting panel on which second light emitting elements that emit green light are arranged in a two-dimensional matrix, (γ) a third image forming device including a third light emitting panel on which third light emitting elements that emit red light are arranged in a two-dimensional matrix, (δ) a unit for collecting light beams output from the respective first image forming device, second image forming device, and third image forming device into one optical path, and (ε) a light passage control device (light valve) for controlling the passage/non-passage of the light output from the unit for collecting light beams into one optical path, in which the passage/non-passage of the output light beams output from those light emitting panels is controlled by the light passage control device, and thus an image is displayed.

[Image Forming Device F]

An image forming device F is an image forming device for color display of a passive matrix type or an active matrix type in which an image is displayed by controlling the light-emitting/non-light-emitting states of first light emitting elements, second light emitting elements, and third light emitting elements.

[Image Forming Device G]

An image forming device G, which is an image forming device for color display of a field sequential system, includes light passage control devices (light valves) for controlling the passage/non-passage of output light beams from light emitting element units arranged in a two-dimensional matrix, in which the light-emitting/non-light-emitting states of first light emitting elements, second light emitting elements, and third light emitting elements in the light emitting element units are controlled on a time division basis, and further the passage/non-passage of the output light beams output from the first light emitting elements, second light emitting elements, and third light emitting elements is controlled by the light passage control devices, and thus an image is displayed.

The light guide plate has two parallel surfaces (first surface and second surface) extending parallel to the axis of the light guide plate (the axis corresponds to a longitudinal direction or horizontal direction and is referred to as an "x axis" for sake of simplicity). It should be noted that the width direction of the light guide plate, which corresponds to a height direction or a vertical direction, is referred to as a "y axis" for sake of simplicity. Assuming that a surface of the light guide plate, to which light is input, is an input surface of the light guide plate, and a surface of the light guide plate, from which light is output, is an output surface of the light guide plate, the input surface of the light guide plate and the output surface of the light guide plate may be formed of the second surface. Alternatively, the input surface of the light guide plate may be formed of the first surface, and the output surface of the light guide plate may be formed of the second surface. The interference fringe of the holographic diffraction grating extends substantially parallel to the y axis.

The first A alignment mark and the first B alignment mark are provided to the outside of the first interference fringe forming area in an extending direction of the first interference fringe so as to be opposed to each other while sandwiching the first interference fringe forming area therebetween. Specifically, however, the first A alignment mark and the first B alignment mark may be included in a projected image onto an x-z plane of the first interference fringe forming area or may be included in a projected image onto an x-z plane of a part of the first holographic diffraction grating on the end of the light guide plate in relation to the first interference fringe forming area (for sake of simplicity, the part is referred to as an "end area of the first holographic diffraction grating" in some cases). Similarly, the second A alignment mark and the second B alignment mark are provided to the outside of the second interference fringe forming area in an extending direction of the second interference fringe so as to be opposed to each other while sandwiching the second interference fringe forming area. Specifically, however, the second A alignment mark and the second B alignment mark may be included in a projected image onto an x-z plane of the second interference fringe forming area or may be included in a projected image onto an x-z plane of a part of the second holographic diffraction grating on the end of the light guide plate in relation to the second interference fringe forming area (for sake of simplicity, the part is referred to as an "end area of the second holographic diffraction grating" in some cases).

Examples of the material forming the light guide plate include glasses including an optical glass such as a quartz glass or BK7, and plastic materials (for example, PMMA (poly methyl methacrylate), polycarbonate resin, acrylic resin, amorphous polypropylene resin, and styrene resin including AS resin (acrylonitrile styrene copolymer)). The shape of the light guide plate is not limited to be a flat shape and may be a curved shape. Examples of the material forming the support include a material forming the light guide plate, other plastic films, and dicing tapes (dicing films).

In the display device according to an embodiment of the present disclosure, a frame includes a front portion disposed on the front of the observer, and two temple portions turnably attached to both ends of the front portion via hinges. It should be noted that earpiece portions are attached to the tip ends of the respective temple portions. The image display device is attached to the frame. Specifically, for example, the image forming device only needs to be attached to the temple portion. Further, a configuration in which the front portion and the two temple portions are incorporated can be adopted. In other words, when the whole of the display device according to an embodiment of the present disclosure is viewed, generally, the frame has substantially the same structure as that of normal eyeglasses. The materials forming the frame including a pad portion can be the same as materials forming normal eyeglasses, such as metals, alloys, plastics, and combinations thereof. Furthermore, a configuration in which nose pads are attached to the front portion can be adopted. In other words, when the whole of the display device according to an embodiment of the present disclosure is viewed, an assembled body of the frame and the nose pads has substantially the same structure as that of normal eyeglasses, except for the absence of a rim. The nose pads can have a well-known configuration and structure.

Besides, in the display device according to an embodiment of the present disclosure, it is desirable to adopt a form in which wires (signal line, power supply line, etc.) extending from one or two image forming devices are extended from the tip ends of the earpiece portions to the outside through the inside of the temple portions and the earpiece portions and are connected to a control device (control circuit or control unit), from the viewpoint of design or ease of mounting. Further, each image forming device includes a headphone portion and can have a form in which headphone portion wires, which extend from the respective image forming devices, are extended from the tip ends of the earpiece portions to the headphone portions through the inside of the temple portions and the earpiece portions. Examples of the headphone portion include an inner ear type headphone portion and a canal type headphone portion. More specifically, it is desirable to adopt a form in which the headphone portion wire is extended to the headphone portion so as to run around the rear side of a pinna (auricle) from the tip end of the earpiece portion.

It is possible to adopt a form in which an imaging device is attached to the center part of the front portion. Specifically, the imaging device includes a solid-state imaging device, which has a CCD (Charge Coupled Device) or a CMOS (Complementary Metal Oxide Semiconductor) sensor, and a lens, for example. The wiring from the imaging device only needs to be connected to one image display device (or image forming device) via the front portion for example, and only needs to be further included in wiring extending from the image display device (or image forming device).

A light beam that is output from the center of the image forming device and passes through a nodal point on the image forming device side of the optical system is referred to as a "central light beam", and a light beam in the central light beam, which is vertically input to the optical device, is referred to as a "central incident light beam". It is assumed that a point at which the central incident light beam is input to the optical device is an optical device central point, an axis that passes through the optical device central point and is parallel to the axis direction of the optical device is an x axis, and an axis that passes through the optical device central point and coincides with the normal line of the optical device is an z axis. The horizontal direction in the display device according to an embodiment of the present disclosure is a direction that is parallel to the x axis, and is hereinafter referred to as an "x-axis direction" in some cases. Here, the optical system is disposed between the image forming device and the optical device and changes light output from the image forming device into parallel light. Subsequently, a light flux changed into the parallel light in the optical system is input to the optical device, guided to the optical device, and output from the optical device. Further, the central point of the first deflection unit is referred to as an "optical device central point".

Alternatively, in the case where the display device is of a binocular type, the display device can have the following configuration: the light guide plate is disposed on the center of the observer's face in relation to the image forming device as a whole; a connection member to connect two image display devices is further provided; the connection member is attached to one side of the frame, which faces the observer at the central part located between two pupils of the observer; and a projected image of the connection member is included in a projected image of the frame.

In such a manner, with the structure in which the connection member is attached to the central part of the frame that is located between the two pupils of the observer, i.e., without the structure in which the image display devices are directly attached to the frame, when the frame is mounted onto the head of the observer, the temple portions are expanded outwards. As a result, if the frame is deformed, such a deformation of the frame does not cause a displacement (positional change) of the image forming device or the light guide plate, or causes little displacement, if any. For that reason, the angle of convergence of left and right images can be certainly prevented from being changed. Moreover, since it is unnecessary to enhance the rigidity of the front portion of the frame, it is possible to avoid causing an increase in weight of the frame, lowering in design quality, and a rise in cost. Besides, since the image display devices are not attached directly to the eyeglasses-type frame, the design, color, and the like of the frame can be freely selected according to the observer's preference, and thus there are few restrictions imposed on the design of the frame and the degree of freedom on a design basis is high. In addition, the connecting member is disposed between the observer and the frame, and, moreover, the projected image of the connecting member is included in the projected image of the frame. In other words, when the head mounted display is viewed from the front of the observer, the connecting member is hidden behind the frame. So, a high design quality can be given to the head mounted display.

It is desirable that the connection member be attached to the side, facing the observer, of the central part of the front portion located between the two pupils of the observer. The part corresponds to a bridge portion in normal eyeglasses.

The two image display devices are connected to each other with the connection member. Specifically, the following form is provided: the image forming devices are attached to both ends of the connection member such that the mounting state can be adjusted. In this case, it is desirable that each of the image forming devices be located on the outside in relation to the pupil of the observer. In such a configuration, furthermore, it is desirable to satisfy:

$0.01*L \leq \alpha \leq 0.30*L$, desirably $0.05*L \leq \alpha \leq 0.25*L$;

$0.35*L \leq \beta \leq 0.65*L$, desirably $0.45*L \leq \beta \leq 0.55*L$; and $0.70*L \leq \gamma \leq 0.99*L$, desirably $0.75*L \leq \gamma \leq 0.95*L$, where a distance from the center of the mounting portion of one image forming device to one end of the frame (an endpiece on one side) is represented by $\alpha$, a distance from the center of the connection member to the one end of the frame (the endpiece on the one side) is represented by $\beta$, a distance from the center of the mounting portion of the other image forming device to the one end of the frame (the endpiece on the one side) is represented by $\gamma$, and the length of the frame is represented by L. The mounting of the image forming devices to both ends of the connection member is specifically performed as follows, for example: three through-holes are provided at three positions of each of the ends of the connection member; screw-engagement portions corresponding to the through-holes are provided to the image forming devices; and screws are inserted into the respective through-holes and screwed into the screw-engagement portions provided to the image forming devices. A spring is inserted between each screw and a corresponding screw-engagement portion. In such a manner, the mounting state of the image forming devices (inclination of the image forming devices with respect to the connection member) can be adjusted based on the fastening state of the screws.

Here, the center of the mounting portion of the image forming device indicates a bisection point, along the axial direction of the frame, of a portion where a projected image of the image forming device, which is obtained by projecting the image forming device and the frame onto a virtual plane, is superimposed on a projected image of the frame, in the state where the image forming device is attached to the connection member. Further, the center of the connection member indicates a bisection point, along the axis direction of the frame, of a portion where the connection member is in contact with the frame, in the state where the connection member is attached to the frame. The length of the frame indicates the length of the projected image of the frame, in the case where the frame is curved. It should be noted that a projection direction is a direction vertical to the observer's face.

Alternatively, the two image display devices are connected to each other with the connection member, and specifically, the following form can be adopted: two light guide plates are connected to each other with the connection member. There is a case where the two light guide plates are integrally manufactured, and in such a case, the connection member is attached to such a light guide plate integrally manufactured. Such a form is also included in the form in which the connection member connects the two light guide plates to each other. Assuming that a distance from the center of one of the image forming devices to one end of the frame is $\alpha'$ and a distance from the center of the other one of the image forming devices to the one end of the frame is $\gamma'$, the values of $\alpha'$ and $\gamma'$ are desirably set to the same as the values of $\alpha$ and $\gamma$ described above. It should be noted that the center of the image forming device indicates a bisection point, along the axis direction of the frame, of a portion where a projected image of the image forming device, which is obtained by projecting the image forming device and the frame onto a virtual plane, is superimposed on a projected image of the frame, in the state where the image forming device is attached to the light guide plate.

The shape of the connection member is substantially optional as long as the projected image of the connection member is included in the projected image of the frame. Examples of the shape of the connection member include bar-like shapes and strip-like shapes. Examples of the material forming the connecting member include metals, alloys, plastics, and combinations thereof.

Embodiment 1

Embodiment 1 relates to an optical device according to an embodiment of the present disclosure, an assembling method for an optical device according to each of the first and second embodiments of the present disclosure, a holographic diffraction grating according to an embodiment of the present disclosure, a display device (specifically, head mounted display (HMD)) according to an embodiment of the present disclosure, and an alignment device according to an embodiment of the present disclosure. FIG. 1 is a conceptual diagram of an image display device in a display device according to an embodiment of Embodiment 1. FIGS. 2A and 2B are a schematic diagram showing a light guide plate in the display device of Embodiment 1 when viewed from the opposite side of an observer, and a schematic diagram showing the light guide plate when viewed from the same side as the observer, respectively. It should be noted that in FIGS. 2A and 2B, to clearly specify a first interference fringe forming area and a second interference fringe forming area, the first interference fringe forming area and the second interference fringe forming area are hatched.

Figure 6:
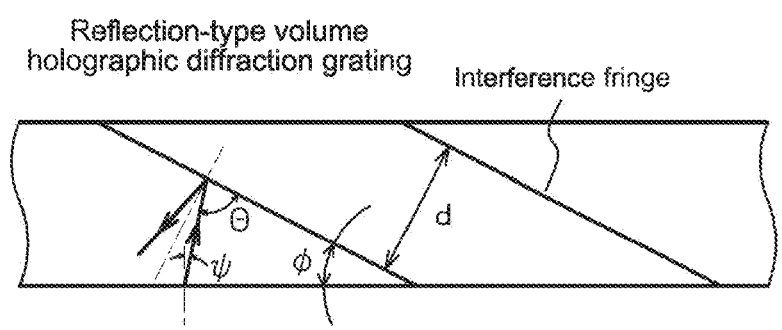
FIG. 6 is a schematic cross-sectional view of a reflection-type volume holographic diffraction grating in a partially enlarged form in the display device of Embodiment 1.
Figure 7:
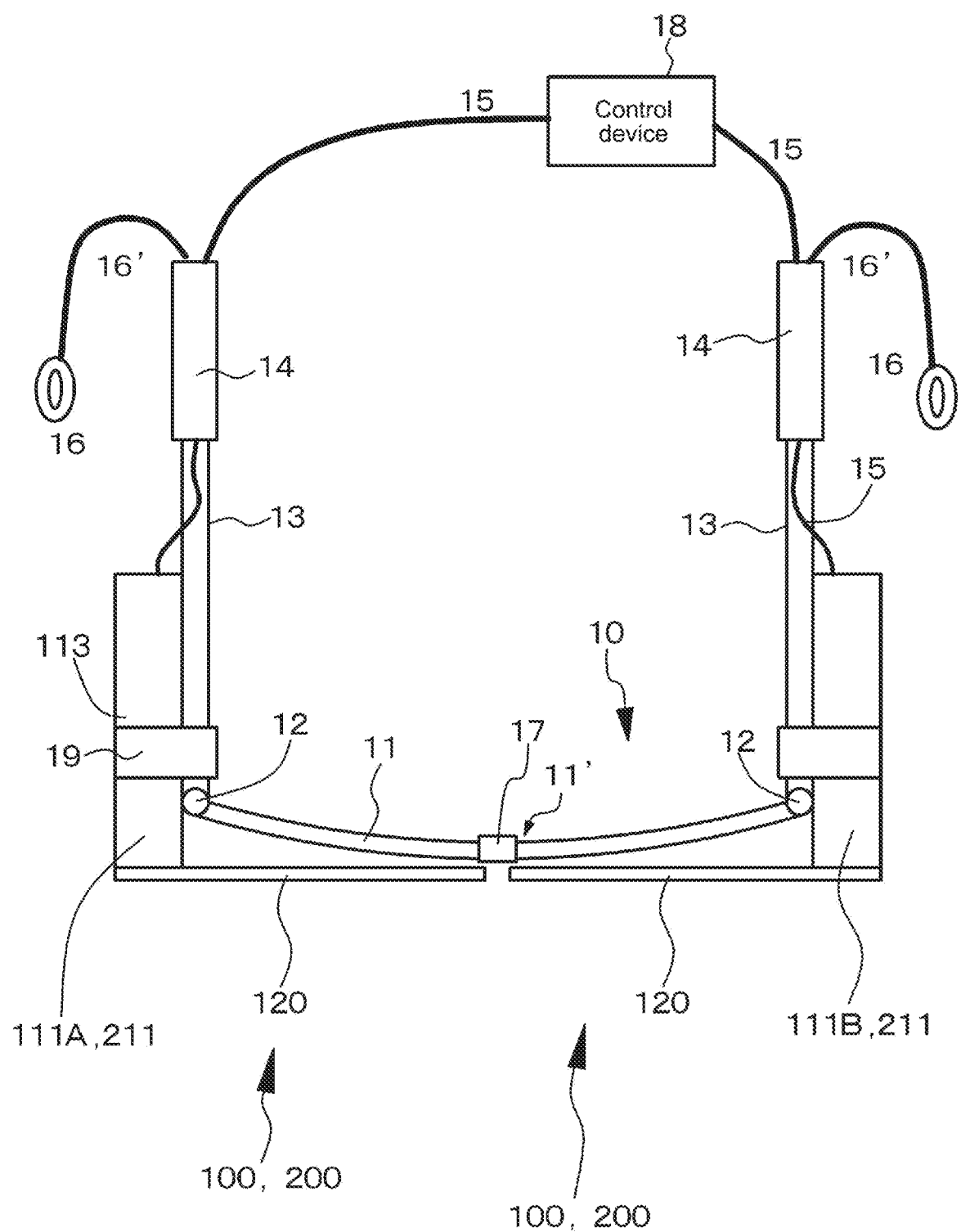
FIG. 7 is a schematic diagram of the display device of Embodiment 1 when viewed from above.
Figure 8:
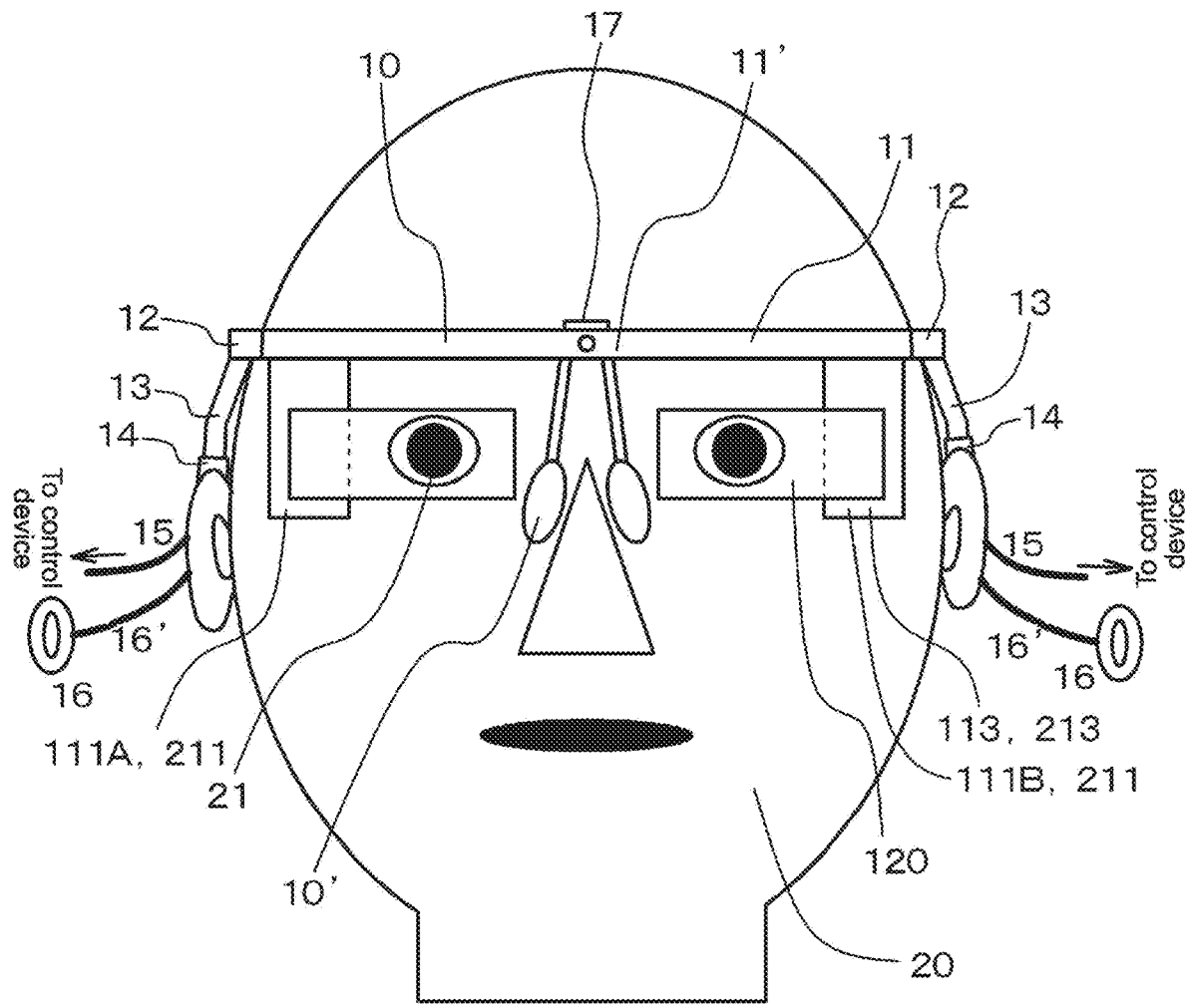
FIG. 8 is a schematic diagram of the display device of Embodiment 1 when viewed from the front.

Further, FIG. 6 is a schematic cross-sectional view of a reflection-type volume holographic diffraction grating in a partially enlarged form in the display device of Embodiment 1. FIG. 7 is a schematic diagram of the display device of Embodiment 1 when viewed from above. FIG. 8 is a schematic diagram of the display device of Embodiment 1 when viewed from the front. FIG. 9A is a schematic diagram of the display device of Embodiment 1 when viewed from a lateral direction. FIG. 9B is a schematic diagram showing light propagation in the light guide plate that forms the image display device.

More specifically, the display device according to Embodiment 1 or Embodiment 2 that will be described later is a head mounted display (HMD) including (i) a frame (for example, eyeglasses-type frame 10) mounted onto the head of an observer 20, and (ii) image display devices 100 and 200 attached to the frame 10. Further, each of the image display devices 100 and 200 according to Embodiment 1 and Embodiment 2 that will be described later includes (A) image forming devices 111, 111A, 111B, and 211, (B) optical devices (light guide units) to and from which light output from the image forming devices 111, 111A, 111B, and 211 is input and output, and (C) optical systems (parallel light outputting optical systems) 112 and 254 that change light output from the image forming devices 111 and 211 into parallel light, in which a light flux changed into the parallel light in the optical systems 112 and 254 is input to the optical device 120 and output. The optical device includes the optical device 120 according to Embodiment 1. Specifically, the display device according to Embodiment 1 or Embodiment 2 that will be described later is of a binocular type including two image display devices, but may be of a monocular type including one image display device. The image forming devices 111 and 211 display a monochrome (for example, green) image, for example.

The image display devices 100 and 200 may be attached to the frame 10 in a fixed manner or detachably. The optical systems 112 and 254 are disposed between the image forming devices 111 and 211 and the optical device 120. The light fluxes changed into the parallel light in the optical systems 112 and 254 are input to the optical device 120 and output. Further, the optical device 120 is a semi-transmissive type (see-through type). Specifically, portions of the optical devices, which are opposed to at least the both eyes of the observer 20 (more specifically, light guide plate 121 and second deflection unit 140 that will be described later), are semi-transmissive (see-through).

In Embodiment 1 or Embodiment 2 that will be described later, in a light beam (central incident light beam CL) that is output from the center of each of the image forming devices 111 and 211 and passes through a nodal point on the image forming device side of each of the optical systems 112 and 254, it is assumed that a point at which the central incident light beam vertically input to the optical device 120 is input to the optical device 120 is an optical device central point O, an axis that passes through the optical device central point O and is parallel to the axis direction of the optical device 120 is a y axis, and an axis that passes through the optical device central point O and coincides with the normal line of the optical device 120 is a z axis. It should be noted that the central point of the first deflection unit 130 is the optical device central point O. In other words, as shown in FIG. 9B, in the image display devices 100 and 200, the central incident light beam CL that is output from the center of each of the image forming devices 111 and 211 and passes through a nodal point on the image forming device side of each of the optical systems 112 and 254 vertically impinges on the light guide plate 121. In other words, the central incident light beam CL is input to the light guide plate 121 at an incident angle of 0 degrees. In this case, the center of the displayed image coincides with a direction of a perpendicular of the second surface 123 of the light guide plate 121.

In the optical device according to an embodiment of the present disclosure, the optical device in the display device according to an embodiment of the present disclosure, and the assembling method for an optical device according to the first and second embodiments of the present disclosure, the optical device 120 according to Embodiment 1 or Embodiment 2 that will be described later includes (a) a light guide plate 121 configured to output light after the light is input to the light guide plate and propagated inside the light guide plate by total reflection, (b) a first deflection unit 130 configured to deflect the light input to the light guide plate 121, to totally reflect the light input to the light guide plate 121 inside the light guide plate 121, and (c) a second deflection unit 140 configured to deflect the light propagated inside the light guide plate 121 by total reflection, to output, from the light guide plate 121, part of the light propagated inside the light guide plate 121 by total reflection. Here, each of the first deflection unit 130 and the second deflection unit 140 is formed of a reflection-type volume holographic diffraction grating. In other words, the first deflection unit 130 and the second deflection unit 140 function as a kind of a semi-transmissive mirror.

Furthermore, the first deflection unit 130 is formed of a first holographic diffraction grating 131 and a second holographic diffraction grating 135. The first holographic diffraction grating 131 includes a first interference fringe forming area 132 in which a first interference fringe is formed. The second holographic diffraction grating 135 includes a second interference fringe forming area 136 in which a second interference fringe is formed.

Further, the first holographic diffraction grating 131 is provided with a first A alignment mark 134A and a first B alignment mark 134B, which are provided on an outer side 133 of the first interference fringe forming area 132 in an extending direction of the first interference fringe so as to be opposed to each other while sandwiching the first interference fringe forming area 132 therebetween. On the other hand, the second holographic diffraction grating 135 is provided with a second A alignment mark 138A and a second B alignment mark 138B, which are provided on an outer side 137 of the second interference fringe forming area 136 in an extending direction of the second interference fringe so as to be opposed to each other while sandwiching the second interference fringe forming area 136 therebetween. Further, the first A alignment mark 134A and the first B alignment mark 134B are each provided with an interference fringe that is identical to that of the first interference fringe forming area 132, and the second A alignment mark 138A and the second B alignment mark 138B are each provided with an interference fringe that is identical to that of the second interference fringe forming area 136.

Further, in the optical device according to an embodiment of the present disclosure and in the display device according to an embodiment of the present disclosure, in a state where the relative alignment of the first holographic diffraction grating 131 and the second holographic diffraction grating 135 is completed, each of the first A alignment mark 134A and the second A alignment mark 138A has a shape for which the first A alignment mark 134A and the second A alignment mark 138A do not overlap, and each of the first B alignment mark 134B and the second B alignment mark 138B has a shape for which the first B alignment mark 134B and the second B alignment mark 138B do not overlap. Alternatively, simultaneously, in a state where the relative alignment of the first holographic diffraction grating 131 and the second holographic diffraction grating 135 is completed, the first A alignment mark 134A and the second A alignment mark 138A are disposed at positions where the first A alignment mark 134A and the second A alignment mark 138A do not overlap, and the first B alignment mark 134B and the second B alignment mark 138B are disposed at positions where the first B alignment mark 134B and the second B alignment mark 138B do not overlap.

In Embodiment 1 or Embodiment 2 that will be described later, the first deflection unit 130 is disposed on each of the first surface 122 and the second surface 123 of the light guide plate 121, and the second deflection unit 140 formed of the third holographic diffraction grating is disposed on the first surface 122 of the light guide plate 121. In other words, the first holographic diffraction grating 131 is disposed on the first surface 122 of the light guide plate 121, and the second holographic diffraction grating 135 is disposed on the second surface 123 that is opposed to the first surface 122 of the light guide plate 121. The first deflection unit 130 diffracts and reflects at least part of the light input to the light guide plate 121 such that the parallel light input to the light guide plate 121 is totally reflected inside the light guide plate 121. The second deflection unit 140 diffracts and reflects the light propagated inside the light guide plate 121 by total reflection a plurality of times and outputs the light in the state of parallel light from the second surface 123 of the light guide plate 121. In the first deflection unit 130, in order that the parallel light input to the light guide plate 121 is totally reflected inside the light guide plate 121, the parallel light input to the light guide plate 121 is diffracted and reflected. On the other hand, in the second deflection unit 140, the parallel light that is propagated inside the light guide plate 121 by total reflection is diffracted and reflected a plurality of times and output toward the pupil 21 of the observer 20 from the light guide plate 121 in the state of parallel light. The diffraction efficiency value of the second deflection unit 140 is smaller than the diffraction efficiency value of the first deflection unit 130. Specifically, the thickness of the third holographic diffraction grating that forms the second deflection unit 140 is smaller than the thickness of the first holographic diffraction grating 131 and the second holographic diffraction grating 135, each of which forms the first deflection unit 130.

In Embodiment 1 or Embodiment 2 that will be described later, assuming that a pitch of the first interference fringe formed in the first holographic diffraction grating 131 is $P_1$, a slant angle is $\varphi_1$, a pitch of the second interference fringe formed in the second holographic diffraction grating 135 is $P_2$, and a slant angle is $\varphi_2$, for example, the following relationships are established: $P_1=P_2$ and $\varphi_1 \neq \varphi_2$. For that reason, light having the same wavelength is diffracted and reflected in the first interference fringe and the second interference fringe, but the incident angle at which the diffraction efficiency becomes the maximum differs, that is, an incident angle on the first holographic diffraction grating 131 and an incident angle on the second holographic diffraction grating 135 are different. Thus, the diffraction-reflection angle at which a light intensity of the diffracted and reflected light reaches a peak differs from each other. Further, the first A alignment mark 134A, the first B alignment mark 134B, the second A alignment mark 138A, and the second B alignment mark 138B are disposed on the end of the light guide plate 121.

As in the display device according to Embodiment 1, in the case of monochrome (for example, green) image display, it is desirable that the angle of view be divided into two, for example (into two halves, for example) and the first deflection unit 130 be formed of a laminate of the two holographic diffraction gratings 131 and 135 corresponding to respective groups of the angle of view divided into two. In other words, assuming that in the parallel light that is input to the light guide plate 121, the angle of view of the parallel light that is input at an angle of a direction approaching the second deflection unit 140 is a negative angle of view and the angle of view of the parallel light that is input at an angle of a direction moving apart from the second deflection unit 140 is a positive angle of view, for example, the parallel light having the positive angle of view is diffracted and reflected mainly by the first holographic diffraction grating 131, and the parallel light having the negative angle of view is diffracted and reflected mainly by the second holographic diffraction grating 135. In such a manner, the first holographic diffraction grating 131 and the second holographic diffraction grating 135 diffract and reflect light having the same wavelength but mainly have different incident angles at which the diffracted and reflected light is input to the first holographic diffraction grating 131 and the second holographic diffraction grating 135. When such first holographic diffraction grating 131 and second holographic diffraction grating 135 are laminated with the light guide plate 121 therebetween, it is possible to increase a diffraction efficiency, increase a diffraction reception angle, and optimize a diffraction-reflection angle when light having a predetermined wavelength band (or wavelength) is diffracted and reflected in the holographic diffraction gratings.

It should be noted that conditions (wavelength, incident angle, and pitch of a lattice plane) of the parallel light having the positive angle of view satisfy a Bragg's condition in which a diffraction reflection occurs in the first holographic diffraction grating 131, but do not satisfy a Bragg's condition in which a diffraction reflection occurs in the second holographic diffraction grating 135. So, the parallel light having the positive angle of view is diffracted and reflected mainly in the first holographic diffraction grating 131, but is not diffracted and reflected in the second holographic diffraction grating 135 and passes through the second holographic diffraction grating 135. Similarly, conditions (wavelength, incident angle, and pitch of a lattice plane) of the parallel light having the negative angle of view satisfy a Bragg's condition in which a diffraction reflection occurs mainly in the second holographic diffraction grating 135, but do not satisfy a Bragg's condition in which a diffraction reflection occurs in the first holographic diffraction grating 131. So, the parallel light having the negative angle of view is diffracted and reflected mainly in the second holographic diffraction grating 135, but is not diffracted and reflected in the first holographic diffraction grating 131 and passes through the first holographic diffraction grating 131.

Further, the holographic diffraction gratings 131 and 135 of Embodiment 1 are holographic diffraction gratings including the interference fringe forming areas 132 and 136 in which the interference fringes are formed. The two alignment marks 134A and 134B are provided to the outer side 133 of the interference fringe forming area in the extending direction of the interference fringe so as to be opposed to each other while sandwiching the interference fringe forming area 132 therebetween. The two alignment marks 138A and 138B are provided to the outer side 137 of the interference fringe forming area in the extending direction of the interference fringe so as to be opposed to each other while sandwiching the interference fringe forming area 136 therebetween. The same interference fringe as the interference fringe provided to the interference fringe forming area 132 is formed in the alignment marks 134A and 134B and the shape thereof is annular (ring-shaped) in plan view. The same interference fringe as the interference fringe provided to the interference fringe forming area 136 is formed in the alignment marks 138A and 138B and the shape thereof is annular (ring-shaped) in plan view. It should be noted that the alignment marks 134A, 134B, 138A, and 138B are provided to the outside of portions of the interference fringe forming areas 132 and 136 on the opposite side of the portions of the interference fringe forming areas 132 and 136, from which light is output.

Figure 3A:
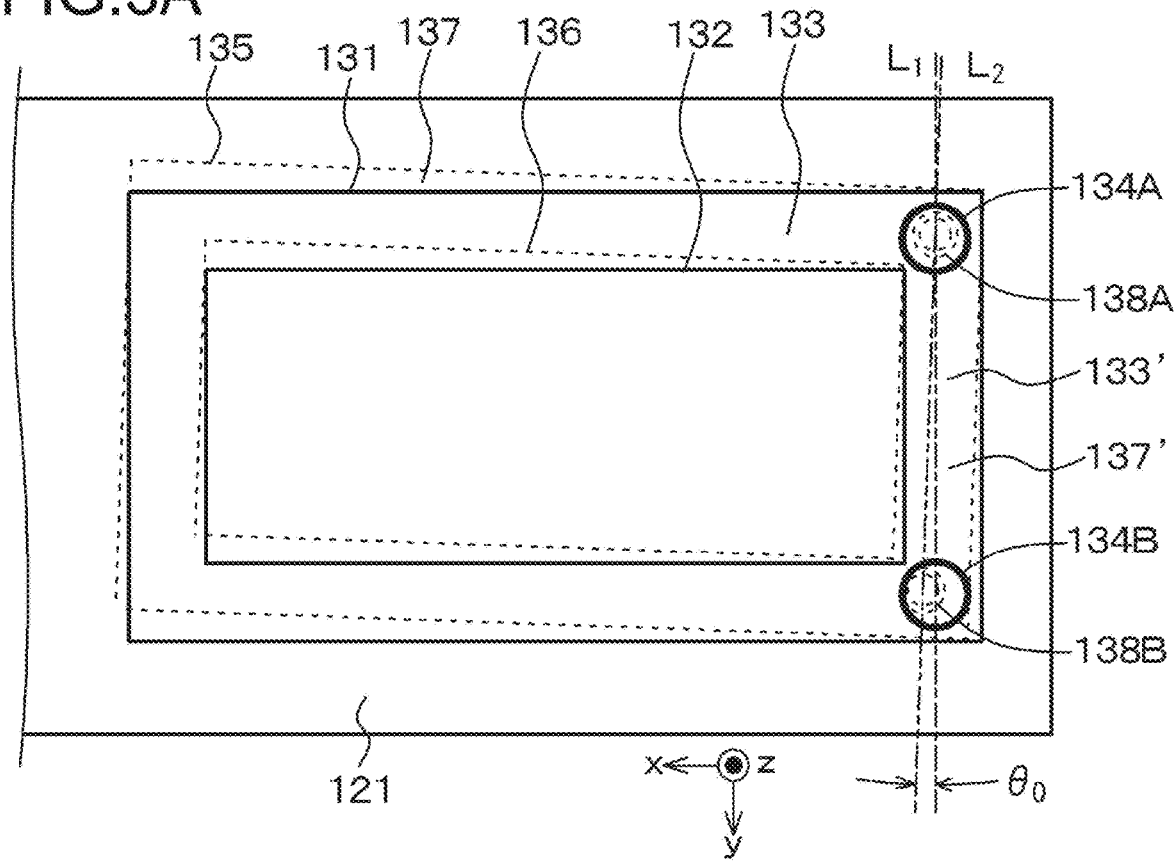
FIGS. 3A and 3B are schematic partial plan views of the light guide plate and the like, for describing an alignment of a first holographic diffraction grating and a second holographic diffraction grating.
Figure 3B:
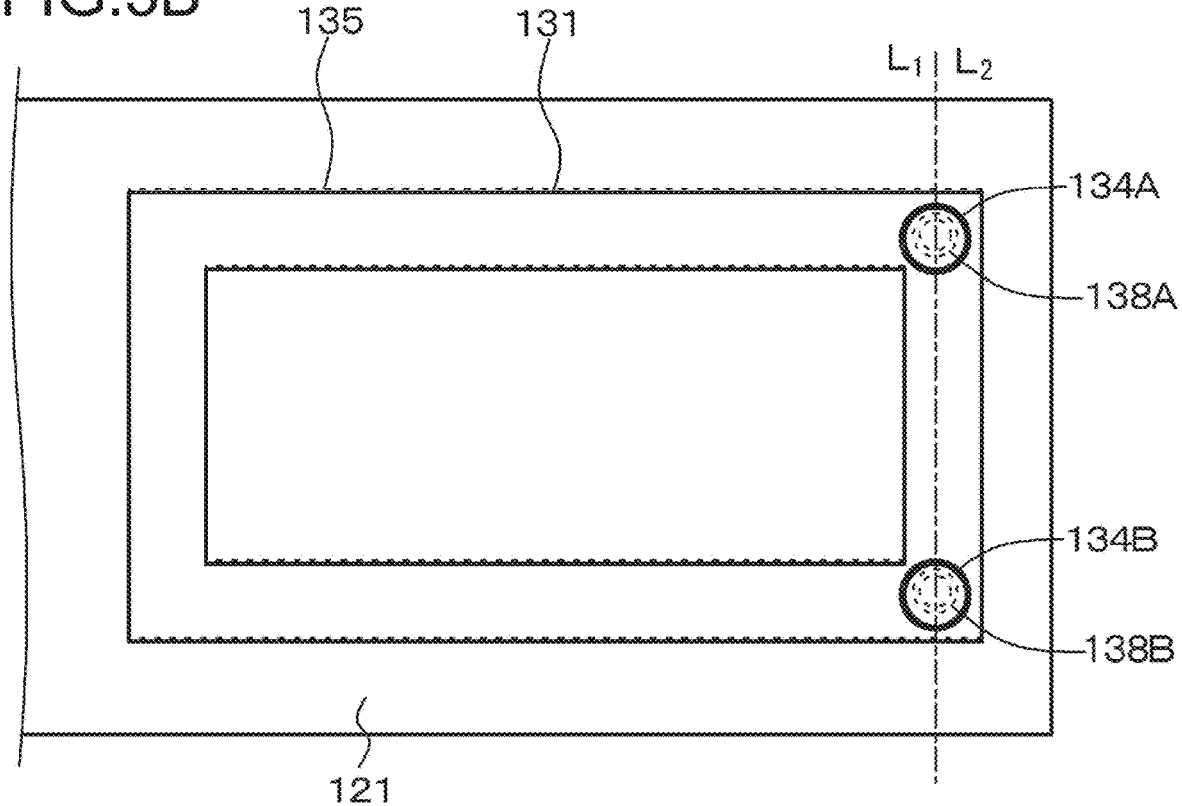
Figure 4A:
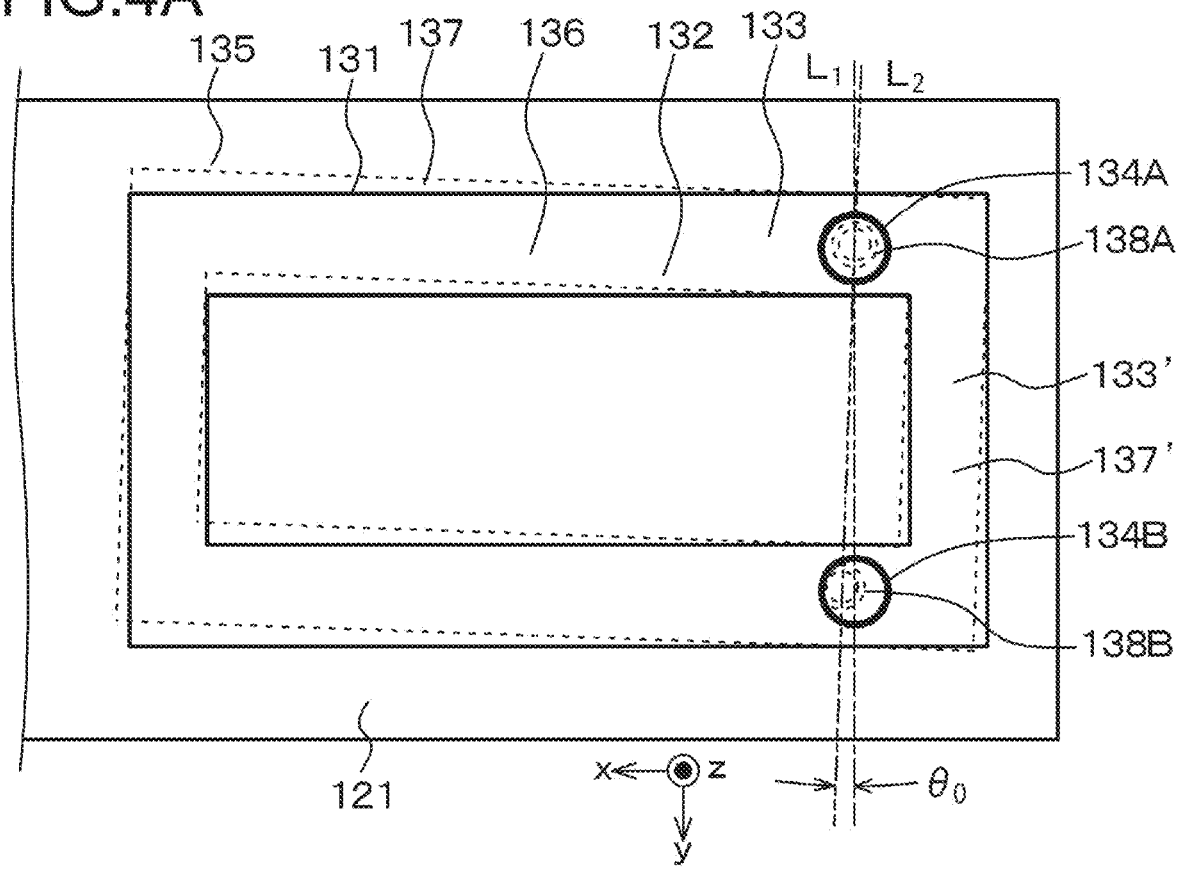
FIGS. 4A and 4B are schematic partial plan views of the light guide plate and the like, for describing the alignment of the first holographic diffraction grating and the second holographic diffraction grating in a modification of the example shown in FIGS. 3A and 3B.
Figure 4B:
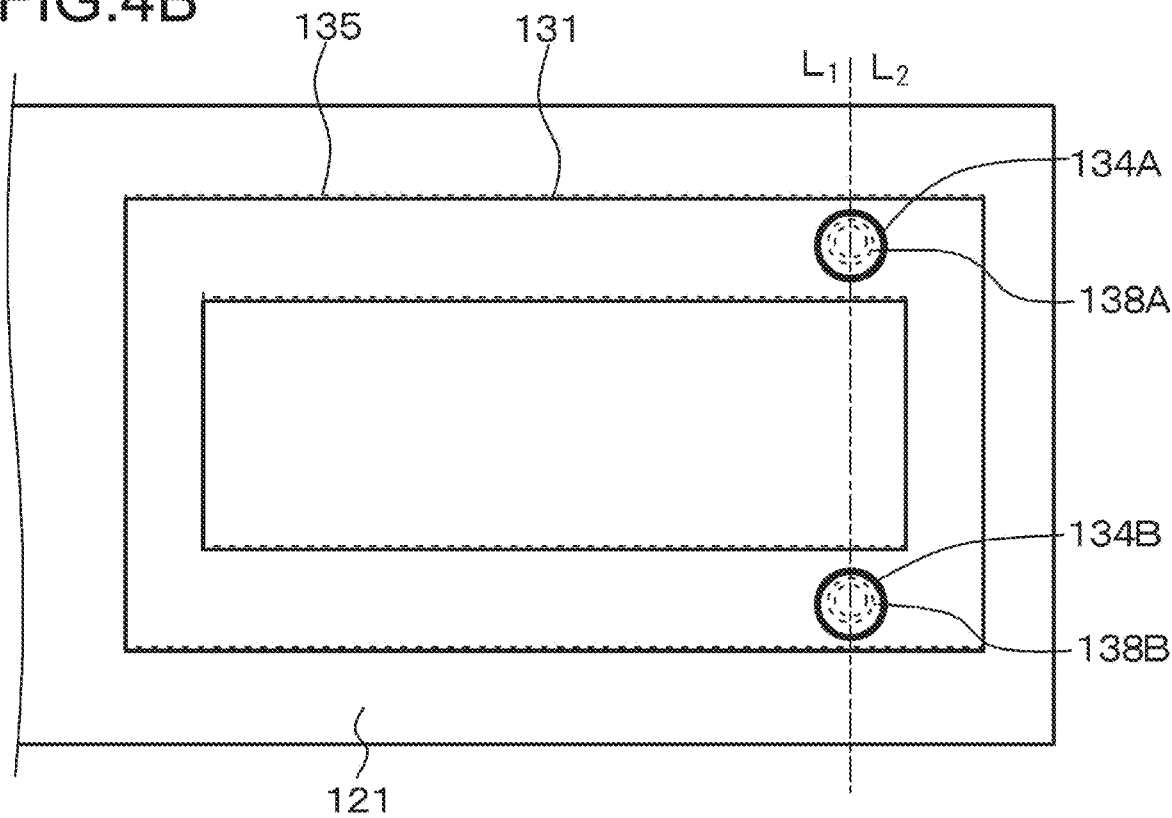

More specifically, as shown in FIGS. 3A and 3B, the first A alignment mark 134A and the first B alignment mark 134B are included in a projected image of a portion of the first holographic diffraction grating (the portion corresponding to an end area 133' of the first holographic diffraction grating) onto the x-z plane, the portion being located on the end of the light guide plate in relation to the first interference fringe forming area 132, and the second A alignment mark 138A and the second B alignment mark 138B are included in a projected image of a portion of the second holographic diffraction grating (the portion corresponding to an end area 137' of the second holographic diffraction grating) onto the x-z plane, the portion being located on the end of the light guide plate in relation to the second interference fringe forming area 136. Alternatively, as shown in FIGS. 4A and 4B, the first A alignment mark 134A and the first B alignment mark 134B are included in the projected image of the first interference fringe forming area 132 onto the x-z plane, and the second A alignment mark 138A and the second B alignment mark 138B are included in the projected image of the second interference fringe forming area 136 onto the x-z plane.

The first holographic diffraction grating 131, the second holographic diffraction grating 135, and the second deflection unit (third holographic diffraction grating) 140 that are each made of a photopolymer material are provided with the interference fringes each corresponding to one kind of wavelength band (or wavelength) and are manufactured by a method in related art. The pitch of the interference fringe formed in the holographic diffraction grating is constant, and the interference fringe is linear and substantially parallel to the y axis. The first holographic diffraction grating 131 and the second deflection unit 140 are disposed on (bonded to) the first surface 122 of the light guide plate 121, and the second holographic diffraction grating 135 is disposed on (bonded to) the second surface 123 of the light guide plate 121.

FIG. 6 is a schematic partial cross-sectional view of a reflection-type volume holographic diffraction grating in a partially enlarged form. In the reflection-type volume holographic diffraction grating, an interference fringe having a slant angle (angle of inclination) φ is formed. Here, the slant angle T means an angle formed by the surface of the reflection-type volume holographic diffraction grating and the interference fringe. The interference fringe is formed inside and over the surface of the reflection-type volume holographic diffraction grating. The interference fringe satisfies a Bragg's condition. Here, the Bragg's condition indicates a condition that satisfies the following expression (A), where m represents a positive integer, λ represents a wavelength, d represents a pitch of a lattice plane (intervals of normal line direction of the virtual plane including the interference fringe), and θ represents a complementary angle of the incident angle to the interference fringe. Further, a relationship among θ, a slant angle φ, and an incident angle ψ when light enters the reflection-type volume holographic diffraction grating at the incident angle ψ is expressed by the following expression (B).

$$m \cdot \lambda = 2 \cdot d \cdot \sin(\theta) \quad (A)$$

$$\theta = 90° - (\varphi + \psi) \quad (B)$$

In the light guide plate 121, the parallel light is propagated inside the light guide plate 121 by total reflection and then output. At that time, since the light guide plate 121 is thin and an optical path travelling inside the light guide plate 121 is long, the number of times the total reflection occurs until the light reaches the second deflection unit 140 differs depending on each angle of view. More specifically, in the parallel light that is input to the light guide plate 121, the number of reflections of the parallel light that is input at an angle of a direction approaching the second deflection unit 140 is smaller than the number of reflections of the parallel light that is input to the light guide plate 121 at an angle of a direction moving apart from the second deflection unit 140. This is because parallel light that is diffracted and reflected in the first deflection unit 130 and is input to the light guide plate 121 at an angle of a direction approaching the second deflection unit 140 has a smaller angle formed together with the normal line of the light guide plate 121 when the light propagated inside the light guide plate 121 impinges on the internal surface of the light guide plate 121, than parallel light that is input to the light guide plate 121 at an angle of a direction opposite to the direction approaching the second deflection unit 140.

In Embodiment 1 or Embodiment 2 that will be described later, the light guide plate 121 is made of an optical glass or a plastic material. In Embodiment 1 or Embodiment 2 that will be described later, the light guide plate 121 includes two parallel surfaces (first surface 122 and second surface 123) extending parallel to a light propagation direction (x axis) by internal total reflection of the light guide plate 121. The first surface 122 and the second surface 123 are opposed to each other. Parallel light is input from the second surface 123 that corresponds to a light input surface, and is output from the second surface 123 that corresponds to a light output surface, after being propagated inside the light guide plate 121 by total reflection. However, the light guide plate 121 is not limited to this configuration, and the light input surface may be formed of the first surface 122, and the light output surface may be formed of the second surface 123.

In Embodiment 1, the image forming device 111 is an image forming device having a first configuration and includes a plurality of pixels arranged in a two-dimensional matrix. Specifically, the image forming device 111 includes a reflection-type spatial light modulation device 150 and a light source 153 formed of a light-emitting diode that emits white light. The entire image forming device 111 is housed in a casing 113 (in FIG. 1, indicated by alternate long and short dash line). Such a casing 113 is provided with an opening (not shown), and light is output through the opening from the optical system (parallel light outputting optical system, collimating optical system) 112. The reflection-type spatial light modulation device 150 includes a liquid crystal display device (LCD) 151 formed of an LCOS as a light valve, and a polarizing beam splitter 152. The polarizing beam splitter 152 reflects part of light from the light source 153 and guides the light to the liquid crystal display device 151, and transmits part of the light reflected by the liquid crystal display device 151 and guides the light to the optical system 112. The liquid crystal display device 151 includes a plurality of (for example, 640*480) pixels (liquid crystal cells) arranged in a two-dimensional matrix.

The polarizing beam splitter 152 has a well-known configuration and structure. Non-polarized light output from the light source 153 impinges on the polarizing beam splitter 152. In the polarizing beam splitter 152, a P-polarized light component passes through and is output to the outside of the system. On the other and, an S-polarized light component is reflected on the polarizing beam splitter 152, input to the liquid crystal display device 151, reflected inside the liquid crystal display device 151, and output from the liquid crystal display device 151. Here, in the light output from the liquid crystal display device 151, light beams output from pixels for displaying "white" contain the P-polarized light component in a high proportion, while light beams output from pixels for displaying "black" contain the S-polarized light component in a high proportion. So, of the light output from the liquid crystal display device 151 and impinging on the polarizing beam splitter 152, the P-polarized light component passes through the polarizing beam splitter 152 and is guided to the optical system 112. On the other hand, the S-polarized light component is reflected on the polarizing beam splitter 152 and returned back to the light source 153. The optical system 112 is formed of a convex lens, for example, and in order to generate parallel light, the image forming device 111 (more specifically, liquid crystal display device 151) is disposed at a spot (position) of the focal distance in the optical system 112. Further, one pixel is formed of a red light emitting sub-pixel for emitting red light, a green light emitting sub-pixel for emitting green light, and a blue light emitting sub-pixel for emitting blue light.

The frame 10 includes a front portion 11 disposed on the front of an observer 20, two temple portions 13 turnably attached to both ends of the front portion 11 via hinges 12, and earpiece portions (also referred to as tip cells, ear pieces, or ear pads) 14 attached to the tip ends of the respective temple portions 13. Further, nose pads 10' are attached to the frame 10. In other words, basically, the assembled body of the frame 10 and the nose pads 10' has substantially the same structure as that of normal eyeglasses. Furthermore, the casings 113 are detachably attached to the temple portions 13 with mounting members 19. The frame 10 is made of metal or plastic. It should be noted that each casing 113 may be attached to the temple portion 13 with the mounting member 19 so as not to be detached. Further, for an observer wearing his/her own eyeglasses, each casing 113 may be detachably attached to the temple portion of the frame of the eyeglasses owned by the observer with the mounting member 19. Each casing 113 may be attached to the outer side of the temple portion 13 or to the inner side of the temple portion 13.

Moreover, wires (signal line, power supply line, etc.) 15 extending from one image forming device 111A are extended from the tip ends of the earpiece portions 14 to the outside through the inside of the temple portions 13 and the earpiece portions 14 and are connected to a control device (control circuit or control unit) 18. Moreover, each of the image forming devices 111A and 111B includes a headphone portion 16. Headphone portion wires 16', which extend from the respective image forming devices 111A and 111B, are extended from the tip ends of the earpiece portions 14 to the headphone portions 16 through the inside of the temple portions 13 and the earpiece portions 14. More specifically, the headphone portion wire 16' is extended to the headphone portion 16 so as to run around the rear side of a pinna (auricle) from the tip end of the earpiece portion 14. Such a configuration can provide a neatly designed display device without giving an impression on messy arrangement of the headphone portions 16 and the headphone portion wires 16'.

The wires (signal line, power supply line, etc.) 15 are connected to the control device (control circuit) 18 as described above. The control device 18 performs processing for image display. The control device 18 can be formed of a well-known circuit.

Further, an imaging device 17 including a solid-state imaging device and a lens (not shown) is attached to a central part 11' of the front portion 11 with an adequate mounting member (not shown). The solid-state imaging device is formed of a CCD or a CMOS sensor. A signal from the imaging device 17 is transmitted to, for example, the image forming device 111A via a wire (not shown) extended from the imaging device 17.

Hereinafter, an assembling method for the optical device of Embodiment 1 will be described with reference to FIGS. 3A, 3B, 4A, 4B, 5A, and 5B, which are schematic partial plan views of the light guide plate 121 and the like, for describing an alignment of the first holographic diffraction grating 131 and the second holographic diffraction grating 135.

Figure 5A:
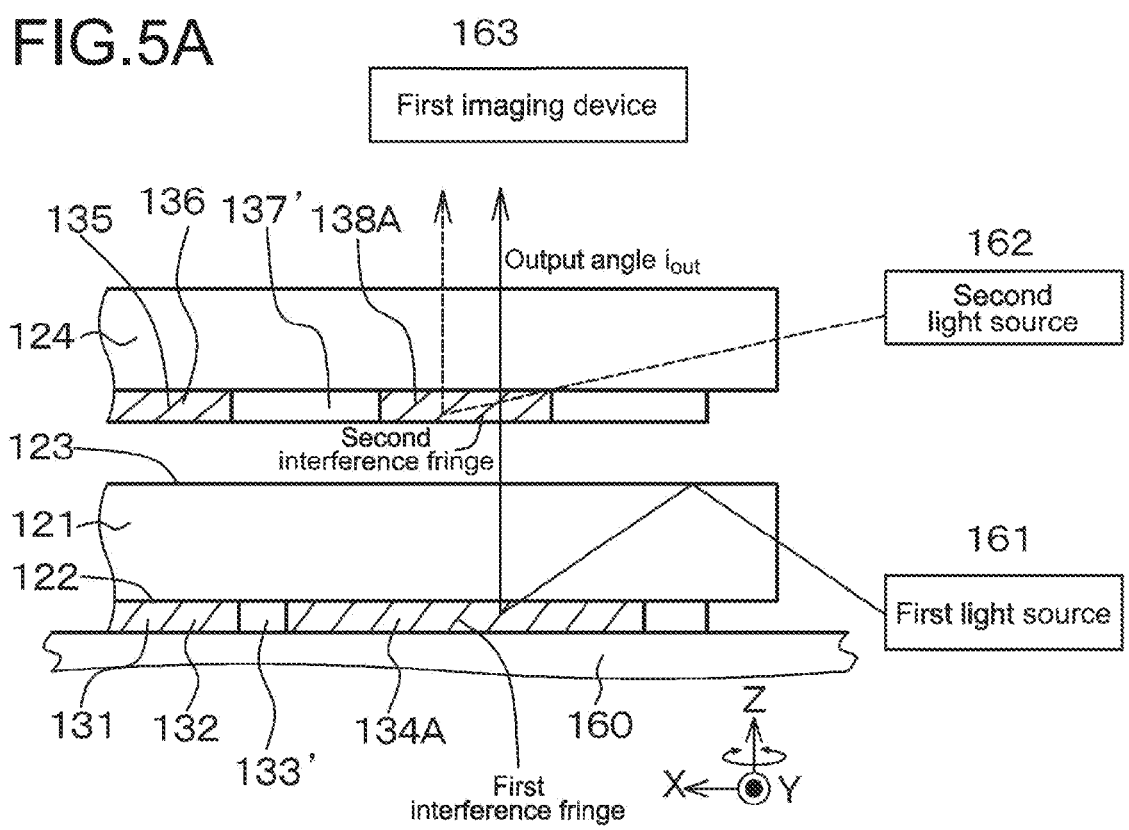
FIGS. 5A and 5B are schematic partial cross-sectional views of the light guide plate and the like, for describing the alignment of the first holographic diffraction grating and the second holographic diffraction grating.
Figure 5B:
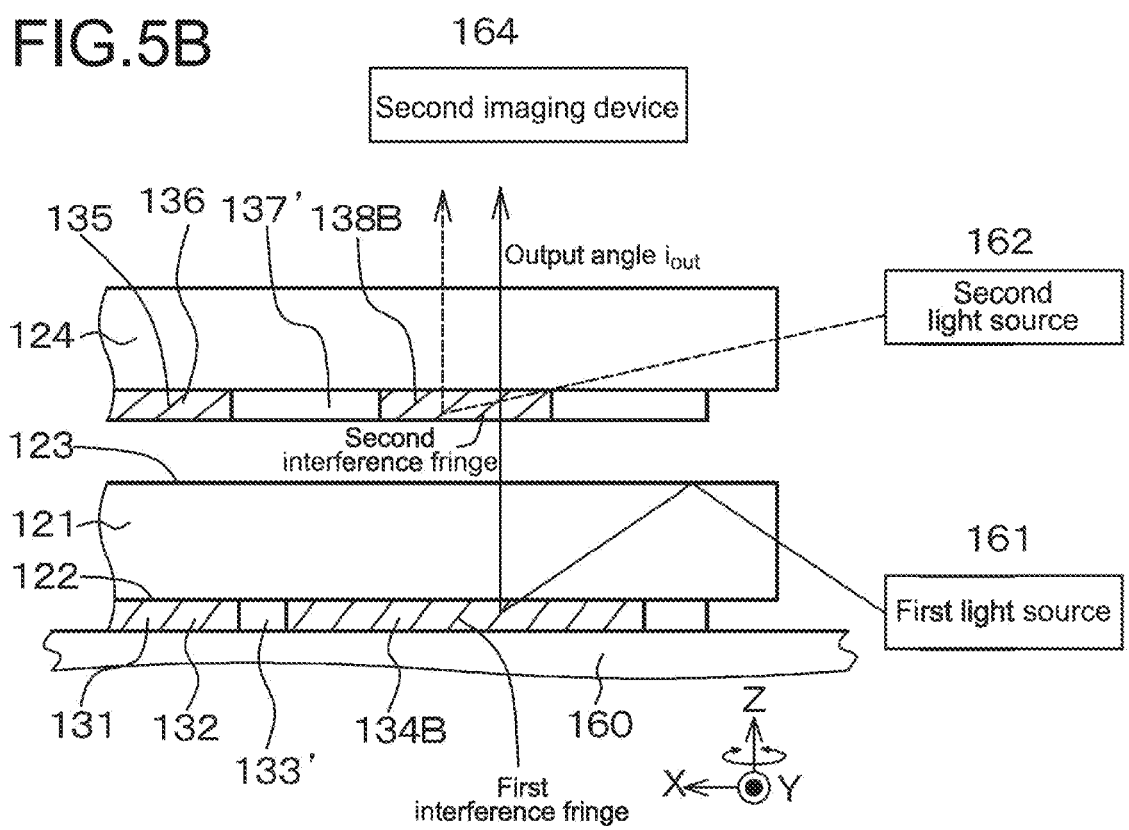

Here, the alignment device of Embodiment 1 includes, as shown in FIGS. 5A and 5B, a stage 160, a first light source 161, a second light source 162, a first imaging device 163, and a second imaging device 164. The stage 160 is movable in an X direction, a Y direction, and a Z direction and turnable in an X-Y plane. The first light source 161 is placed on the stage 160 and is configured to input light to the light guide plate 121 from an end surface of the light guide plate 121 on which the first holographic diffraction grating 131 is disposed. The second light source 162 is configured to input light to a support 124 from an end surface of the support 124 that supports the second holographic diffraction grating 135 above the first holographic diffraction grating 131. The first imaging device 163 is configured to detect an optical image of the first A alignment mark 134A provided to the first holographic diffraction grating 131, based on the light that is input from the first light source 161 and diffracted and reflected by the first A alignment mark 134A, and an optical image of the second A alignment mark 138A provided to the second holographic diffraction grating 135, based on the light that is input from the second light source 162 and diffracted and reflected by the second A alignment mark 138A. The second imaging device 164 is configured to detect an optical image of the first B alignment mark 134B provided to the first holographic diffraction grating 131, based on the light that is input from the first light source 161 and diffracted and reflected by the first B alignment mark 134B, and an optical image of the second B alignment mark 138B provided to the second holographic diffraction grating 135, based on the light that is input from the second light source 162 and diffracted and reflected by the second B alignment mark 138B.

The light beams input to the first A alignment mark 134A and the first B alignment mark 134B are diffracted and reflected by the first A alignment mark 134A and the first B alignment mark 134B, and such light that is output from the light guide plate 121 at an output angle $i_{out}$ is output from the first light source 161 (see FIGS. 5A and 5B). Additionally, the light beams input to the second A alignment mark 138A and the second B alignment mark 138B are diffracted and reflected by the second A alignment mark 138A and the second B alignment mark 138B, and such light that is output from the light guide plate 121 at an output angle $i_{out}$ is output from the second light source 162 (see FIGS. 5A and 5B). Here, examples of the output angle $i_{out}$ include 0 degrees. It should be noted that the wavelength of the light output from the first light source 161 and an incident angle on the light guide plate 121 only need to be selected in order to satisfy a Bragg's condition 1 for obtaining such a state, and the wavelength of the light output from the second light source 162 and an incident angle on the support 124 only need to be selected in order to satisfy a Bragg's condition 2 for obtaining such a state.

Furthermore, parallel light is output from the first light source 161 and parallel light is output from the second light source 162. It should be noted that an incident angle and a light source having the wavelength of light simultaneously satisfying the Bragg's condition 1 and the Bragg's condition 2 may be selected, and thus the first light source 161 and the second light source 162 may be an identical parallel light source.

In the assembling method for the optical device of Embodiment 1, the first A alignment mark 134A and the second A alignment mark 138A are optically detected (see FIGS. 3A, 4A, and 5A). Simultaneously, the first B alignment mark 134B and the second B alignment mark 138B are optically detected (see FIGS. 3A, 4A, and 5B). Subsequently, a first straight line $L_1$ connecting the first A alignment mark 134A and the first B alignment mark 134B is obtained, and a second straight line $L_2$ connecting the second A alignment mark 138A and the second B alignment mark 138B is obtained (see FIGS. 3A and 4A). Next, the first holographic diffraction grating 131 and the second holographic diffraction grating 135 are relatively aligned with each other such that an angle $\theta_0$, which is formed by the first straight line $L_1$ and the second straight line $L_2$ when the first straight line $L_1$ and the second straight line $L_2$ are projected onto a virtual plane, falls below a prescribed value $\theta_{PD}$ (see FIGS. 3B and 4B).

Alternatively, in the assembling method for the optical device of Embodiment 1, in a state where the second holographic diffraction grating 135 is supported by the support 124, light is input from the end surface of the light guide plate 121 to the light guide plate 121, light diffracted and reflected by the first A alignment mark 134A and the first B alignment mark 134B is optically detected, light is input from the end surface of the support 124 to the support 124, and light diffracted and reflected by the second A alignment mark 138A and the second B alignment mark 138B is optically detected. Thus, the first holographic diffraction grating 131 and the second holographic diffraction grating 135 are relatively aligned with each other.

Here, in the assembling method for the optical device 120 of Embodiment 1, with the first holographic diffraction grating 131 being disposed on the light guide plate 121, the first holographic diffraction grating 131 and the second holographic diffraction grating 135 are relatively aligned with each other, and the second holographic diffraction grating 135 is disposed on the light guide plate 121. In this case, with the first holographic diffraction grating 131 being disposed on the light guide plate 121, the light guide plate 121 is moved relative to the second holographic diffraction grating 135. Moreover, after the first holographic diffraction grating 131 is bonded to the light guide plate 121, the first holographic diffraction grating 131 and the second holographic diffraction grating 135 are relatively aligned with each other, and the second holographic diffraction grating 135 is bonded to the light guide plate 121.

Further, in the assembling method for the optical device 120 of Embodiment 1, with the second holographic diffraction grating 135 being supported by the support 124, the first holographic diffraction grating 131 and the second holographic diffraction grating 135 are relatively aligned with each other. It should be noted that as described above, the first A alignment mark 134A and the first B alignment mark 134B are provided with interference fringes that are identical to the interference fringe provided in the first interference fringe forming area 132, the second A alignment mark 138A and the second B alignment mark 138B are provided with interference fringes that are identical to the interference fringe provided in the second interference fringe forming area 136, light is input to the light guide plate 121 from the end surface of the light guide plate 121, the light diffracted and reflected on the first A alignment mark 134A and the first B alignment mark 134B is optically detected, the light is input from the end surface of the support 124 to the support 124, and the light diffracted and reflected on the second A alignment mark 138A and the second B alignment mark 138B is optically detected. Here, in a state where the relative alignment of the first holographic diffraction grating 131 and the second holographic diffraction grating 135 is completed, each of the first A alignment mark 134A and the second A alignment mark 138A has a shape for which the first A alignment mark 134A and the second A alignment mark 138A do not overlap, and each of the first B alignment mark 134B and the second B alignment mark 138B has a shape for which the first B alignment mark 134B and the second B alignment mark 138B do not overlap. Alternatively, in a state where the relative alignment of the first holographic diffraction grating 131 and the second holographic diffraction grating 135 is completed, the first A alignment mark 134A and the second A alignment mark 138A are disposed at positions where the first A alignment mark 134A and the second A alignment mark 138A do not overlap, and the first B alignment mark 134B and the second B alignment mark 138B are disposed at positions where the first B alignment mark 134B and the second B alignment mark 138B do not overlap.

Specifically, for example, the first holographic diffraction grating 131 forming the first deflection unit 130 and the third holographic diffraction grating forming the second deflection unit 140 are formed on a first surface of a substrate for manufacture (not shown) based on a well-known method. Further, the second holographic diffraction grating 135 forming the first deflection unit 130 is formed on a second surface of the substrate for manufacture based on a well-known method.

The first holographic diffraction grating 131 and the second deflection unit 140, which are formed on the first surface of the substrate for manufacture, are transferred to a first dicing tape and peeled off from the first surface of the substrate for manufacture. Subsequently, the first holographic diffraction grating 131 and the second deflection unit 140, which are transferred to the first dicing tape, are transferred and bonded to the first surface 122 of the light guide plate 121, and then peeled off from the first dicing tape. In such a manner, the first holographic diffraction grating 131 and the second deflection unit 140 can be disposed on the first surface 122 of the light guide plate 121.

Next, the second holographic diffraction grating 135, which is formed on the second surface of the substrate for manufacture, is transferred to a second dicing tape and is peeled off from the second surface of the substrate for manufacture. The second dicing tape corresponds to the support 124. The light guide plate 121 is placed on the stage 160 with the second surface 123 facing upward. The support 124 having a lower surface to which the second holographic diffraction grating 135 is transferred is disposed above the light guide plate 121 such that the second holographic diffraction grating 135 is opposed to the first holographic diffraction grating 131. This state is shown in FIGS. 5A and 5B.

Subsequently, as described above, the first A alignment mark 134A and the second A alignment mark 138A are optically detected and simultaneously the first B alignment mark 134B and the second B alignment mark 138B are optically detected (see FIGS. 3A, 4A, 5A, and 5B). In other words, the first A alignment mark 134A and the second A alignment mark 138A are imaged by the first imaging device 163, and the first B alignment mark 134B and the second B alignment mark 138B are imaged by the second imaging device 164. The first straight line $L_1$ connecting the first A alignment mark 134A and the first B alignment mark 134B is obtained, and the second straight line $L_2$ connecting the second A alignment mark 138A and the second B alignment mark 138B is obtained. The stage 160 is moved in the X direction and the Y direction and is turned in the X-Y plane such that an angle $\theta_0$, which is formed by the first straight line $L_1$ and the second straight line $L_2$ when the first straight line $L_1$ and the second straight line $L_2$ are projected onto a virtual plane, falls below a prescribed value $\theta_{PD}$. Thus, the first holographic diffraction grating 131 and the second holographic diffraction grating 135 are relatively aligned with each other (see FIGS. 3B and 4B). Subsequently, the stage 160 is raised (moved in the Z direction), the second holographic diffraction grating 135 forming the first deflection unit 130 is transferred to the second surface 123 of the light guide plate 121, bonded to the second surface 123 of the light guide plate 121, and then peeled off from the second dicing tape (support 124).

The maximum prescribed value $\theta_{PD}$ is 100 seconds, as an example. Specifically, the following image is assumed: five vertical lines (black lines extending in the y axis) are arranged at regular intervals per degree of the angle of view. Further, the length in the y-axis direction of the first interference fringe forming area 132 and the second interference fringe forming area 136 is set to 20 mm. Under such conditions, an extending direction of the first interference fringe provided to the first holographic diffraction grating 131 and an extending direction of the second interference fringe provided to the second holographic diffraction grating 135 are made parallel to the y axis, and an image contrast at that time is set to "1.00". The second holographic diffraction grating 135 is turned with respect to the first holographic diffraction grating 131, and an angle $\theta_0$ at which the image contrast is "0.95" is obtained. As a result, a value of ±50 seconds is obtained. Based on the result described above, the maximum prescribed value $\theta_{PD}$ is set to 100 seconds.

Even when the first holographic diffraction grating 131 and the second holographic diffraction grating 135 are displaced mutually in the x-axis direction or the y-axis direction, a diffraction reflection by the first holographic diffraction grating 131 and the second holographic diffraction grating 135 does not cause any particular change, in other words, the diffraction-reflection angle of the light diffracted and reflected by the first holographic diffraction grating 131 and the second holographic diffraction grating 135 does not cause any change. So, an image to be observed by the observer does not cause deterioration in image quality. On the other hand, in the case where a turning displacement of a certain angle $\theta_0$ is caused in the mutual positional relationship of the first holographic diffraction grating 131 and the second holographic diffraction grating 135, the diffraction-reflection angle of the light diffracted and reflected by the first holographic diffraction grating 131 and the second holographic diffraction grating 135 is changed. As a result, an image to be observed by the observer causes deterioration in image quality (reduction of image contrast and distortion of image).

As described above, in the assembling method for the optical device of Embodiment 1, the first straight line connecting the first A alignment mark and the first B alignment mark is obtained, the second straight line connecting the second A alignment mark and the second B alignment mark is obtained, and the first holographic diffraction grating and the second holographic diffraction grating are relatively aligned with each other such that an angle, which is formed by the first straight line and the second straight line when the first straight line and the second straight line are projected onto a virtual plane, falls below a prescribed value. So, the first holographic diffraction grating and the second holographic diffraction grating can be relatively aligned with each other based on a simplified method. Alternatively, in the assembling method for the optical device of Embodiment 1, with the second holographic diffraction grating being supported by the support, light is input from the end surface of the light guide plate to the light guide plate, light diffracted and reflected by the first A alignment mark and the first B alignment mark is optically detected, light is input from the end surface of the support to the support, and light diffracted and reflected by the second A alignment mark and the second B alignment mark is optically detected. Thus, the first holographic diffraction grating and the second holographic diffraction grating are relatively aligned with each other. So, the first holographic diffraction grating and the second holographic diffraction grating can be relatively aligned with each other based on a simplified method. Moreover, in the holographic diffraction grating of Embodiment 1, the alignment mark is provided with an interference fringe that is identical to the interference fringe provided to the interference fringe forming area, and the shape of the alignment mark is annular in plan view. In the optical device or the display device of Embodiment 1, in a state where the relative alignment of the first holographic diffraction grating and the second holographic diffraction grating is completed, the shapes of the first A alignment mark, the second A alignment mark, the first B alignment mark, and the second B alignment mark are prescribed, or the arrangement of those alignment marks is prescribed. So, the first holographic diffraction grating and the second holographic diffraction grating can be relatively aligned with each other certainly and easily based on a simplified method. Further, the alignment device of Embodiment 1 includes the first light source, which is placed on the stage and configured to input light to the light guide plate from the end surface of the light guide plate on which the first holographic diffraction grating is disposed, and the second light source configured to input light to the support from the end surface of the support that supports the second holographic diffraction grating above the first holographic diffraction grating. Thus, the alignment marks can be detected certainly, precisely, and easily.

Embodiment 2

Figure 10:
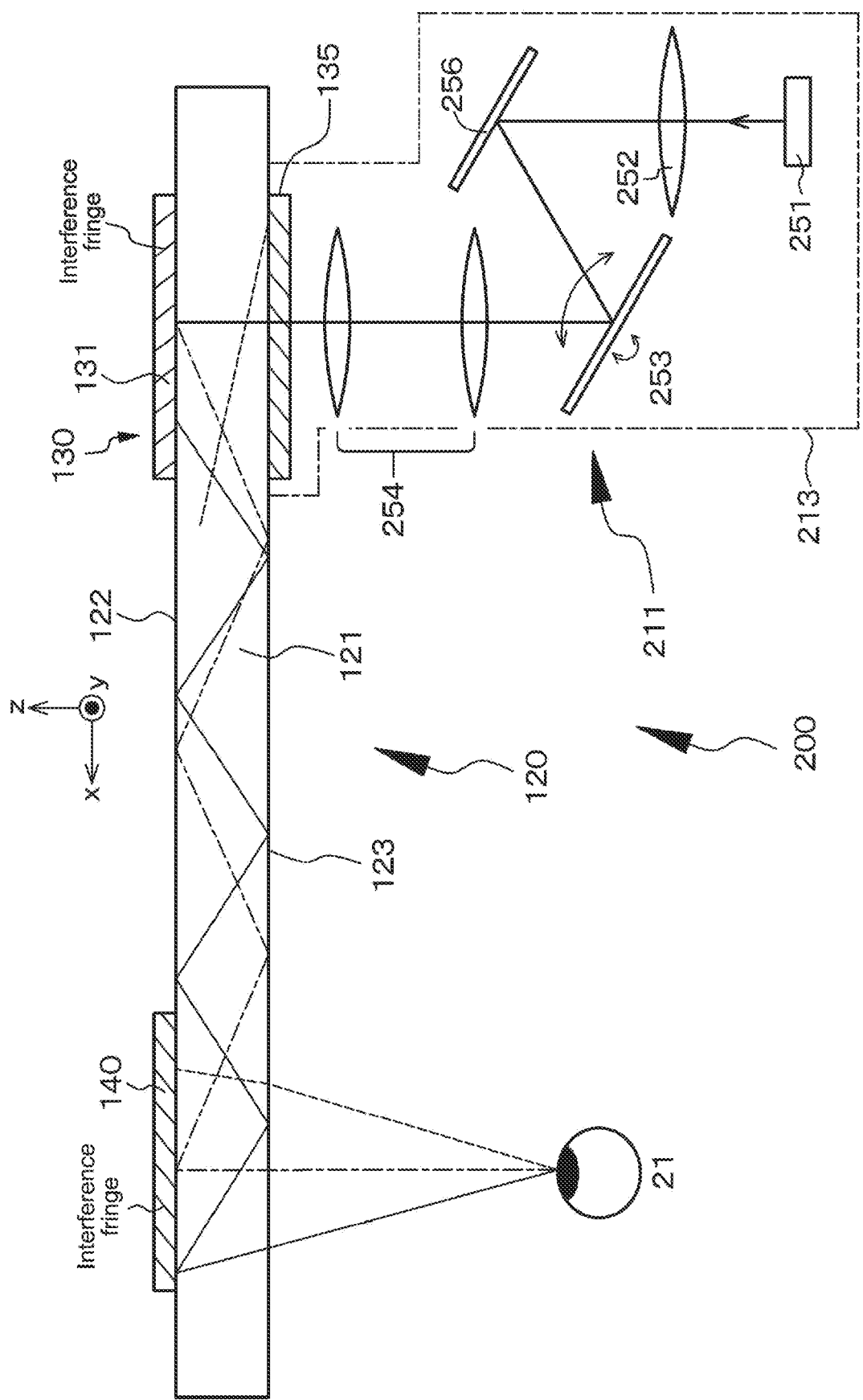
FIG. 10 is a conceptual diagram of an image display device in a display device of Embodiment 2.

Embodiment 2 is a modification of Embodiment 1. As FIG. 10 shows a conceptual diagram of an image display device 200 in a display device (head mounted display) of Embodiment 2, in Embodiment 2, an image forming device 211 includes an image forming device having a second configuration. In other words, the image forming device 211 includes a light source 251 and a scanning unit 253 that scans parallel light output from the light source 251. More specifically, the image forming device 211 includes
  (i) the light source 251,
  (ii) a collimating optical system 252 configured to change light output from the light source 251 into parallel light,
  (iii) the scanning unit 253 configured to scan the parallel light output from the collimating optical system 252, and
  (iv) a relay optical system 254 configured to relay the parallel light scanned by the scanning unit 253 for output. It should be noted that the entire image forming device 211 is housed in a casing 213 (in FIG. 10, indicated by alternate long and short dash line). Such a casing 213 is provided with an opening (not shown), and light is output through the opening from the relay optical system 254. Each casing 213 is detachably attached to the temple portion 13 with the mounting member 19.

The light output from the light source 251 is input to the collimating optical system 252 having a positive optical power as a whole and is output as parallel light. The parallel light is reflected on a total reflection mirror 256. Horizontal scanning and vertical scanning are performed by a scanning unit 253 including a MEMS. The MEMS includes a micromirror that is rotatable in two-dimensional directions and with which the incident parallel light can be scanned in a two-dimensional manner. By the scanning, the parallel light is converted into a kind of two-dimensional image, resulting in the generation of virtual pixels (the number of pixels is, for example, the same as in Embodiment 1). The light from the virtual pixels passes through the relay optical system (parallel light outputting optical system) 254 formed of a well-known relay optical system, and a light flux changed into parallel light is input to the optical device 120.

The optical device 120 to which the light flux changed into the parallel light in the relay optical system 254 is input, through which the light flux is guided, and from which the light flux is output has the same configuration and structure as those of the optical device described in Embodiment 1, and thus detailed description thereof will be omitted. Further, as described above, the display device of Embodiment 2 also has substantially the same configuration and structure as those of the display device of Embodiment 1 except for the difference on the image forming device 211, and thus detailed description thereof will be omitted.

Embodiment 3

Figure 11:
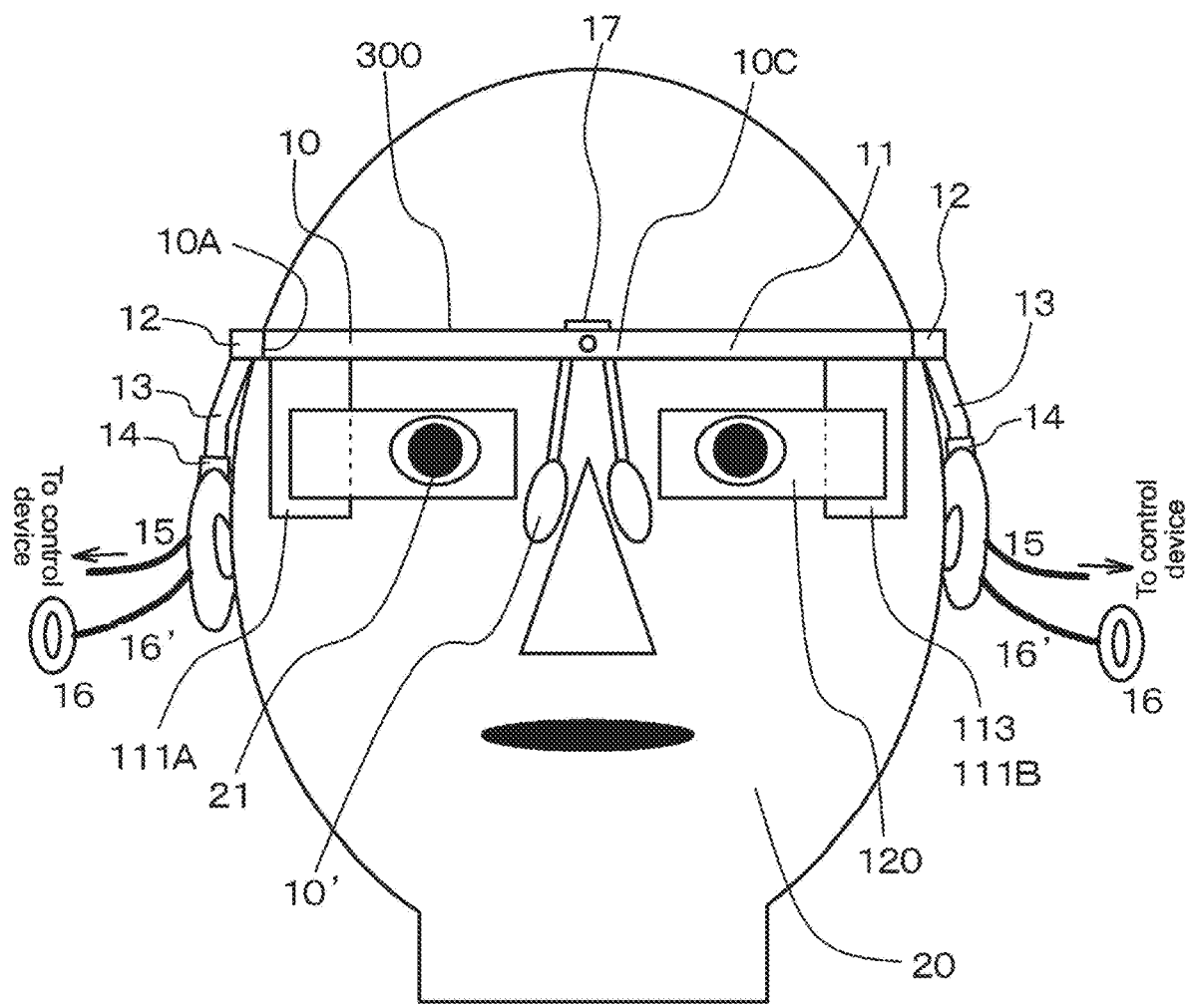
FIG. 11 is a schematic diagram of the display device of Embodiment 3 when viewed from the front.
Figure 12:
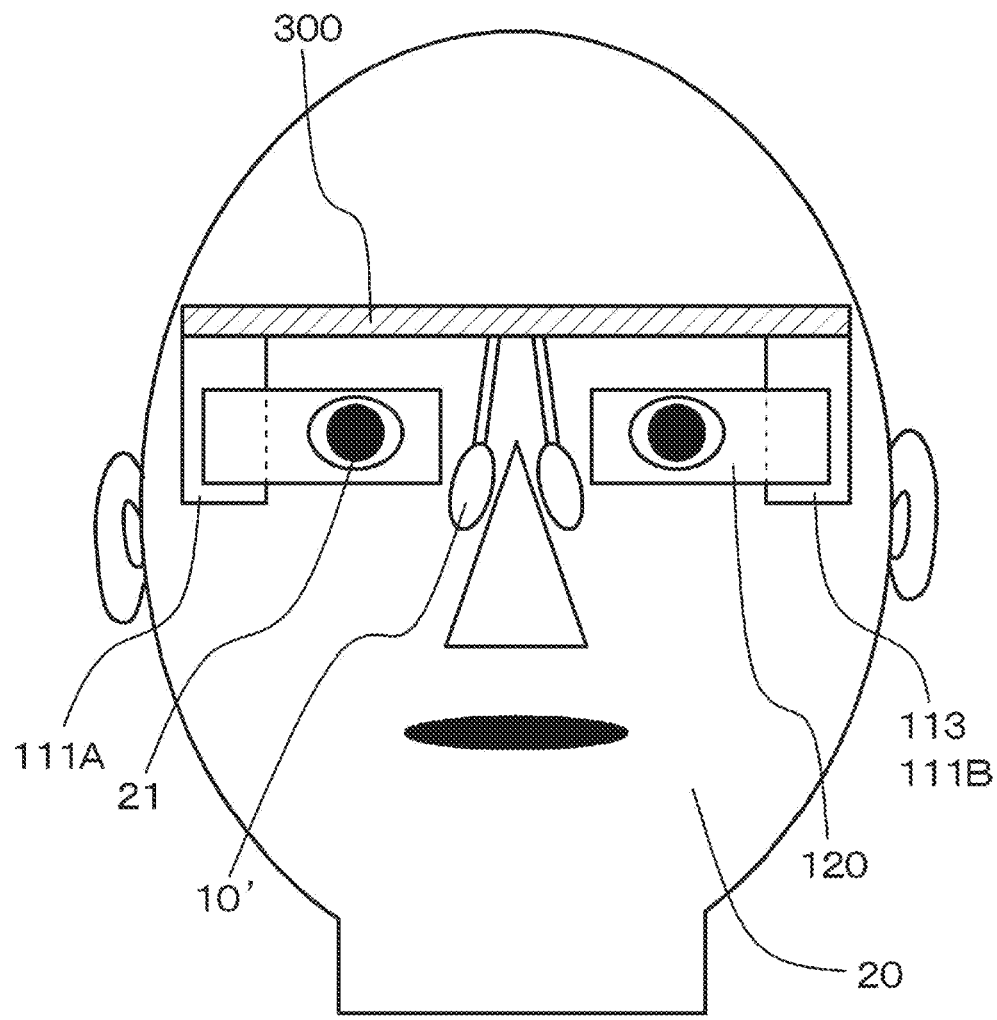
FIG. 12 is a schematic diagram of the display device of Embodiment 3 (in a state assuming that a frame is removed) when viewed from the front.
Figure 13:
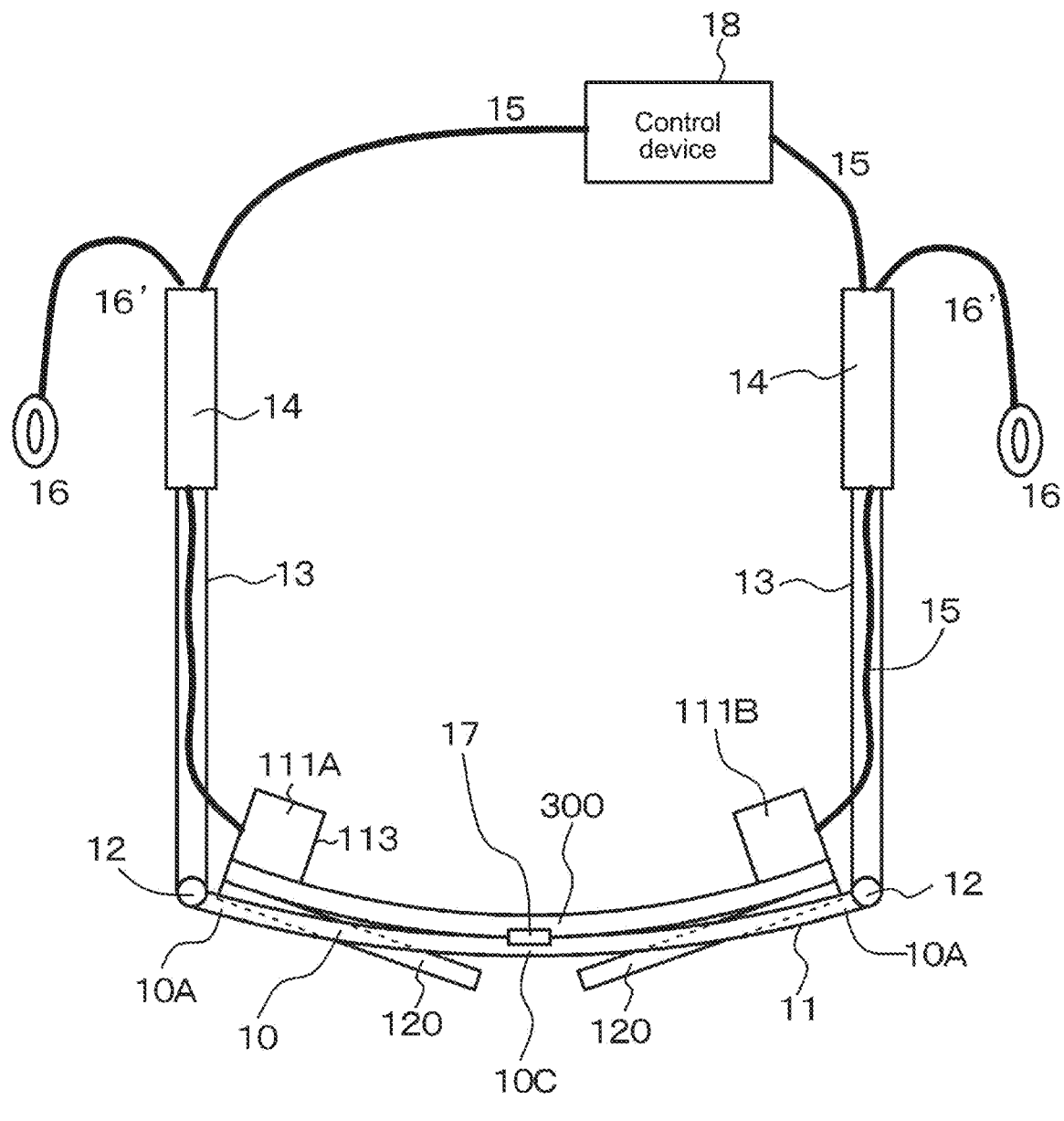
FIG. 13 is a schematic diagram of the display device of Embodiment 3 when viewed from above.
Figure 14:
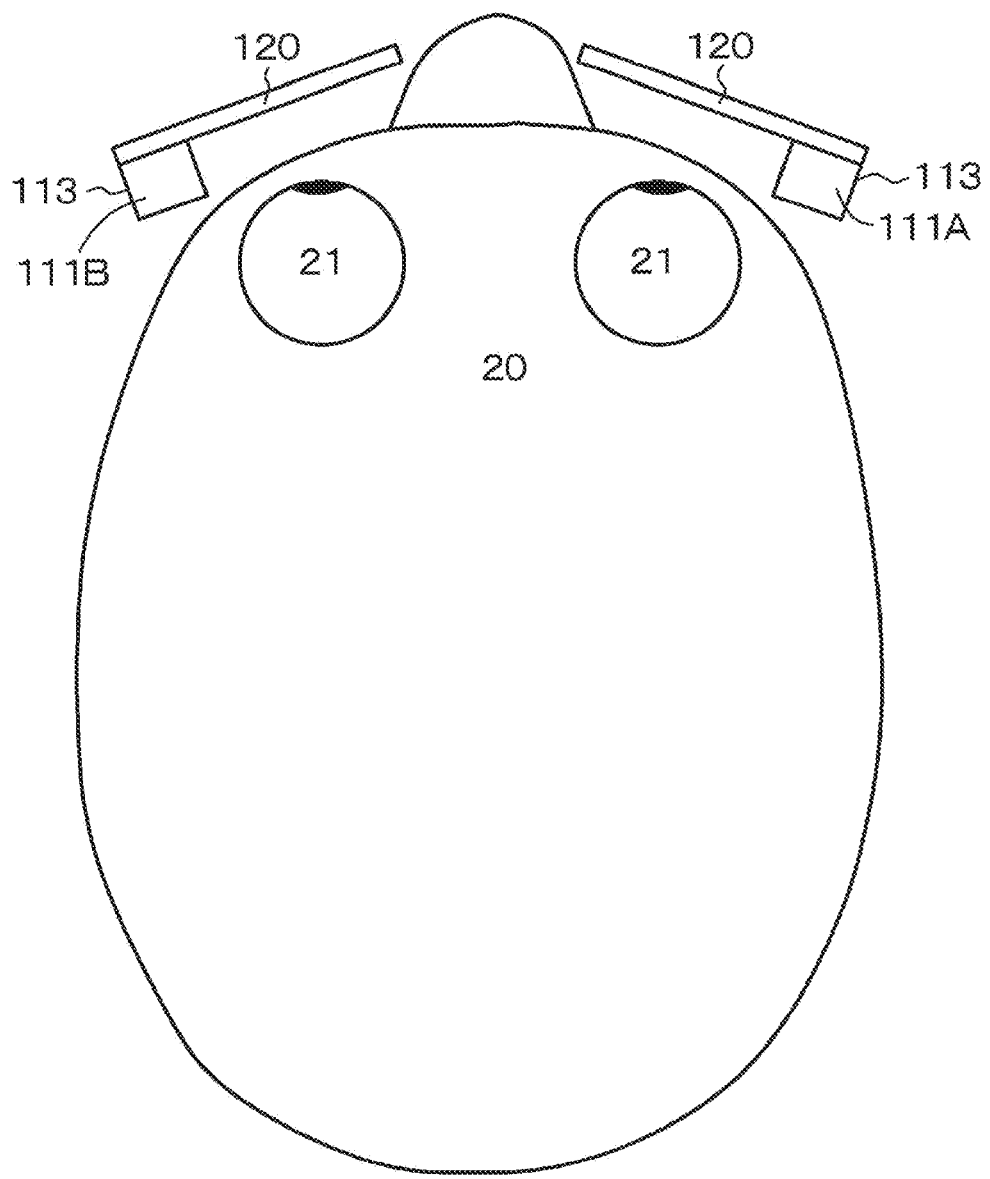
FIG. 14 is a diagram showing a state where the display device of Embodiment 3 is mounted onto the head of the observer when viewed from above (showing only the image display devices and omitting the illustration of the frame)

Embodiment 3 is a modification of Embodiments 1 and 2. FIG. 11 is a schematic diagram of a head mounted display of Embodiment 3 when viewed from the front. FIG. 12 is a schematic diagram of the head mounted display of Embodiment 3 (in a state assuming that a frame is removed) when viewed from the front. Further, FIG. 13 is a schematic diagram of the head mounted display of Embodiment 3 when viewed from above. FIG. 14 is a diagram showing a state where the head mounted display of Embodiment 3 is mounted onto the head of an observer 20 when viewed from above. It should be noted that FIG. 14 shows only the image display devices for sake of simplicity and the illustration of the frame is omitted. Additionally, in the following description, the image display device is typified by the image display device 100, but needless to say, the image display device 200 can be applied to the image display device.

The head mounted display of Embodiment 3 further includes a connection member 300 that connects two image display devices 100. The connection member 300 is attached to one side of a frame 10, which faces the observer at a central part 10C located between two pupils 21 of the observer 20 (i.e., attached between the observer 20 and the frame 10), with use of screws (not shown), for example. Moreover, a projected image of the connection member 300 is included in a projected image of the frame 10. In other words, when the head mounted display is viewed from the front of the observer 20, the connection member 300 is hidden behind the frame 10, and the connection member 300 is not visually recognized. Additionally, the two image display devices 100 are connected to each other with the connection member 300. Specifically, the image forming devices 111A and 111B are stored in respective casings 113, and the casings 113 are attached to both ends of the connection member 300 such that the mounting state can be adjusted. Each of the image forming devices 111A and 111B is located on the outside in relation to the pupil 21 of the observer 20. Specifically, the following expressions are satisfied:

$\alpha=0.1*L;$ $\beta=0.5*L;$ and $\gamma=0.9*L,$ where a distance from the center $111A_C$ of the mounting portion of one image forming device 111A to one end of the frame 10 (an endpiece on one side) is represented by α, a distance from the center $300_C$ of the connection member 300 to the one end of the frame 10 (the endpiece on the one side) is represented by β, a distance from the center $111B_C$ of the mounting portion of the other image forming device 111B to the one end of the frame 10 (the endpiece on the one side) is represented by γ, and the length of the frame 10 is represented by L.

The mounting of the image forming devices (specifically, image forming devices 111A and 111B) to both ends of the connection member 300 is specifically performed as follows, for example: three through-holes (not shown) are provided at three positions of each of the ends of the connection member; tapped hole portions (screw-engagement portions (not shown)) corresponding to the through-holes are provided to the image forming devices 111A and 111B; and screws (not shown) are inserted into the respective through-holes and screwed into the hole portions provided to the image forming devices 111A and 111B. A spring is inserted between each screw and a corresponding hole portion. In such a manner, the mounting state of the image forming devices (inclination of the image forming devices with respect to the connection member) can be adjusted based on the fastening state of the screws. After the mounting, the screws are hidden by caps (not shown). It should be noted that in FIGS. 12 and 16, to clearly specify the connection members 300 and 400, the connection members 300 and 400 are hatched. The connection member 300 is attached to the central part 10C of the frame 10 that is located between the two pupils 21 of the observer 20. The central part 10C corresponds to the bridge portion in normal eyeglasses. Further, nose pads 10' are attached to the side of the connection member 300 that faces the observer 20. It should be noted that in FIGS. 13 and 17, the illustration of the nose pads 10' is omitted. The frame 10 and the connection member 300 are made of metal or plastic, and the shape of the connection member 300 is a curved bar-like shape.

In such a manner, in the head mounted display (HMD) of Embodiment 3, the connection member 300 connects the two image display devices 100 and is attached to the central part 10C of the frame 10 that is located between the two pupils 21 of the observer 20. In other words, the image display devices 100 are not directly attached to the frame 10. So, when the frame 10 is mounted onto the head of the observer 20, the temple portions 13 are expanded outwards. As a result, if the frame 10 is deformed, such a deformation of the frame 10 does not cause a displacement (positional change) of the image forming devices 111A and 111B, or causes little displacement, if any. For that reason, the angle of convergence of left and right images can be certainly prevented from being changed. Moreover, since it is unnecessary to enhance the rigidity of the front portion 11 of the frame 10, it is possible to avoid causing an increase in weight of the frame 10, lowering in design quality, and a rise in cost. Besides, since the image display devices 100 are not attached directly to the eyeglasses-type frame 10, the design, color, and the like of the frame 10 can be freely selected according to the observer's preference, and thus there are few restrictions imposed on the design of the frame 10 and the degree of freedom on a design basis is high. In addition, when the head mounted display is viewed from the front of the observer, the connection member 300 is hidden behind the frame 10. So, a high design quality can be given to the head mounted display.

Embodiment 4

Figure 15:
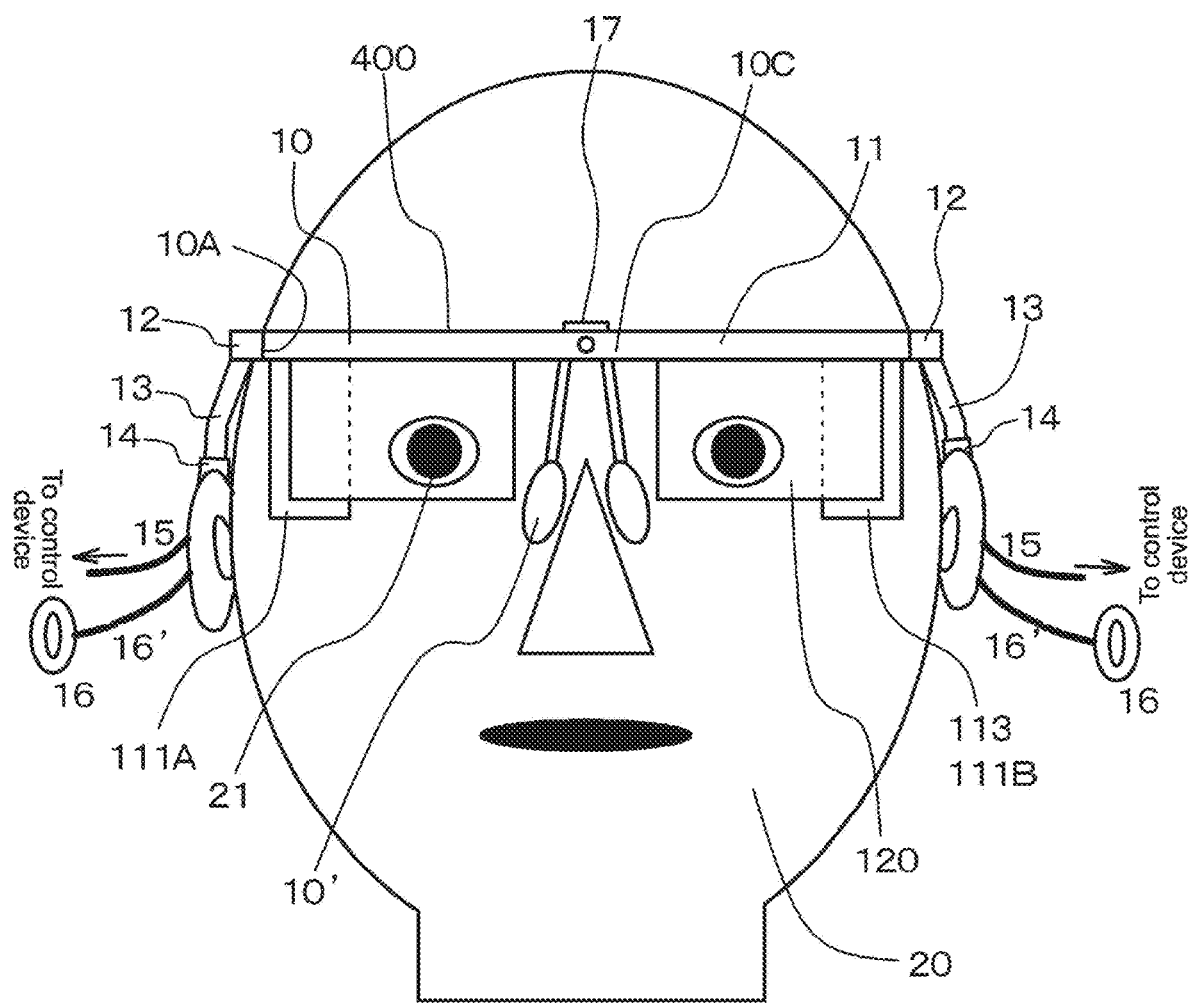
FIG. 15 is a schematic diagram of a display device of Embodiment 4 when viewed from the front.
Figure 16:
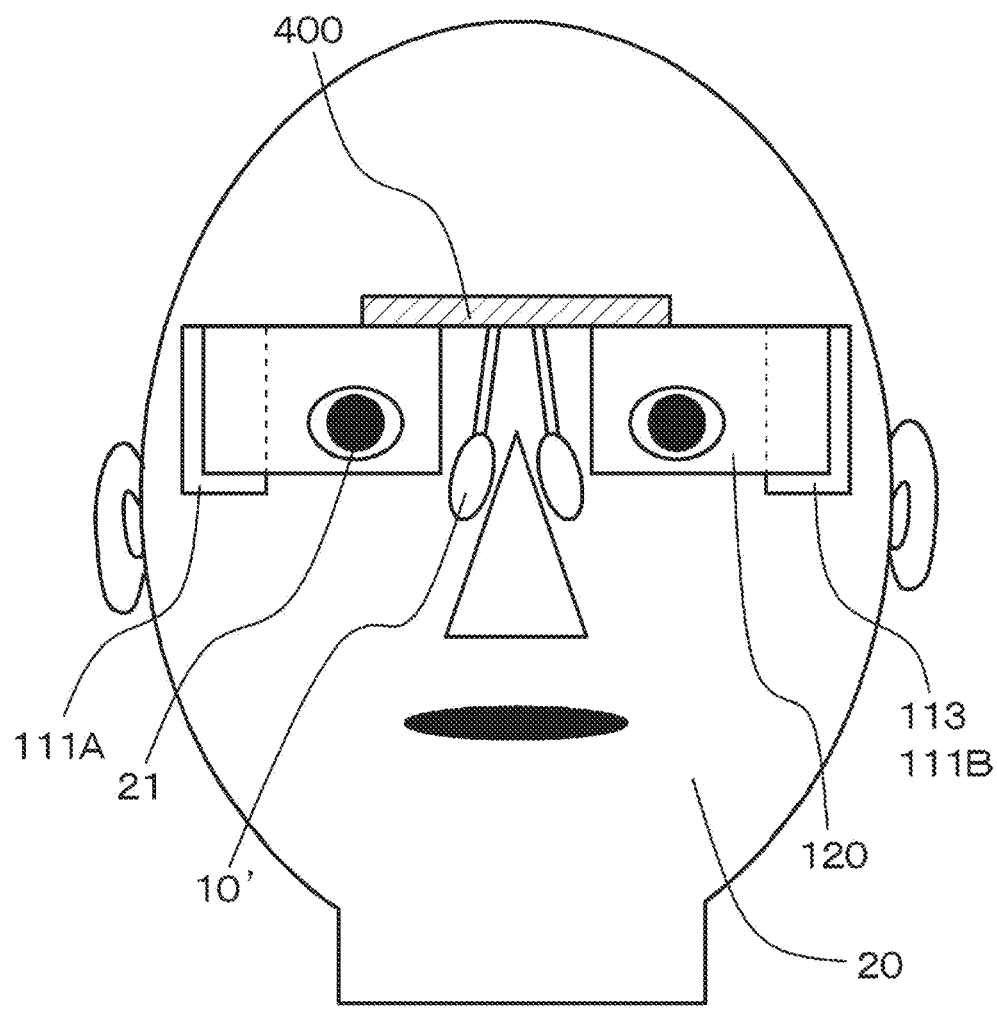
FIG. 16 is a schematic diagram of the display device of Embodiment 4 (in a state assuming that a frame is removed) when viewed from the front.
Figure 17:
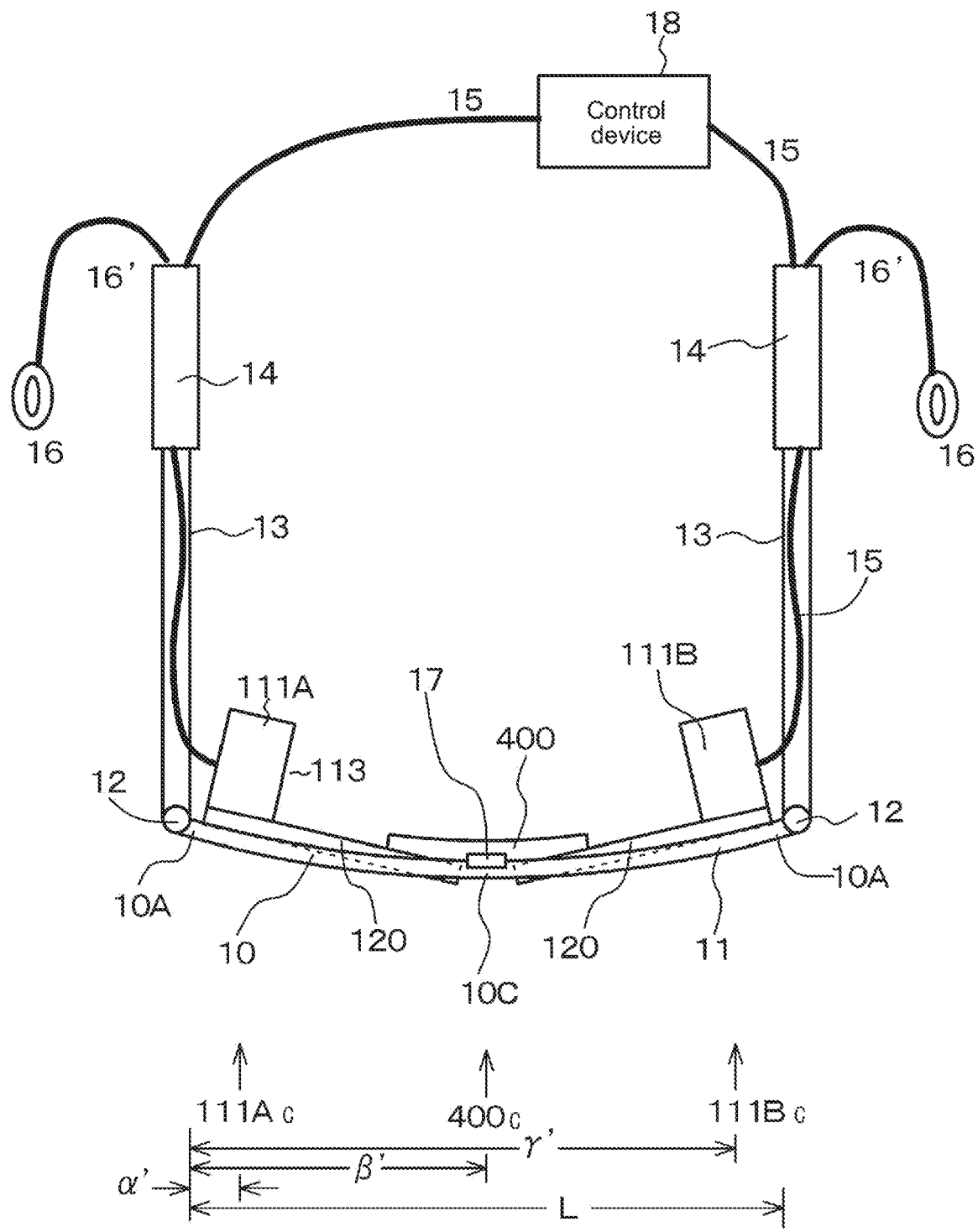
FIG. 17 is a schematic diagram of the display device of Embodiment 4 when viewed from above.

Embodiment 4 is a modification of Embodiment 3. FIG. 15 is a schematic diagram of a head mounted display of Embodiment 4 when viewed from the front. FIG. 16 is a schematic diagram of the head mounted display of Embodiment 4 (in a state assuming that a frame is removed) when viewed from the front. Further, FIG. 17 is a schematic diagram of the head mounted display of Embodiment 4 when viewed from above.

In the head mounted display of Embodiment 4, a bar-like connection member 400 connects two optical devices 120, instead of connecting the two image forming devices 111A and 111B, unlike Embodiment 3. It should be noted that the following form can also be adopted: two optical devices 120 are integrally manufactured, and the connection member 400 is attached to the optical device 120 thus integrally manufactured.

Here, also in the head mounted display of Embodiment 4, the connection member 400 is attached to the central part 10C of the frame 10 that is located between the two pupils 21 of the observer 20 with use of screws, for example. Each of the image forming devices 111 is located on the outside in relation to the pupil 21 of the observer 20. It should be noted that the image forming devices 111 are attached to the ends of the optical device 120. The following expression is satisfied:

$$\beta=0.5*L$$

where a distance from the center $400_C$ of the connection member 400 to one end of the frame 10 is represented by β and the length of the frame 10 is represented by L. It should be noted that the values of α' and γ' in Embodiment 4 are the same as the values of α and γ in Embodiment 3.

In Embodiment 4, the frame 10 and the image display devices have the same configuration and structure as those of the frame 10 and the image display devices described in Embodiment 3. For that reason, detailed description of the frame 10 and the image display devices will be omitted. Further, the head mounted display of Embodiment 4 also has substantially the same configuration and structure as those of the head mounted display of Embodiment 3 except for the difference described above, and thus detailed description thereof will be omitted.

Hereinabove, the present disclosure has been described based on the desirable embodiments, but the present disclosure is not limited to those embodiments. The configurations and structures of the display device (head mounted display), the image display device, the optical device, and the holographic diffraction grating described in the above embodiments are merely examples and can be appropriately changed. Various process steps in the assembling method for the optical device according to an embodiment of the present disclosure are also exemplary ones and can be appropriately changed. For example, a surface relief hologram (see U.S. Patent Application No. 20040062505A1) may be disposed on the light guide plate. Alternatively, the holographic diffraction grating may be a reflection-type blazed diffraction grating element or a surface relief-type hologram. In the embodiments, the binocular type including two image display devices is exclusively described, but a monocular type including one image display device may be adopted.

Information or data on an image displayed in the image forming device may be stored in the display device or may be recorded in a so-called cloud computer. In the latter case, when the display device is provided with a communication unit, for example, a mobile telephone or a smartphone, or when the display device is combined with a communication unit, various types of information or data can be given and received or exchanged between the cloud computer and the display device.

In the embodiments, the image forming devices 111 and 211 are described as ones displaying a monochrome (for example, green) image, but the image forming devices 111 and 211 can display a color image. In this case, the light source only needs to be formed of a light source that outputs red light, green light, and blue light, for example.

Specifically, for example, red light, green light, and blue light that are output from a red light emitting element, a green light emitting element, and a blue light emitting element, respectively, may be used to achieve color mixture and uniformity in luminance by using a light pipe, to obtain white light.

For example, in addition to a combination of a backlight that emits white light as a whole and a liquid crystal display device including red light emitting pixels, green light emitting pixels, and blue light emitting pixels, examples of the light source or the image forming device including light emitting elements and light valves include the following configurations.

Figure 18:
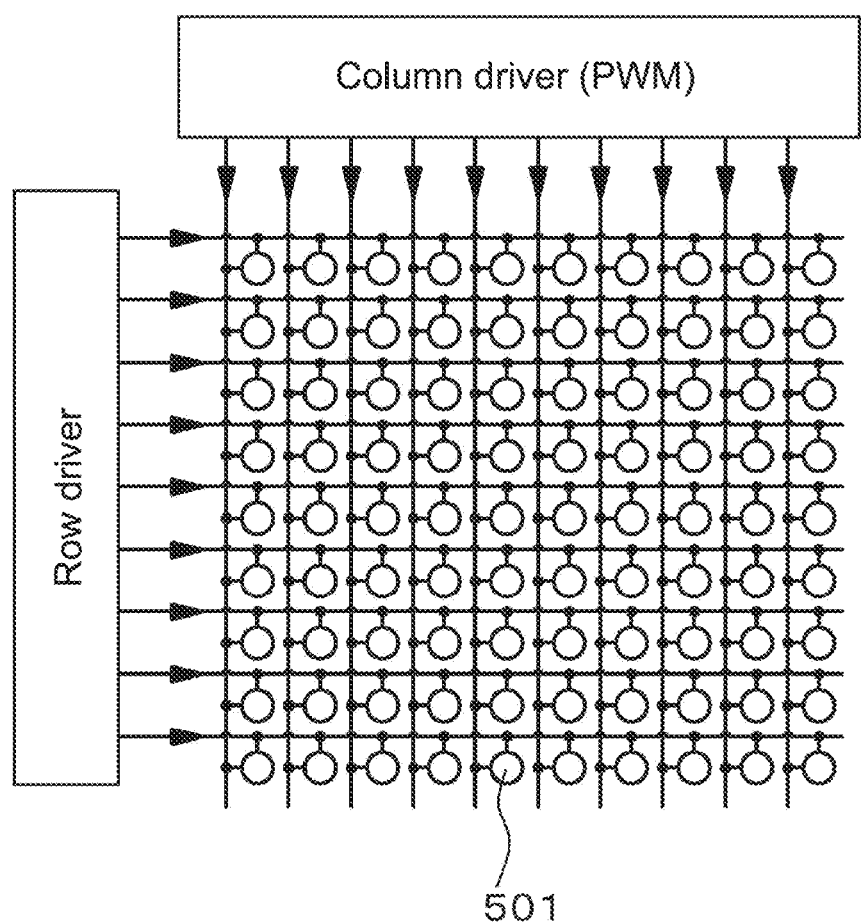
FIG. 18 is a conceptual diagram of a modification of an image forming device suitable for use in Embodiments 1 to 4.

Specifically, for example, as FIG. 18 shows a conceptual diagram, it is possible to provide an active matrix type image forming device including a light emitting panel on which light emitting elements 501 are arranged in a two-dimensional matrix. In the active matrix type image forming device, the light-emitting/non-light-emitting states of the light emitting elements 501 are controlled and the light-emitting states of the light emitting elements 501 are directly observed, and thus an image is displayed. Light output from this image forming device is input to the light guide plate 121 via the collimating optical system 112.

Figure 19:
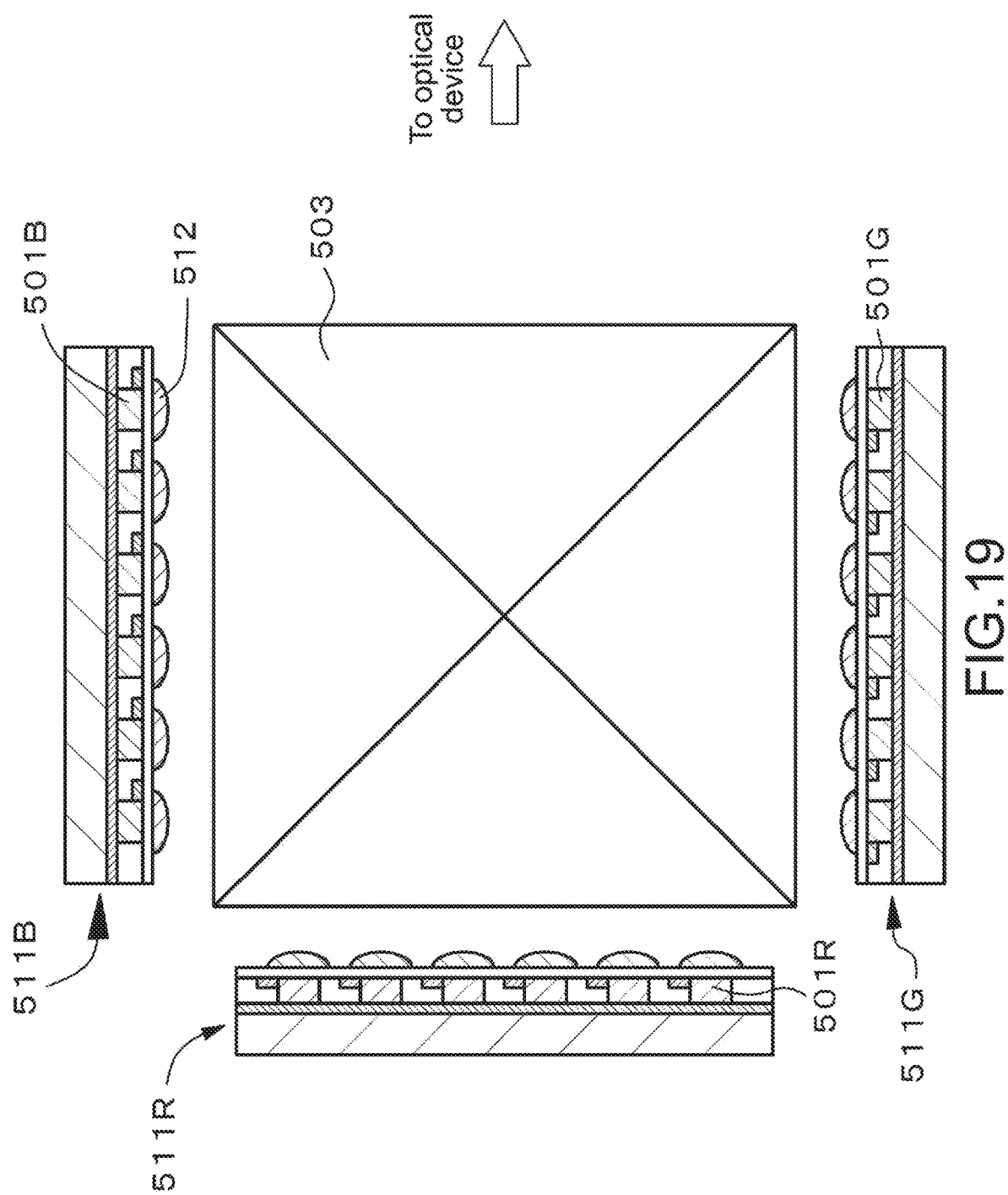
FIG. 19 is a conceptual diagram showing another modification of an image forming device suitable for use in Embodiments 1 to 4.

Alternatively, as FIG. 19 shows a conceptual diagram, there may be provided an image forming device for color display, including (α) a red light emitting panel 511R on which red light emitting elements 501R that emit red light are arranged in a two-dimensional matrix, (β) a green light emitting panel 511G on which green light emitting elements 501G that emit green light are arranged in a two-dimensional matrix, (γ) a blue light emitting panel 511B on which blue light emitting elements 501B that emit blue light are arranged in a two-dimensional matrix, and (δ) a unit for collecting light beams output from the respective red light emitting panel 511R, green light emitting panel 511G, and blue light emitting panel 511B into one optical path (for example, dichroic prism 503), in which the light-emitting/non-light-emitting states of the red light emitting elements 501R, the green light emitting elements 501G, and the blue light emitting elements 501B are controlled. Light output from the image forming device is also input to the light guide plate 121 via the collimating optical system 112. It should be noted that microlenses 512 are configured to collect the light beams output from the light emitting elements.

Figure 20:
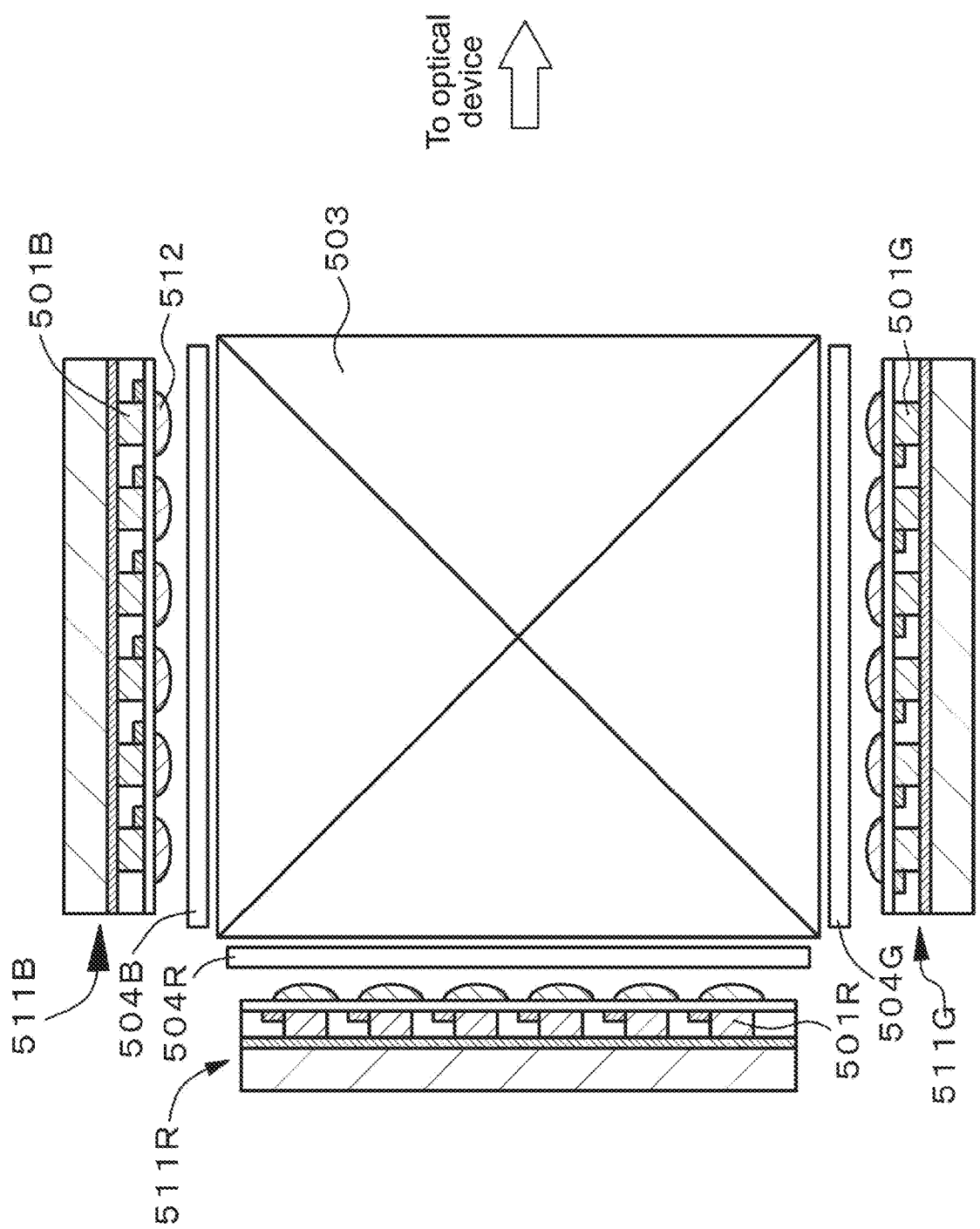
FIG. 20 is a conceptual diagram showing another modification of an image forming device suitable for use in Embodiments 1 to 4.

Alternatively, there may be provided an image forming device including, as shown in FIG. 20 as a conceptual diagram, light emitting panels 511R, 511G, and 511B on which light emitting elements 501R, 501G, and 501B are arranged in a two-dimensional matrix, respectively. The passages/non-passages of light beams output from the light emitting panels 511R, 511G, and 511B are controlled by light passage control devices 504R, 504G, and 504B, and the light beams are input to a dichroic prism 503. The optical paths of those light beams are collected into one optical path and input to the light guide plate 121 via the collimating optical system 112.

Figure 21:
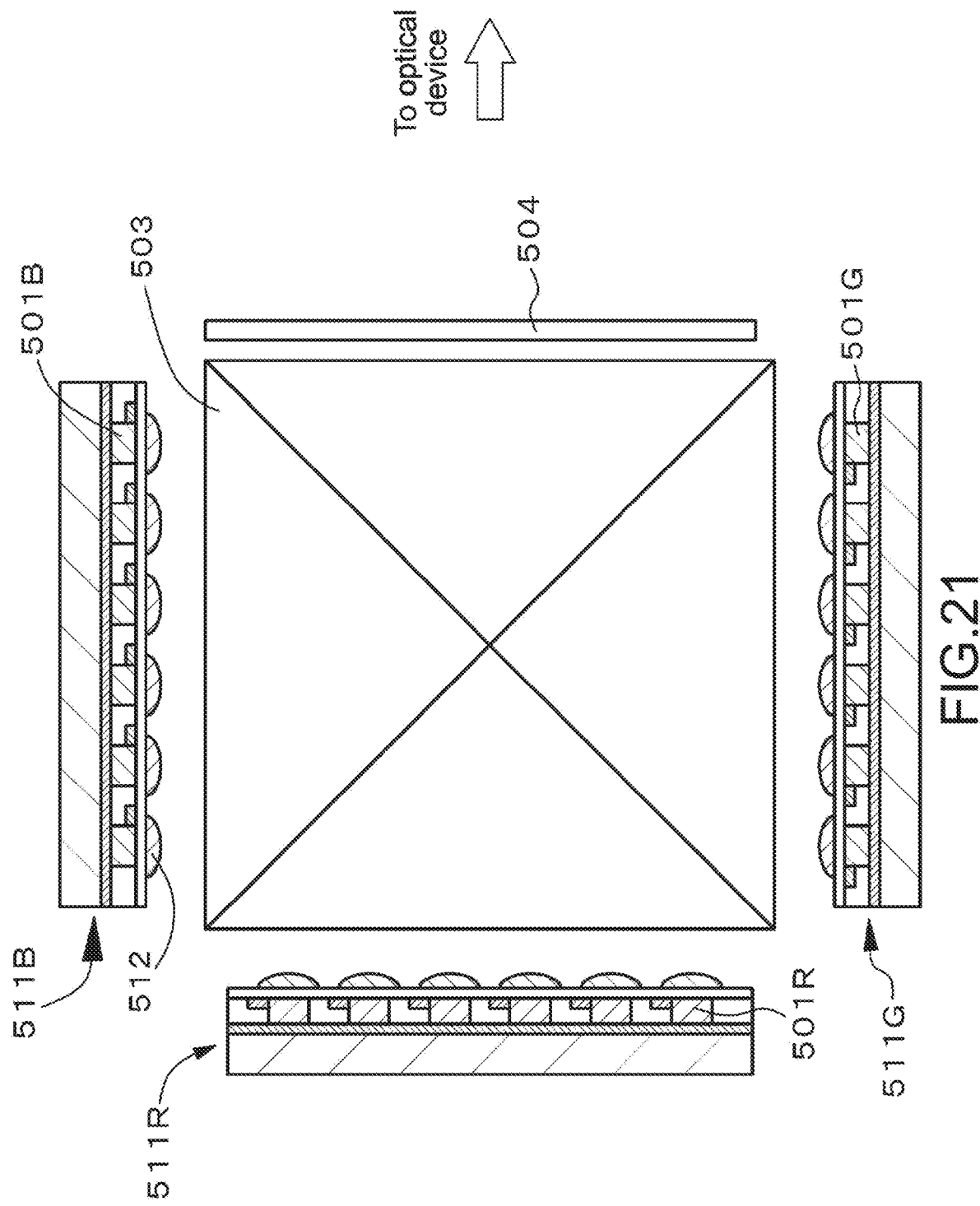
FIG. 21 is a conceptual diagram showing another modification of an image forming device suitable for use in Embodiments 1 to 4.

Alternatively, there may be provided an image forming device including, as shown in FIG. 21 as a conceptual diagram, light emitting panels 511R, 511G, and 511B on which light emitting elements 501R, 501G, and 501B are arranged in a two-dimensional matrix, respectively. Light beams output from the light emitting panels 511R, 511G, and 511B are input to a dichroic prism 503 and collected into one optical path. The passages/non-passages of the light beams output from the dichroic prism 503 are controlled by a light passage control device 504, and the light beams are input to the light guide plate 121 via the collimating optical system 112.

Alternatively, there may be provided an image forming device including, as shown in FIG. 22: a light emitting element 501R that emits red light; a light passage control device (for example, liquid crystal display device 504R) as a kind of light valve, configured to control the passage/non-passage of output light output from the light emitting element 501R that emits red light; a light emitting element 501G that emits green light; a light passage control device (for example, liquid crystal display device 504G) as a kind of light valve, configured to control the passage/non-passage of output light output from the light emitting element 501G that emits green light; a light emitting element 501B that emits blue light; a light passage control device (for example, liquid crystal display device 504B) as a kind of light valve, configured to control the passage/non-passage of output light output from the light emitting element 501B that emits green light; light leading members 502 configured to lead the light beams output from the light emitting elements 501R, 501G, and 501B; and a unit for collecting the light beams into one optical path (for example, dichroic prism 503). Those light beams output from the dichroic prism 503 are input to the light guide plate 121 via the collimating optical system 112.

It should be noted that the present disclosure can have the following configurations.

(1) An optical device comprising: a light guide comprising an input region and an output region, wherein the light guide is adapted to receive light at the input region and output at least some of the received light at the output region; and at least first and second diffraction gratings, wherein: the first diffraction grating is disposed on a first surface of the light guide, the first surface facing away from a light input, the second diffraction grating is disposed on a second surface of the light guide, the second surface facing towards the light input, the second diffraction grating is disposed at the input region of the light guide and adapted to diffract at least some of the light input into the light guide, and the first diffraction grating is adapted to diffract at least some light transmitted through the light guide back into the light guide.

(2) The optical device of configuration (1), wherein the second diffraction grating is adapted to diffract and reflect at least some of the light input into the light guide to be propagated inside the light guide towards the output region.

(3) The optical device of any preceding configuration, wherein the first diffraction grating is disposed at the input region to diffract and reflect the at least some light transmitted through the light guide back into the light guide to be propagated inside the light guide towards the output region.

(4) The optical device of any preceding configuration, wherein the light input comprises first and second portions, the first and second portions having different angles of view, and wherein the second diffraction grating is adapted to let the first portion pass through but diffract and reflect the second portion.

(5) The optical device of any preceding configuration, wherein the second diffraction grating is adapted to let pass through the first portion of the light input, which is input at an angle away from the output region of the light guide, and to diffract and reflect the second portion of the light input, which is input at an angle towards the output region of the light guide.

(6) The optical device of any preceding configuration, further comprising at least one alignment mark formed of an interference fringe or a diffraction grating, the least one alignment mark being associated with at least the first diffraction grating or the second diffraction grating.

(7) The optical device of any of configurations (1) through (5), further comprising alignment marks A1 and B1 associated with the first diffraction grating and alignment marks A2 and B2 associated with the second diffraction grating.

(8) The optical device of configuration (7), wherein: an angle $\theta$ is formed by straight lines L1 and L2, the straight line L1 connecting the alignment marks A1 and B1 of the first diffraction grating, the straight line L2 connecting the alignment marks A2 and B2 of the first diffraction grating; and the angle $\theta$ is smaller than a selected angle threshold.

(9) The optical device of configuration (7) or (8), wherein the first diffraction grating comprises a first interference fringe, the first interference fringe being disposed between the alignment marks A1 and B1.

(10) The optical device of any of configurations (7) to (9), wherein the second diffraction grating comprises a second interference fringe, the second interference fringe being disposed between the alignment marks A2 and B2.

(11) The optical device of any of configurations (7) through (10), wherein the alignment mark A1 comprises a third interference fringe, the first and third interference fringes having an identical pattern.

(12) The optical device of any of configurations (7) through (11), wherein the alignment mark B1 comprises a fourth interference fringe, the first, third, and fourth interference fringes having the identical pattern.

(13) The optical device of any of configurations (8) through (12), wherein the selected angle threshold is 100 seconds.

(14) The optical device of any of configurations (8) through (12), wherein the selected angle threshold is selected so as to obtain an image contrast that is above a selected image contrast threshold.

(15) The optical device of configuration (14), wherein the selected image contrast threshold is 0.95.

(16) The optical device of any of configurations (1) through (5), further comprising alignment marks A1 and B1 associated with the first diffraction grating and alignment marks A2 and B2 associated with the second diffraction grating, wherein:

the alignment mark A1 does not overlap with the alignment mark A2; and the alignment mark B1 does not overlap with the alignment mark B2.

(17) The optical device of configuration (16), wherein the alignment marks A1 and A2 are annular.

(18) The optical device of configuration (16) or (17), wherein a radius of the alignment mark A1 is larger than a radius of the alignment mark A2.

(19) The optical device of any preceeding configuration, further comprising a third diffraction grating disposed at the output region of the light guide and adapted to diffract at least some of the light diffracted by the first diffraction grating and the second diffraction grating.

(20) A head mounted display comprising:

a light guide comprising an input region and an output region, wherein the light guide is adapted to receive light at the input region and output at least some of the received light at the output region;

at least first and second diffraction gratings, wherein:
the first diffraction grating is disposed on a first surface of the light guide, the first surface facing away from a light input,
the second diffraction grating is disposed on a second surface of the light guide, the second surface facing towards the light input,
the second diffraction grating is disposed at the input region of the light guide and adapted to diffract and reflect at least some of the light input into the light guide to be propagated inside the light guide towards the output region, and
the first diffraction grating is adapted to diffract and reflect at least some light transmitted through the light guide back into the light guide;
alignment marks A1 and B1 associated with the first diffraction grating; and
alignment marks A2 and B2 associated with the second diffraction grating.

(21) The head mounted display of configuration (20), wherein:
an angle θ is formed by straight lines L1 and L2, the straight line L1 connecting the alignment marks A1 and B1 of the first diffraction grating, the straight line L2 connecting the alignment marks A2 and B2 of the first diffraction grating; and
the angle θ is smaller than a selected angle threshold.

(22) The head mounted display of configuration (20), wherein:
the alignment mark A1 does not overlap with the alignment mark A2; and
the alignment mark B1 does not overlap with the alignment mark B2.

(23) A head mounted display comprising:
a light guide;
at least first and second diffraction gratings, wherein:
the first diffraction grating is disposed on a first surface of the light guide, the first surface facing away from a light input,
the second diffraction grating is disposed on a second surface of the light guide, the second surface facing towards the light input,
the second diffraction grating is adapted to diffract and reflect at least some of the light input into the light guide to be propagated inside the light, and
the first diffraction grating is adapted to diffract and reflect at least some light transmitted through the light guide back into the light guide;
alignment marks A1 and B1 associated with the first diffraction grating; and
alignment marks A2 and B2 associated with the second diffraction grating.

(24) The head mounted display of configuration (23), wherein:
the light guide comprises an input region and an output region;
the light guide is adapted to receive light at the input region and output at least some of the received light at the output region; and
the first diffraction grating is disposed at the input region to diffract and reflect the at least some light transmitted through the light guide back into the light guide to be propagated inside the light guide towards the output region.

Furthermore, it should be noted that the present disclosure can have the following configurations.

(1') An assembling method for an optical device, the optical device including
a light guide plate configured to output light after the light is input to the light guide plate and propagated inside the light guide plate by total reflection,
a first deflection unit configured to deflect the light input to the light guide plate, to totally reflect the light input to the light guide plate inside the light guide plate, and
a second deflection unit configured to deflect the light propagated inside the light guide plate by total reflection, to output, from the light guide plate, part of the light propagated inside the light guide plate by total reflection,
the first deflection unit including a first holographic diffraction grating and a second holographic diffraction grating,
the first holographic diffraction grating including a first interference fringe forming area in which a first interference fringe is formed,
the second holographic diffraction grating including a second interference fringe forming area in which a second interference fringe is formed,
the first holographic diffraction grating including a first A alignment mark and a first B alignment mark that are provided outside the first interference fringe forming area in an extending direction of the first interference fringe and opposed to each other with the first interference fringe forming area being sandwiched therebetween,
the second holographic diffraction grating including a second A alignment mark and a second B alignment mark that are provided outside the second interference fringe forming area in an extending direction of the second interference fringe and opposed to each other with the second interference fringe forming area being sandwiched therebetween,
the assembling method comprising:
optically detecting the first A alignment mark and the second A alignment mark;
optically detecting the first B alignment mark and the second B alignment mark;
obtaining a first straight line connecting the first A alignment mark and the first B alignment mark;
obtaining a second straight line connecting the second A alignment mark and the second B alignment mark; and
relatively aligning the first holographic diffraction grating and the second holographic diffraction grating with each other such that an angle formed by the first straight line and the second straight line when the first straight line and the second straight line are projected onto a virtual plane falls below a prescribed value.

(2') The assembling method for an optical device according to (1'), wherein
with the first holographic diffraction grating being disposed on the light guide plate, the first holographic diffraction grating and the second holographic diffraction grating are relatively aligned with each other, and the second holographic diffraction grating is disposed on the light guide plate.

(3') The assembling method for an optical device according to (2'), wherein
with the first holographic diffraction grating being disposed on the light guide plate, the light guide plate is moved relative to the second holographic diffraction grating.

(4') The assembling method for an optical device according to (2') or (3'), wherein
after the first holographic diffraction grating is bonded to the light guide plate or formed on the light guide plate, the first holographic diffraction grating and the second holographic diffraction grating are relatively aligned with each other, and the second holographic diffraction grating is bonded to the light guide plate.

(5') The assembling method for an optical device according to any one of (1') to (4'), wherein with the second holographic diffraction grating being supported by a support, the first holographic diffraction grating and the second holographic diffraction grating are relatively aligned with each other.

(6') The assembling method for an optical device according to (5'), wherein each of the first A alignment mark and the first B alignment mark includes an interference fringe that is identical to the interference fringe provided to the first interference fringe forming area, and each of the second A alignment mark and the second B alignment mark includes an interference fringe that is identical to the interference fringe provided to the second interference fringe forming area, the assembling method further comprising:

inputting the light from an end surface of the light guide plate to the light guide plate, and optically detecting light diffracted and reflected by the first A alignment mark and the first B alignment mark; and inputting the light from an end surface of the support to the support, and optically detecting light diffracted and reflected by the second A alignment mark and the second B alignment mark.

(7') The assembling method for an optical device according to (6'), wherein in a state where a relative alignment of the first holographic diffraction grating and the second holographic diffraction grating is completed, each of the first A alignment mark and the second A alignment mark has a shape for which the first A alignment mark and the second A alignment mark do not overlap, and each of the first B alignment mark and the second B alignment mark has a shape for which the first B alignment mark and the second B alignment mark do not overlap.

(8') The assembling method for an optical device according to (6') or (7'), wherein in a state where a relative alignment of the first holographic diffraction grating and the second holographic diffraction grating is completed, the first A alignment mark and the second A alignment mark are disposed at positions where the first A alignment mark and the second A alignment mark do not overlap, and the first B alignment mark and the second B alignment mark are disposed at positions where the first B alignment mark and the second B alignment mark do not overlap.

(9') The assembling method for an optical device according to any one of (1') to (8'), wherein the first A alignment mark and the second A alignment mark are imaged by a first imaging device, and the first B alignment mark and the second B alignment mark are imaged by a second imaging device.

(10') The assembling method for an optical device according to any one of (1') to (9'), wherein the first holographic diffraction grating is disposed on a first surface of the light guide plate, and the second holographic diffraction grating is disposed on a second surface of the light guide plate, the second surface being opposed to the first surface.

(11') The assembling method for an optical device according to any one of (1') to (10'), wherein the following expressions are satisfied:

$P_1 \neq P_2$ and $\varphi 1 = \varphi 2$;

$P_1 = P_2$ and $\varphi 1 \neq \varphi 2$; or $P_1 \neq P_2$ and $\varphi 1 \neq \varphi 2$, where a pitch of the first interference fringe is $P_1$, a slant angle of the first interference fringe is $\varphi_1$, a pitch of the second interference fringe is $P_2$, and a slant angle of the second interference fringe is $\varphi_2$.

(12') The assembling method for an optical device according to any one of (1') to (11'), wherein the first A alignment mark, the first B alignment mark, the second A alignment mark, and the second B alignment mark are each disposed on an end of the light guide plate.

(13') The assembling method for an optical device according to any one of (1') to (12'), wherein the prescribed value has the maximum value of 100 seconds.

(14') The assembling method for an optical device according to any one of (1') to (13'), wherein the second deflection unit includes a holographic diffraction grating.

(15') The assembling method for an optical device according to any one of (1') to (14'), wherein the second deflection unit has a diffraction efficiency value that is smaller than a diffraction efficiency value of the first deflection unit.

(16') An assembling method for an optical device, the optical device including a light guide plate configured to output light after the light is input to the light guide plate and propagated inside the light guide plate by total reflection, a first deflection unit configured to deflect the light input to the light guide plate, to totally reflect the light input to the light guide plate inside the light guide plate, and a second deflection unit configured to deflect the light propagated inside the light guide plate by total reflection, to output, from the light guide plate, part of the light propagated inside the light guide plate by total reflection, the first deflection unit including a first holographic diffraction grating and a second holographic diffraction grating, the first holographic diffraction grating including a first interference fringe forming area in which a first interference fringe is formed, the second holographic diffraction grating including a second interference fringe forming area in which a second interference fringe is formed, the first holographic diffraction grating including a first A alignment mark and a first B alignment mark that are provided outside the first interference fringe forming area in an extending direction of the first interference fringe and opposed to each other with the first interference fringe forming area being sandwiched therebetween, the second holographic diffraction grating including a second A alignment mark and a second B alignment mark that are provided outside the second interference fringe forming area in an extending direction of the second interference fringe and opposed to each other with the second interference fringe forming area being sandwiched therebetween, each of the first A alignment mark and the first B alignment mark including an interference fringe that is identical to the interference fringe provided to the first interference fringe forming area, each of the second A alignment mark and the second B alignment mark including an interference fringe that is identical to the interference fringe provided to the second interference fringe forming area, the assembling method comprising with the second holographic diffraction grating being supported by a support, inputting the light from an end surface of the light guide plate to the light guide plate and optically detecting light diffracted and reflected by the first A alignment mark and the first B alignment mark, and inputting the light from an end surface of the support to the support and optically detecting light diffracted and reflected by the second A alignment mark and the second B alignment mark, to relatively align the first holographic diffraction grating and the second holographic diffraction grating with each other.

(17') A holographic diffraction grating, comprising:

an interference fringe forming area in which an interference fringe is formed; and two alignment marks that are provided outside the interference fringe forming area in an extending direction of the interference fringe and opposed to each other with the interference fringe forming area being sandwiched therebetween, each of the alignment marks including an interference fringe that is identical to the interference fringe provided to the interference fringe forming area, each of the alignment marks having an annular shape in plan view.

(18') An optical device, comprising:

a light guide plate configured to output light after the light is input to the light guide plate and propagated inside the light guide plate by total reflection;

a first deflection unit configured to deflect the light input to the light guide plate, to totally reflect the light input to the light guide plate inside the light guide plate; and a second deflection unit configured to deflect the light propagated inside the light guide plate by total reflection, to output, from the light guide plate, part of the light propagated inside the light guide plate by total reflection, the first deflection unit including a first holographic diffraction grating and a second holographic diffraction grating, the first holographic diffraction grating including a first interference fringe forming area in which a first interference fringe is formed, the second holographic diffraction grating including a second interference fringe forming area in which a second interference fringe is formed, the first holographic diffraction grating including a first A alignment mark and a first B alignment mark that are provided outside the first interference fringe forming area in an extending direction of the first interference fringe and opposed to each other with the first interference fringe forming area being sandwiched therebetween, the second holographic diffraction grating including a second A alignment mark and a second B alignment mark that are provided outside the second interference fringe forming area in an extending direction of the second interference fringe and opposed to each other with the second interference fringe forming area being sandwiched therebetween, each of the first A alignment mark and the first B alignment mark including an interference fringe that is identical to the interference fringe provided to the first interference fringe forming area, each of the second A alignment mark and the second B alignment mark including an interference fringe that is identical to the interference fringe provided to the second interference fringe forming area, in a state where a relative alignment of the first holographic diffraction grating and the second holographic diffraction grating is completed, each of the first A alignment mark and the second A alignment mark having a shape for which the first A alignment mark and the second A alignment mark do not overlap and each of the first B alignment mark and the second B alignment mark having a shape for which the first B alignment mark and the second B alignment mark do not overlap, or in the state where the relative alignment of the first holographic diffraction grating and the second holographic diffraction grating is completed, the first A alignment mark and the second A alignment mark being disposed at positions where the first A alignment mark and the second A alignment mark do not overlap and the first B alignment mark and the second B alignment mark being disposed at positions where the first B alignment mark and the second B alignment mark do not overlap.

(19') A display device, comprising:

a frame mounted onto a head of an observer; and an image display device attached to the frame, the image display device including an image forming device, and an optical device configured to input light output from the image forming device and to output the light, the optical device including a light guide plate configured to output light after the light is input to the light guide plate and propagated inside the light guide plate by total reflection, a first deflection unit configured to deflect the light input to the light guide plate, to totally reflect the light input to the light guide plate inside the light guide plate, and a second deflection unit configured to deflect the light propagated inside the light guide plate by total reflection, to output, from the light guide plate, part of the light propagated inside the light guide plate by total reflection, the first deflection unit including a first holographic diffraction grating and a second holographic diffraction grating, the first holographic diffraction grating including a first interference fringe forming area in which a first interference fringe is formed, the second holographic diffraction grating including a second interference fringe forming area in which a second interference fringe is formed, the first holographic diffraction grating including a first A alignment mark and a first B alignment mark that are provided outside the first interference fringe forming area in an extending direction of the first interference fringe and opposed to each other with the first interference fringe forming area being sandwiched therebetween, the second holographic diffraction grating including a second A alignment mark and a second B alignment mark that are provided outside the second interference fringe forming area in an extending direction of the second interference fringe and opposed to each other with the second interference fringe forming area being sandwiched therebetween, each of the first A alignment mark and the first B alignment mark including an interference fringe that is identical to the interference fringe provided to the first interference fringe forming area, each of the second A alignment mark and the second B alignment mark including an interference fringe that is identical to the interference fringe provided to the second interference fringe forming area, in a state where a relative alignment of the first holographic diffraction grating and the second holographic diffraction grating is completed, each of the first A alignment mark and the second A alignment mark having a shape for which the first A alignment mark and the second A alignment mark do not overlap and each of the first B alignment mark and the second B alignment mark having a shape for which the first B alignment mark and the second B alignment mark do not overlap, or in the state where the relative alignment of the first holographic diffraction grating and the second holographic diffraction grating is completed, the first A alignment mark and the second A alignment mark being disposed at positions where the first A alignment mark and the second A alignment mark do not overlap and the first B alignment mark and the second B alignment mark being disposed at positions where the first B alignment mark and the second B alignment mark do not overlap.

(20') An alignment device, comprising:

a stage movable in an X direction, a Y direction, and a Z direction and turnable in an X-Y plane;

a first light source placed on the stage and configured to input light from an end surface of a light guide plate to the light guide plate, a first holographic diffraction grating being disposed on the light guide plate;

a second light source configured to input light from an end surface of a support to the support, the support being configured to support a second holographic diffraction grating above the first holographic diffraction grating;

a first imaging device configured to detect an optical image of a first A alignment mark provided to the first holographic diffraction grating, based on the light that is input from the first light source and diffracted and reflected by the first A alignment mark, and an optical image of a second A alignment mark provided to the second holographic diffraction grating, based on the light that is input from the second light source and diffracted and reflected by the second A alignment mark; and a second imaging device configured to detect an optical image of a first B alignment mark provided to the first holographic diffraction grating, based on the light that is input from the first light source and diffracted and reflected by the first B alignment mark, and an optical image of a second B alignment mark provided to the second holographic diffraction grating, based on the light that is input from the second light source and diffracted and reflected by the second B alignment mark.

What is claimed is:

1. An image display device comprising:
a light source; and
a light guide comprising an input region and an output region, wherein the light guide including a first diffraction grating member and a second diffraction grating member;
wherein the first diffraction grating member includes at least first and second holographic diffraction gratings;
the first holographic diffraction grating is disposed on a first surface of the light guide,
the second holographic diffraction grating is disposed on a second surface of the light guide-which is opposed to the first surface, and
wherein the first holographic diffraction grating and the second holographic diffraction grating include respective groups of an angle of view so that the light from the light source is divided into two;
an optical system that receives light input from the light source and outputs a parallel pencil of light;
wherein the second holographic diffraction grating diffracts and reflects the at least some of the parallel pencil of light output by the optical system to be propagated inside the light guide towards the output region.

2. The image display device of claim 1, wherein the first holographic diffraction grating is disposed at the input region to diffract and reflect the at least some parallel light transmitted through the light guide back into the light guide to be propagated inside the light guide towards the output region.

3. The image display device of claim 1, wherein the second holographic diffraction grating lets pass through the first portion of the light input, which is input at an angle towards the output region of the light guide, and to diffract and reflect the second portion of the light input, which is input at an angle away from the output region of the light guide.

4. The image display device of claim 1, further comprising:
at least one alignment mark formed of an interference fringe or a diffraction grating, the at least one alignment mark being associated with at least the first holographic diffraction grating or the second diffraction grating.

5. The image display device of claim 4, wherein the at least one alignment mark is disposed on the first holographic diffraction grating at a distance from an edge of the first holographic diffraction grating, or is disposed on the second holographic diffraction grating at a distance from an edge of the second holographic diffraction grating.

6. The image display device of claim 4, wherein the at least one alignment mark comprises alignment marks A1 and B1 associated with the first holographic diffraction grating and alignment marks A2 and B2 associated with the second holographic diffraction grating.

7. The image display device of claim 6, wherein:
an angle θ is formed by straight lines L1 and L2, the straight line L1 connecting the alignment marks A1 and B1 of the first holographic diffraction grating, the straight line L2 connecting the alignment marks A2 and B2 of the first holographic diffraction grating; and
the angle θ is smaller than a selected angle threshold.

8. The image display device of claim 6, wherein the first holographic diffraction grating comprises a first interference fringe, the first interference fringe being disposed between the alignment marks A1 and B1.

9. The image display device of claim 8, wherein the second holographic diffraction grating comprises a second interference fringe, the second interference fringe being disposed between the alignment marks A2 and B2.

10. The image display device of claim 8, wherein the alignment mark A1 comprises a third interference fringe, the first and third interference fringes having an identical pattern.

11. The image display device of claim 10, wherein the alignment mark B1 comprises a fourth interference fringe, the first, third, and fourth interference fringes having the identical pattern.

12. The image display device of claim 7, wherein the selected angle threshold is 100 seconds.

13. The image display device of claim 7, wherein the selected angle threshold is selected so as to obtain an image contrast that is above a selected image contrast threshold.

14. The image display device of claim 13, wherein the selected image contrast threshold is 0.95.

15. The image display device of claim 4, wherein the at least one alignment mark comprises alignment marks A1 and B1 associated with the first holographic diffraction grating and alignment marks A2 and B2 associated with the second holographic diffraction grating, wherein:
the alignment mark A1 does not overlap with the alignment mark A2; and
the alignment mark B1 does not overlap with the alignment mark B2.

16. The image display device of claim 15, wherein the alignment marks A1 and A2 are annular.

17. The image display device of claim 15, wherein a radius of the alignment mark A1 is larger than a radius of the alignment mark A2.

18. The image display device of claim 1, wherein the light guide receives at the input region, the parallel pencil of light output by the optical system, and outputs at least some of the received light at the output region.

19. The image display device of claim 1, wherein the first surface facing away from the parallel pencil of light output by the optical system.

20. The image display device of claim 1, wherein the second surface facing towards the parallel pencil of light output by the optical system.

21. An image display device of comprising:
a light source; and
a light guide comprising an input region and an output region, wherein the light guide including a first diffraction grating member and a second diffraction grating member;
wherein the first diffraction grating member includes at least first and second holographic diffraction gratings;
the first holographic diffraction grating is disposed on a first surface of the light guide,
the second holographic diffraction grating is disposed on a second surface of the light guide-which is opposed to the first surface, and
wherein the first holographic diffraction grating and the second holographic diffraction grating include respective groups of an angle of view so that the light from the light source is divided into two; and
a third holographic diffraction grating disposed at the output region of the light guide and adapted to diffract and reflect at least some light diffracted and reflected by the first holographic diffraction grating and the second holographic diffraction grating.

22. An image display device, comprising:
a light source; and
a light guide comprising an input region and an output region, wherein the light guide including a first diffraction grating member and a second diffraction grating member;
wherein the first diffraction grating member includes at least first and second holographic diffraction gratings;
the first holographic diffraction grating is disposed on a first surface of the light guide,
the second holographic diffraction grating is disposed on a second surface of the light guide-which is opposed to the first surface, and
wherein the first holographic diffraction grating and the second holographic diffraction grating include respective groups of an angle of view so that the light from the light source is divided into two; and
wherein the first holographic diffraction grating diffracts and reflects the light transmitted through the light guide back into the light guide,
the light input comprises first and second portions, the first and second portions having different angles of view, and
the second holographic diffraction grating lets the first portion pass through but diffracts and reflects the second portion.

* * * * *